WILLIAM HENRY BRUNS
ROBERT ANDRE' COUTURIER
DOMINICK ANTHONY GHERSI
INVENTORS
BY Leon H. Gureck ATTORNEY Nov. 15, 1960 W. H. BRUNS ET AL 2,960,187

ELEVATOR SYSTEM

Original Filed April 12, 1956 22 Sheets-Sheet 2

WILLIAM HENRY BRUNS
ROBERT ANDRE' COUTURIER
DOMINICK ANTHONY GHERSI
INVENTORS

BY Leon H. Emerick ATTORNEY

ELEVATOR SYSTEM

Original Filed April 12, 1956

WILLIAM HENRY BRUNS
ROBERT ANDRE' COUTURIER
DOMINICK ANTHONY GHERSI
INVENTORS

BY *[signature]* ATTORNEY

WILLIAM HENRY BRUNS
ROBERT ANDRE' COUTURIER
DOMINICK ANTHONY GHERSI
INVENTORS
BY [signature] ATTORNEY ELEVATOR SYSTEM
Original Filed April 12, 1956
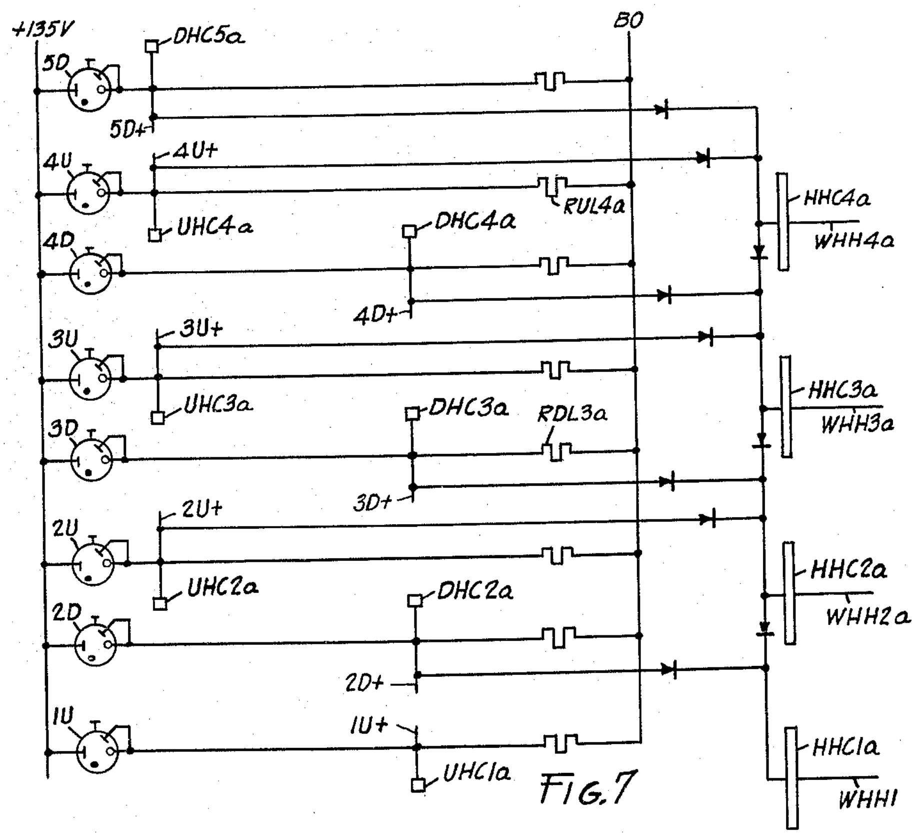
FIG. 7
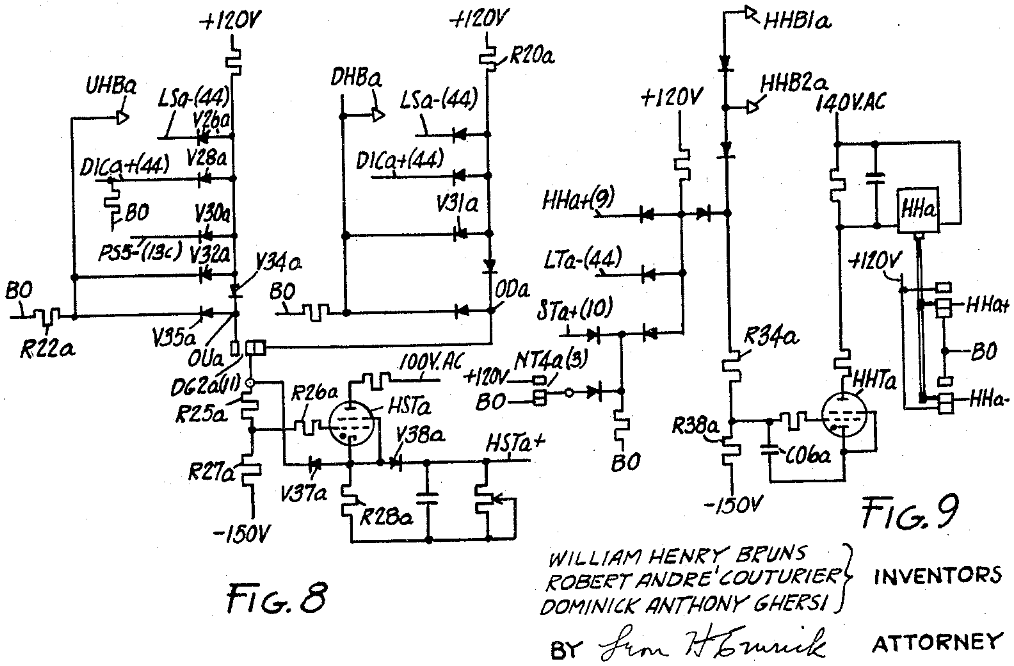
FIG. 9
FIG. 8
WILLIAM HENRY BRUNS
ROBERT ANDRE' COUTURIER
DOMINICK ANTHONY GHERSI
INVENTORS
BY [signature]
ATTORNEY WILLIAM HENRY BRUNS
ROBERT ANDRE' COUTURIER
DOMINICK ANTHONY GHERSI
INVENTORS
BY [signature] ATTORNEY WILLIAM HENRY BRUNS
ROBERT ANDRE' COUTURIER
DOMINICK ANTHONY GHERSI
INVENTORS
BY [signature] ATTORNEY Nov. 15, 1960 W. H. BRUNS ET AL 2,960,187

ELEVATOR SYSTEM

Original Filed April 12, 1956 22 Sheets-Sheet 8

WILLIAM HENRY BRUNS
ROBERT ANDRE COUTURIER
DOMINICK ANTHONY GHERSI
INVENTORS

BY ATTORNEY

WILLIAM HENRY BRUNS
ROBERT ANDRE COUTURIER
DOMINICK ANTHONY GHERSI
INVENTORS

BY [signature] ATTORNEY

WILLIAM HENRY BRUNS
ROBERT ANDRE COUTURIER
DOMINIC ANTHONY GHERSI } INVENTORS

BY [signature] ATTORNEY

WILLIAM HENRY BRUNS
ROBERT ANDRE' COUTURIER
DOMINICK ANTHONY GHERSI
INVENTORS
BY [signature] ATTORNEY

WILLIAM HENRY BRUNS
ROBERT ANDRE' COUTURIER
DOMINICK ANTHONY GHERSI
INVENTORS

BY [signature] ATTORNEY

WILLIAM HENRY BRUNS
ROBERT ANDRE COUTURIER
DOMINICK ANTHONY GHERSI } INVENTORS

BY [signature] ATTORNEY

WILLIAM HENRY BRUNS
ROBERT ANDRE' COUTURIER
DOMINICK ANTHONY GHERSI
INVENTORS

BY [signature] ATTORNEY

ELEVATOR SYSTEM

Original Filed April 12, 1956

WILLIAM HENRY BRUNS
ROBERT ANDRE' COUTURIER
DOMINICK ANTHONY GHERSI
INVENTORS

BY Leon H. Ennick ATTORNEY

WILLIAM HENRY BRUNS
ROBERT ANDRE COUTURIER
DOMINICK ANTHONY GHERSI } INVENTORS
BY [signature] ATTORNEY

ELEVATOR SYSTEM

WILLIAM HENRY BRUNS
ROBERT ANDRE' COUTURIER
DOMINICK ANTHONY GHERSI
INVENTORS
BY [signature]
ATTORNEY WILLIAM HENRY BRUNS
ROBERT ANDRE COUTURIER
DOMINICK ANTHONY GHERSI } INVENTORS
BY [signature] ATTORNEY

WILLIAM HENRY BRUNS
ROBERT ANDRE COUTURIER
DOMINICK ANTHONY GHERSI
} INVENTORS

BY Leon H. Emrick ATTORNEY

| SOURCE SYMBOL | LOCATION | FUNCTION | LOCATION OF APPLIED OUTPUTS + | | | | | − | | | | | | CONTACTS NOT IN FIG. 3 NUMBERS 1 | 2 | 3 | 4 | 5 |
|---|---|---|---|---|---|---|---|---|---|---|---|---|---|---|---|---|---|---|
| 2Ca to 5Ca | 4 | CAR CALLS | 12 | | | | | | | | | | | | | | | |
| 2Cb to 5Cb | | | 12 | | | | | | | | | | | | | | | |
| 2Cc to 5Cc | | | 12 | | | | | | | | | | | | | | | |
| 2Cd to 5Cd | | | 12 | | | | | | | | | | | | | | | |
| CAM | 44 | MORNING CLOCK SWITCH | | | | | | | | | | | | 13a | 13b | 44 | | |
| CPM | 44 | EVENING CLOCK SWITCH | 13a | | | | | | | | | | | 13a | 13c | 44 | | |
| CSTa | 5 | CAR CALL STOP INITIATING TUBE | 10 | | | | | | | | | | | | | | | |
| CUa | 30 | CAR DIRECTION RELAY | | | | | | | | | | | | 30 | | | | |
| 2D to 5D | 7 | DOWN LANDING CALLS | 12 | | | | | | | | | | | | | | | |
| DAY | 44 | DAY CLOCK SWITCH | 13a | | | | | | | | | | | 44 | | | | |
| DBR | * | DOWN BALANCE RELAY | | | | | | | | | | | | 31 | | | | |
| DCb | 43a | DOOR CLOSE SWITCH | | | | | | | | | | | | | | | 43a | |
| DGa | 11 | DIRECTION HOLDING RELAY | 30 10 | 35 11 | 35 11 | 39 11 | 12 | 5 | 10 | 12 | 34 | 35 | 36 | | 8 | | | |
| DGb | | | 12 | 39 | | | | 12 | 35 | 36 | | | | | | | | |
| DGc | | | 12 | 39 | | | | 12 | 35 | 36 | | | | | | | | |
| DGd | | | 12 | 39 | | | | 12 | 35 | 36 | | | | | | | | |
| DICa | 44 | INDEPENDENT SERVICE SW. | 8 | 8 | | | | | | | | | | | | | | |
| DICb | 44 | | | | | | | | | | | | | | | | | |
| DOb | 43a | DOOR OPEN SWITCH | | | | | | | | | | | | | | | 43a | 43a |
| FMa | * | FORGOTTEN MAN CIRCUIT | | | | | | 11 | 11 | | | | | | | | | |
| Ha | 3 | FIELD & BRAKE SWITCH | | | | | | | | | | | | | | 10 | | |
| HCa | 6 | CAR CALL ABOVE RELAY | 11 | 11 | 11 | 32 | 38 | 35 | | | | | | | | | | |
| HCb | | | 32 | | | | | | | | | | | | | | | |
| HCc | | | 32 | | | | | | | | | | | | | | | |
| HCd | | | 32 | | | | | | | | | | | | | | | |
| HHa | 9 | LANDING CALL ABOVE REL. | 11 | 32 | | | | 35 | | | | | | | | | | |
| HHb | | | 32 | | | | | | | | | | | | | | | |
| HHc | | | 32 | | | | | | | | | | | | | | | |
| HHd | | | 32 | | | | | | | | | | | | | | | |
| HRP | 26 | RECYCLING PULSE | 21 | | | | | | | | | | | | | | | |
| HSTa | 8 | L'DG. CALL STOP INITIATING TUBE | 10 | | | | | | | | | | | | | | | |
| LECT1 | 25 | LATE EARLY CAR COUNTER CATHODE | 20 | | | | | | | | | | | | | | | |
| LECT2 | 25 | | 20 | | | | | | | | | | | | | | | |
| LECT3 | 25 | | 20 | | | | | | | | | | | | | | | |
| LECT4 | 25 | | 20 | | | | | | | | | | | | | | | |
| LECT5 | 25 | | 20 | | | | | | | | | | | | | | | |
| LECT6 | 25 | | 20 | | | | | | | | | | | | | | | |

FIG. 46a

*SEE PATENT No. 2,589,242

WILLIAM HENRY BRUNS
ROBERT ANDRE' COUTURIER
DOMINICK ANTHONY GHERSI
INVENTORS

BY [signature] ATTORNEY

| | | | | | | | | | | | | | | | | | |
|---|---|---|---|---|---|---|---|---|---|---|---|---|---|---|---|---|---|
| LSa | 44 | LOAD SWITCH | 11 | 12 | 12 | | | 8 | 8 | 40 | 40 | 34 | | | | | |
| LSb | | | 12 | 12 | | | | | | | | | | | | | |
| LSc | | | 12 | 12 | | | | | | | | | | | | | |
| LSd | | | 12 | 12 | | | | | | | | | | | | | |
| LTa | 44 | LOWER TERMINAL SWITCH | 11 | 11 | 34 | 39 | | 9 | 12 | 36 | 38 | | | 34 | | | |
| LTb | | | 39 | 43 | | | | 12 | 36 | | | | | | | | |
| LTc | | | 39 | | | | | 12 | 36 | | | | | | | | |
| LTd | | | 39 | | | | | 12 | 36 | | | | | | | | |
| NTa | 3 | DOOR TIME SWITCH | | | | | | | | | | | | | | | 9 |
| NTb | | | | | | | | | | | | | | | | 43a | |
| PS1 | 13b | UPPEAK PROGRAM SWITCH | 22 | 20 | | | | 13b | 14 | 19 | 33 | | | 25 | | | |
| PS2 | 14 | BALANCE PROGRAM SWITCH | 15 | 28 | | | | | | | | | | | | | |
| PS3 | 13c | HEAVIER DOWN PROGRAM SW. | 15 | 28 | | | | 14 | | | | | | | | | |
| PS4 | 13b | HEAVIER UP PROGRAM SW | 15 | 28 | | | | 14 | | | | | | | | | |
| PS5 | 13c | DOWN PEAK PROGRAM SW. | 36 33 | 20 | 36 | 36 | 36 | 8 | 13c | 14 | 29 | | | 25 | | | |
| PS6 | 13a | INTERMITTENT PROGRAM SW. | 43 11 | 20 | 22 | 33 | 38 | 14 | 19 | | | | | 25 | | | |
| SCDa | 40 | SELECTED CAR DISPATCHING REL. | 10 | 30 | 40 | 40 | | 42 30 | 36 | 38 | 39 | 39 | 41 | 23 | | | |
| SCDb | | | | | | | | 36 | 39 | 39 | 41 | 42 | | 23 | | | |
| SCDc | | | | | | | | 36 | 39 | 39 | 41 | 42 | | 23 | | | |
| SCDd | | | | | | | | 36 | 39 | 39 | 41 | 42 | | 23 | | | |
| SDRb | 43 | GENERAL SHUT DOWN RELAY | | | | | | | | | | | | 43a | 43a | 44 | 44 |
| STa | | START & STOP SWITCH | 9 | 10 | 10 | 11 | | | | | | | | | | | |
| STb | | | | | | | | | | | | | | | | 43a | 43a |
| Ua | 3 | UP DIRECTION SWITCH | | | | | | | | | | | | | | 5 | |
| 1U TO 4U | 7 | UP LANDING CALLS | 12 | | | | | | | | | | | | | | |
| UBR | * | UP BALANCE RELAY | | | | | | | | | | | | 31 | | | |
| UTa | 44 | UPPER TERMINAL SWITCH | 23 | 35 | | | | 11 | 35 | | | | | | | | |
| UTb | | | 23 | | | | | 35 | | | | | | | | | |
| UTc | | | 23 | | | | | 35 | | | | | | | | | |
| UTd | | | 23 | | | | | 35 | | | | | | | | | |
| VBa | 34 | LOBBY AVAILABLE CAR F-F | 36 | 37 | 40 | | | 36 | | | | | | | | | |
| VBb | | | 36 | 37 | | | | 36 | | | | | | | | | |
| VBc | | | 36 | 37 | | | | 36 | | | | | | | | | |
| VBd | | | 36 | 37 | | | | 36 | | | | | | | | | |
| VBA | 37 | AVAILABILITY VOLTAGE SOURCE | 38 | | | | | | | | | | | | | | |
| VBD | 37 | DELAYED VBA | 33 | | | | | | | | | | | | | | |
| VD | 19 | SCHEDULED PROGRAM F-F | 11 | 22 | 33 | | | 26 | 33 | 42 | | | | | | | |
| VDM | 31 | DOWN BAL. DIS. INITIATING F-F | 33 | 42 | | | | | | | | | | | | | |
| VDS | 29 | ON TIMED DIS. INITIATING F-F | 22 | 23 | 33 | 42 | | 23 | 31 | | | | | | | | |
| VDT | 22 | DETENT TUBE | 20 | 33 | | | | | | | | | | | | | |
| VE | 27 | ODD-EVEN F-F | 28 | | | | | 28 | | | | | | | | | |
| VHO | 41 | UP DISPATCH RESET F-F | 26 | 29 | 31 | 41 | | 31 | 36 | 36 | 36 | 36 | | | | | |

FIG. 46b

*SEE PATENT Nº. 2,589,242

WILLIAM HENRY BRUNS
ROBERT ANDRE' COUTURIER
DOMINICK ANTHONY GHERSI } INVENTORS
BY [signature] ATTORNEY

ELEVATOR SYSTEM

Original Filed April 12, 1956 22 Sheets-Sheet 22

| | | | | | | | | | | | | | |
|---|---|---|---|---|---|---|---|---|---|---|---|---|---|
| VHR | 42 | DOWN DISPATCH RESET F-F | 29 | 31 | 42 | | | 31 | 39 | 39 | 39 | 39 | |
| VL | 32 | SELECTED CAR CALL ABOVE F-F | 33 | | | | | 22 | | | | | |
| VRR | 33 | DOWN GROUP DISPATCH F-F | 35 | | | | | 40 | | | | | |
| VS | 28 | SIMULTANEOUS DISPATCH F-F | 29 | | | | | 22 | 29 | | | | |
| VTa | 35 | | 39 | 40 | | | | 39 | | | | | |
| VTb | | UPPER ZONE AVAILABLE CAR F-F | 39 | | | | | 39 | | | | | |
| VTc | | | 39 | | | | | 39 | | | | | |
| VTd | | | 39 | | | | | 39 | | | | | |
| VUB | 15 | INTERUM PROGRAM VOLTAGE | 31 | 31 | | | | | | | | | |
| VUM | 31 | UP BAL. DIS. INITIATING F-F | 33 | | | | | | | | | | |
| VUS | 29 | UP TIMED DIS. INITIATING F-F | 22 | 22 | 33 | | | 31 | | | | | |
| WBa | 36 | | 11 | 32 | 40 | 41 | | | | | | | |
| WBb | 36 | LOBBY CAR SELECTION F-F | 32 | 41 | | | | | | | | | |
| WBc | 36 | | 32 | 41 | | | | | | | | | |
| WBd | 36 | | 32 | 41 | | | | | | | | | |
| WBRa | 38 | | 36 | | | | | | | | | | |
| WBRb | | SELECTION RESET VOLTAGE | 36 | | | | | | | | | | |
| WBRc | | | 36 | | | | | | | | | | |
| WBRd | | | 36 | | | | | | | | | | |
| WBTa | 36 | | 36 | 36 | | | | | | | | | |
| WBTb | 36 | LOBBY CAR SELECTION TUBE | 36 | 36 | | | | | | | | | |
| WBTc | 36 | | 36 | 36 | | | | | | | | | |
| WBTd | 36 | | 36 | 36 | | | | | | | | | |
| WTa | 39 | | 40 | 42 | | | | 11 | 23 | | | | |
| WTb | 39 | UPPER ZONE CAR SELECTION F-F | 42 | | | | | 23 | | | | | |
| WTc | 39 | | 42 | | | | | 23 | | | | | |
| WTd | 39 | | 42 | | | | | 23 | | | | | |
| WTTa | 39 | | 39 | 39 | | | | | | | | | |
| WTTb | 39 | UPPER ZONE CAR SELECTION TUBE | 39 | 39 | | | | | | | | | |
| WTTc | 39 | | 39 | 39 | | | | | | | | | |
| WTTd | 39 | | 39 | 39 | | | | | | | | | |
| WUS | 33 | UP GROUP DISPATCH TUBE F-F | 33 | 40 | | | | 40 | | | | | |
| XCSa | 44 | | 11 | 27 | 27 | 27 | 38 | 27 10 | 34 12 | 35 12 | 35 27 | 40 27 | 40 27 |
| XCSb | 44 | UNDER GROUP SUPERVISION SW. | 27 | 27 | 27 | | | 12 | 12 | 27 | 27 | 27 | 27 |
| XCSc | | | 27 | 27 | 27 | | | 12 | 12 | 27 | 27 | 27 | 27 |
| XCSd | | | 27 | 27 | 27 | | | 12 | 12 | 27 | 27 | 27 | 27 |
| XVO | ✳ | ZONE RETURN VOLTAGE | | | | | | 11 | 40 | | | | |
| ZVT0 | 21 | | 29 | | | | | | | | | | |
| ZVT4 | 21 | TIMER CATHODE | 22 | 22 | | | | | | | | | |
| ZVT5 | 21 | | 29 | | | | | | | | | | |
| ZVT9 | 21 | | 22 | 22 | | | | | | | | | |

FIG. 46c

WILLIAM HENRY BRUNS
ROBERT ANDRE COUTURIER
DOMINICK ANTHONY GHERSI
INVENTORS

BY [signature] ATTORNEY

✳SEE PATENT No. 2,589,242

United States Patent Office 2,960,187

Patented Nov. 15, 1960

2,960,187

ELEVATOR SYSTEM

William Henry Bruns, Lincolndale, and Robert André Couturier and Dominick Anthony Ghersi, New York, N.Y., assignors to Otis Elevator Company, New York, N.Y., a corporation of New Jersey Continuation of application Ser. No. 577,752, Apr. 12, 1956. This application July 18, 1958, Ser. No. 750,071

78 Claims. (Cl. 187—29)

The invention relates to group supervisory systems for elevators. This application is a continuation of the application of William Henry Bruns, Robert André Couturier and Dominick Anthony Ghersi, filed April 12, 1956, Serial No. 577,752, for Elevator System.

In plural elevator installations, up landing controls and down landing controls are provided at landings for registering landing calls, while each car is provided with controls for registering car calls. Stops are made at the landings for which calls are registered, the car calls being answered by the cars for which they are registered and the landing calls being answered by the first car travelling in the corresponding direction to reach the landings for which the calls are registered. In certain of these installations, especially those serving the larger type office buildings, the operation of the elevator cars is coordinated by dispatching mechanism to give the desired service to the building. As service demand conditions vary during the day, the operation of the cars is changed so as to provide service best suited for the particular conditions of operation. For example, in the morning when an office building is being populated, there is heavy up traffic, while in the evening when the building is being depopulated, there is heavy down traffic. Between these periods there is considerable traffic in both directions which may be equal, or predominate in one direction over the other. Also there are periods of light traffic as during the evening, or in the morning prior to the up peak.

Systems of elevator dispatching and control have been devised in which the operation is changed automatically to suit traffic conditions. Such systems, which are known as group supervisory systems, are especially suitable for installations in which the cars are operated without attendants.

Group supervisory systems are very complicated and utilize a large number of electromagnetic relays and other electromagnetically operated devices. Relays of a considerable number of contacts are often used in order to provide all the desired control operations, and sometimes a plurality of relays having their operating coils connected in parallel are utilized to provide the desired number of control contacts. Equipment of this nature takes up a large amount of space in the control room, so much so that space has become a serious factor. Weight is another factor and special provision is made to support this weight. Also, power consumption is considerable. In addition, the initial cost of the electromagnetic equipment, plus the assembly and installation costs, makes cost an important factor. Noise of operation is another factor.

Most of these group supervisory systems are tailored to the particular installation and while a considerable amount of the equipment and circuits are common to the installations, a considerable amount is variable to suit the requirements of the particular installation. This involves the addition or removal of electromagnetic relays and the change of relays to provide a different number of control contacts.

It is the object of the invention to provide a group supervisory system for elevators for which the control equipment is of relatively light and compact construction, is economical in installation and operation, and which lends itself readily to changes in circuits to accommodate various installation requirements.

The invention involves a group supervisory system for elevators utilizing electronic circuits and equipment. Features and advantages of the invention will become apparent from the following description and appended claims.

Figure 3:
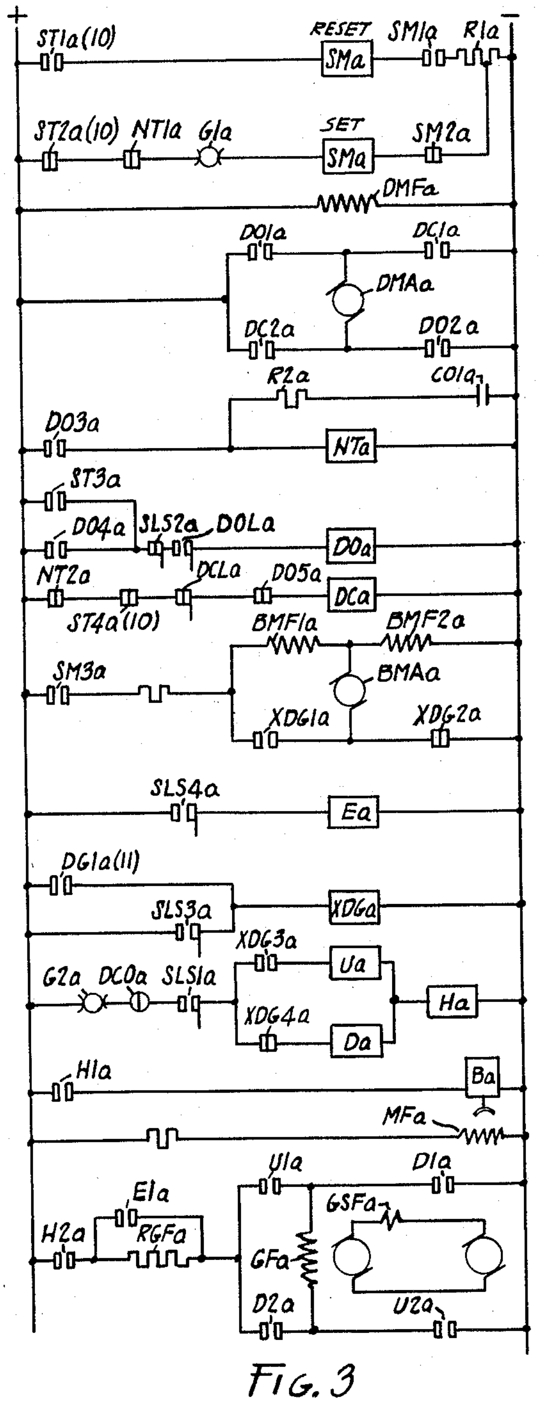
Figure 3 is a simplified schematic wiring diagram of the hoisting motor and door motor control circuits for one elevator.
Figure 3A:
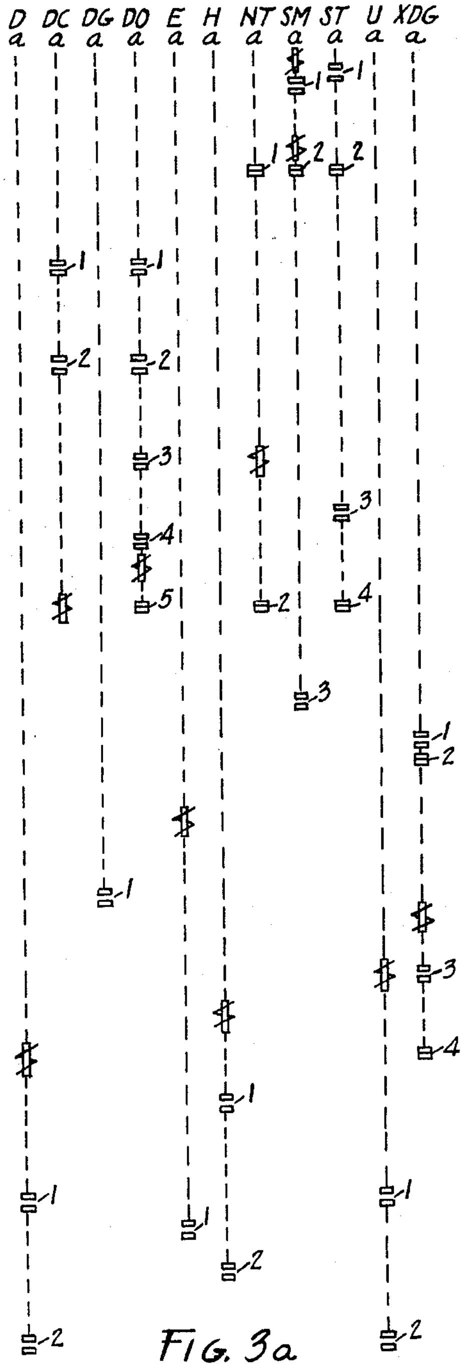
Figure 4:
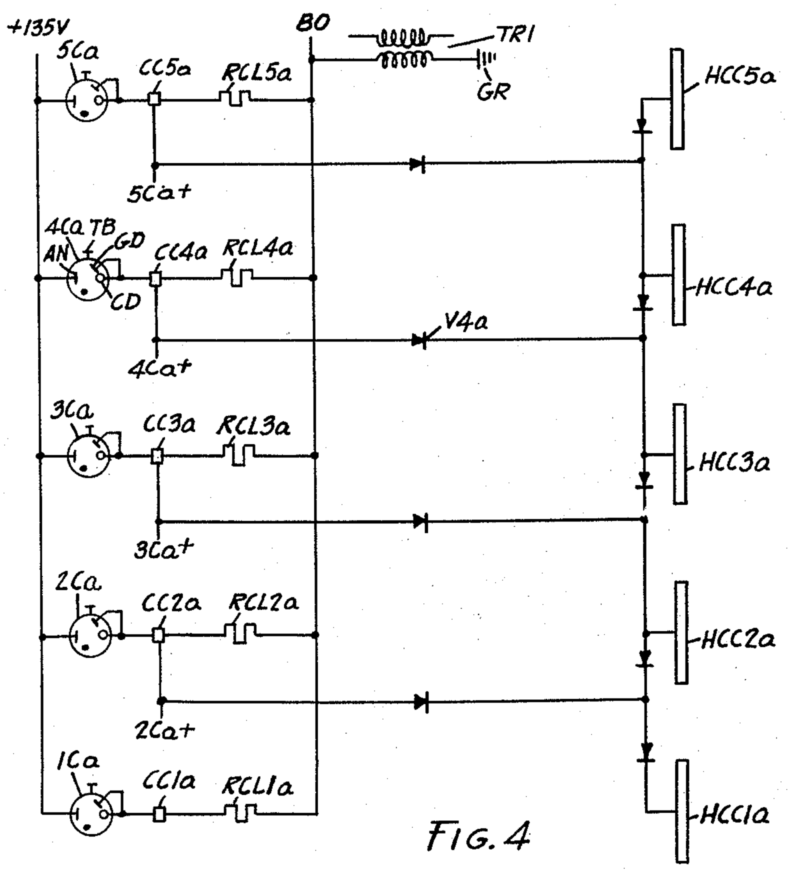
Figure 5:
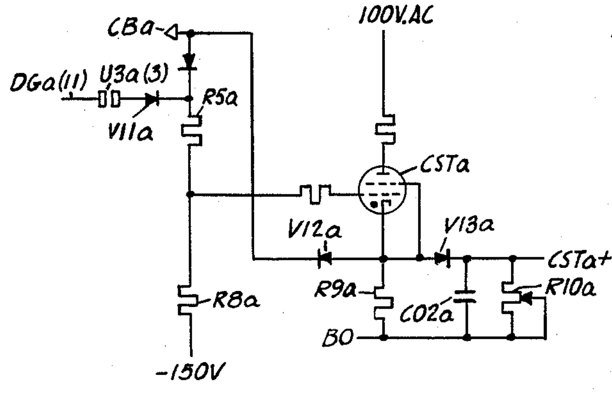
Figure 6:
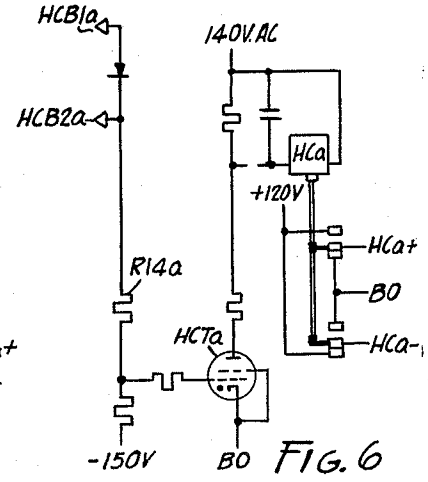
Figures 10, 11:
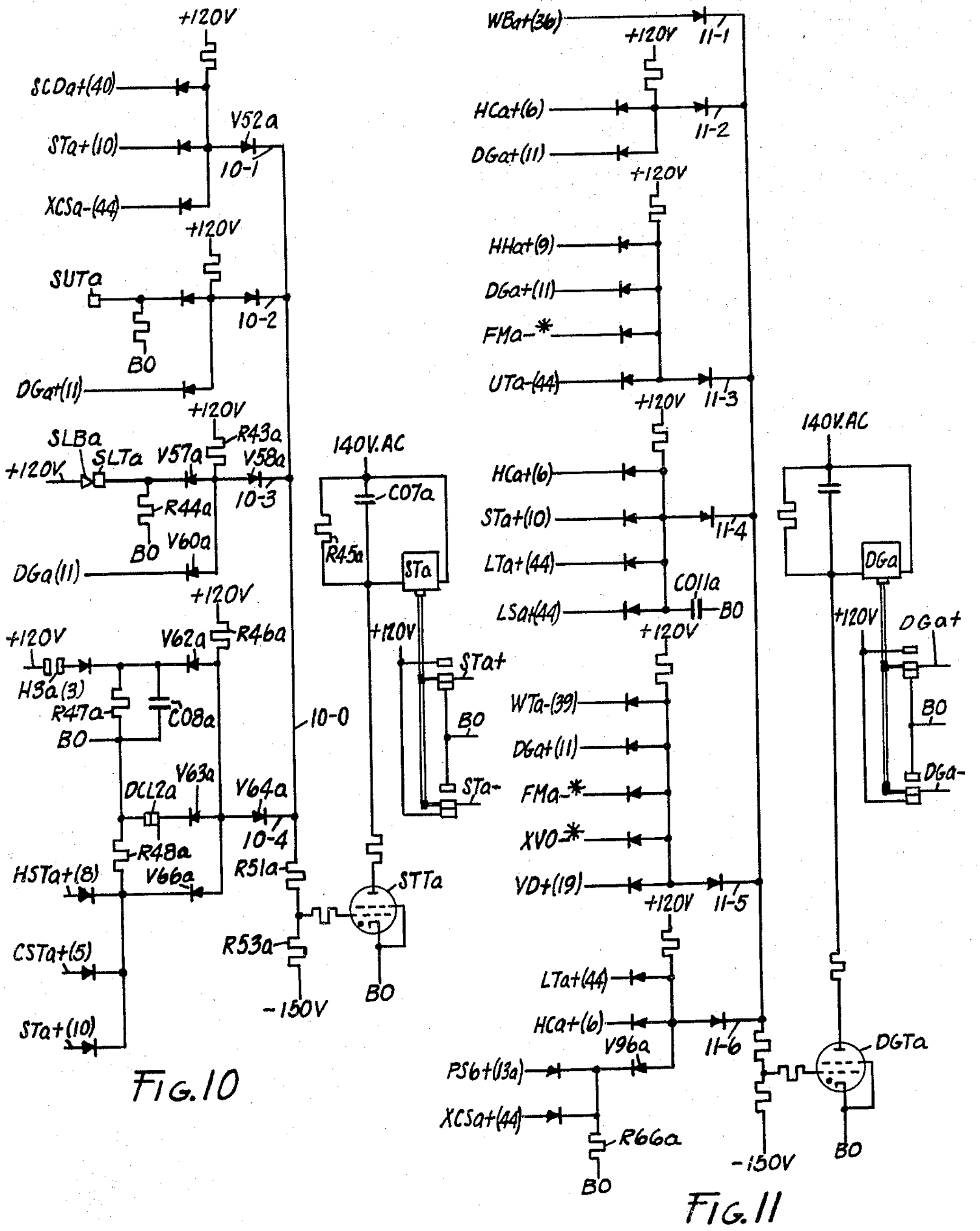
Figure 12:
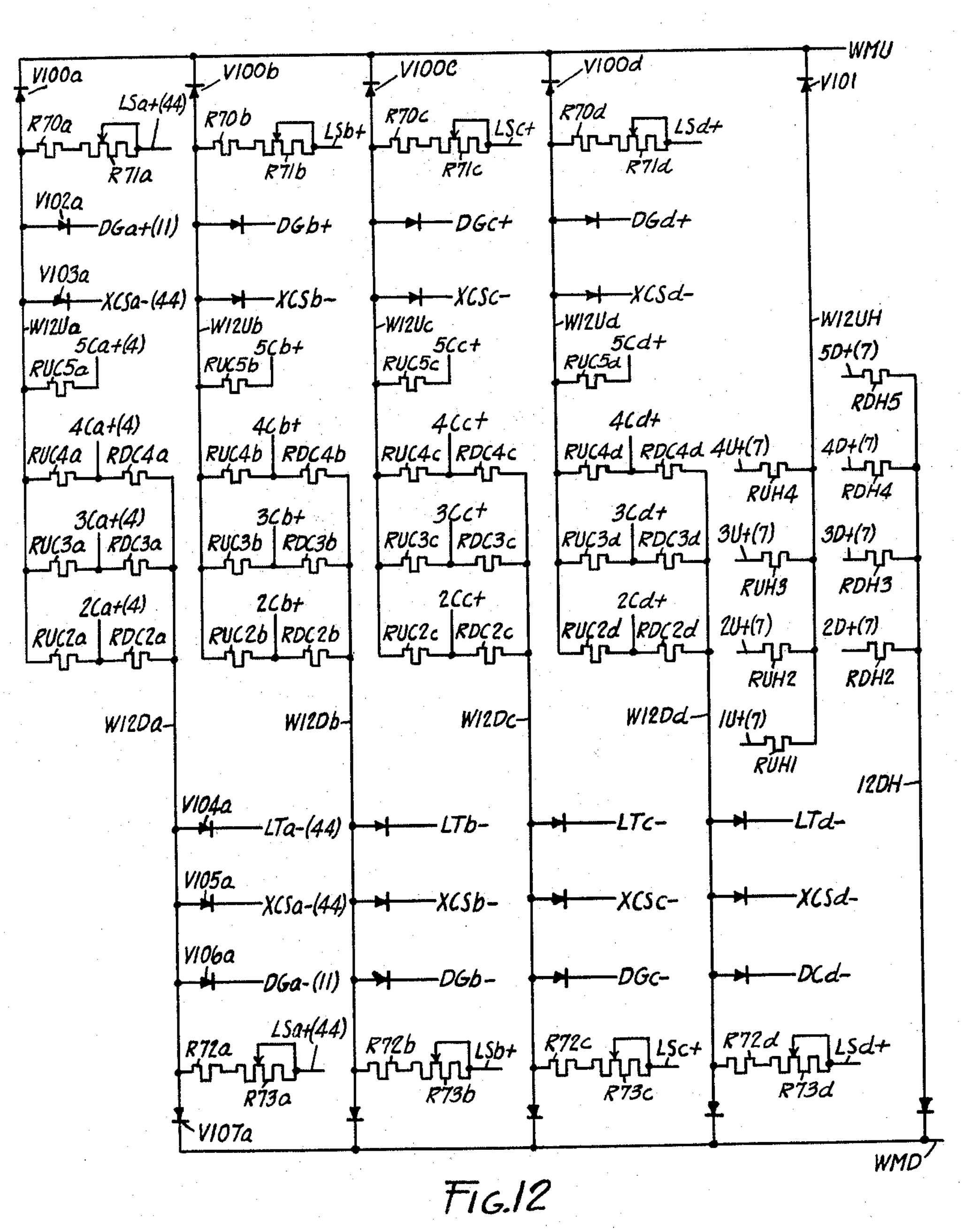
Figures 13A, 13B, 13C:
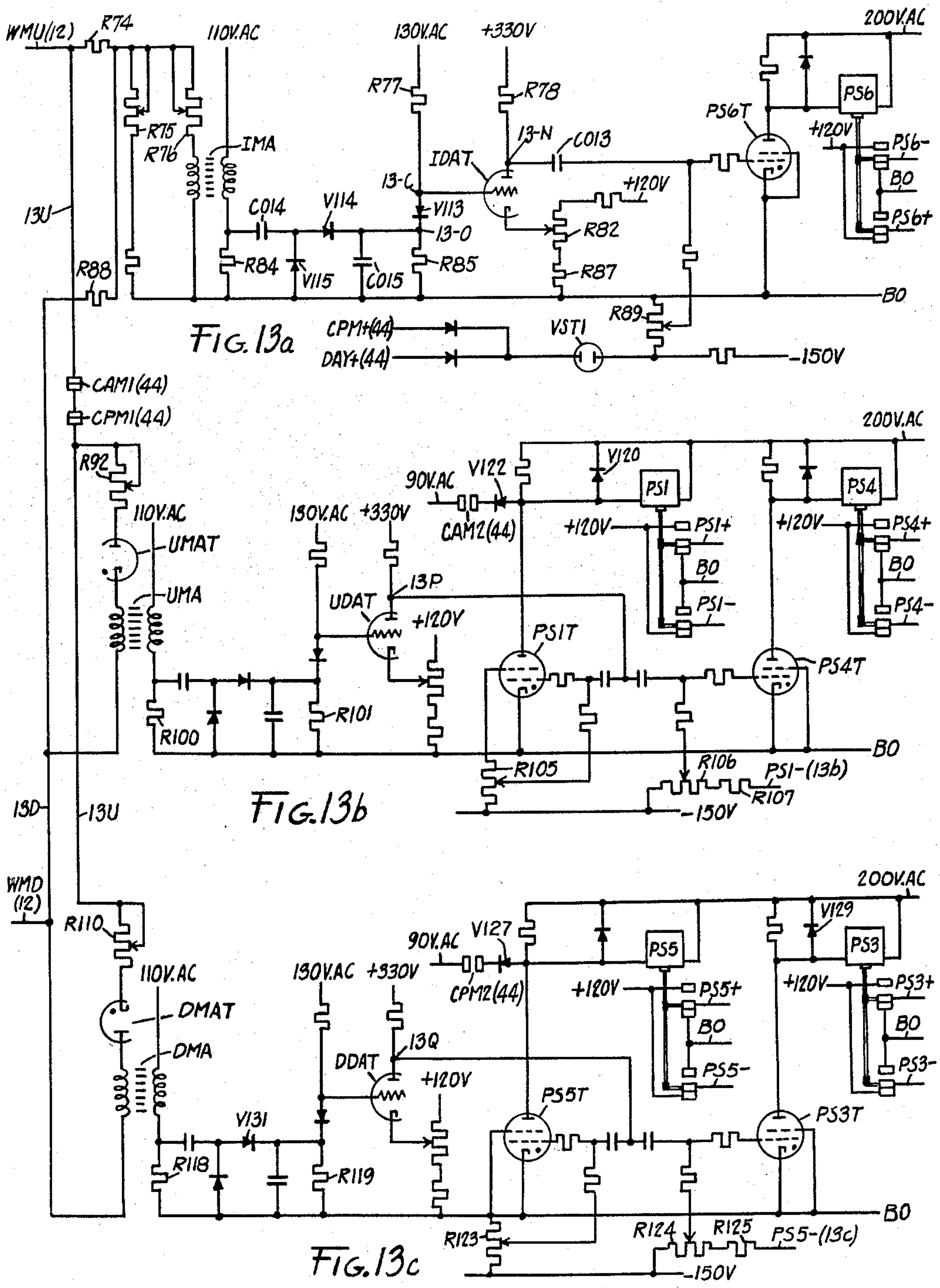
Figure 14:
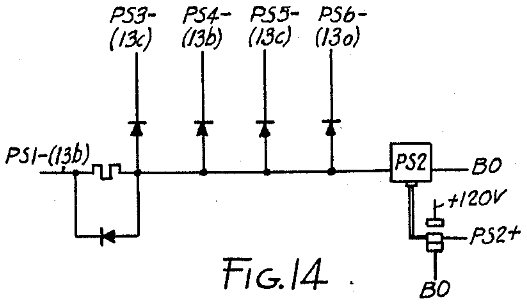
Figure 15:
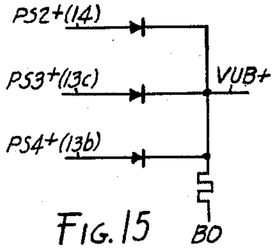
Figure 16:
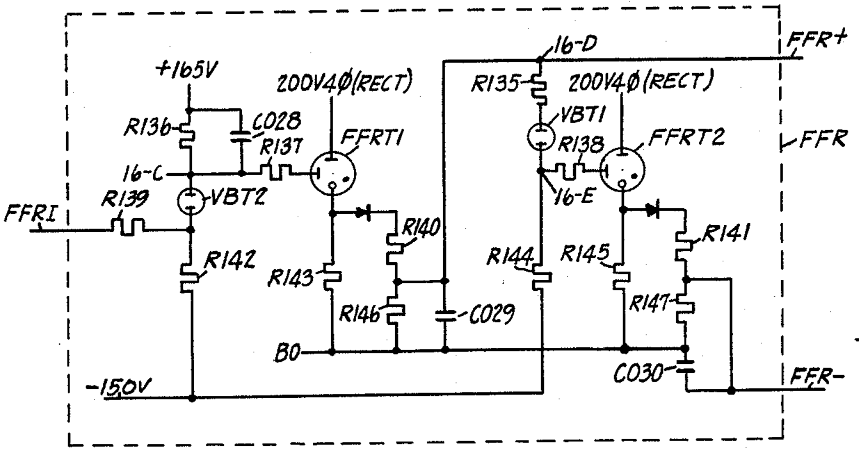
Figure 16A:
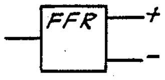
Figure 18:
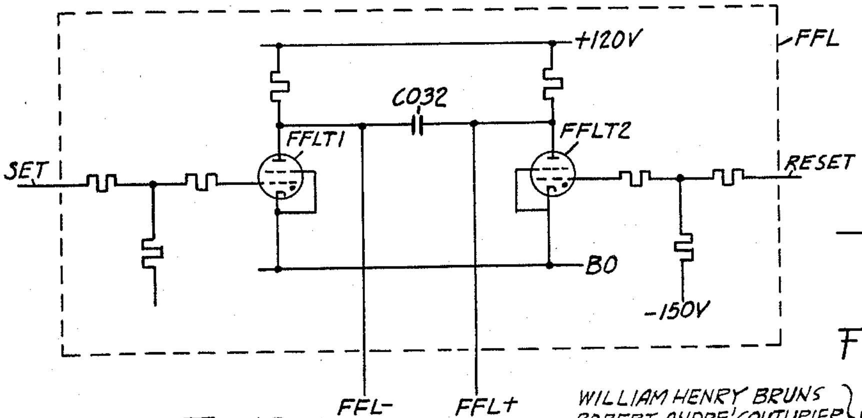
Figure 18A:
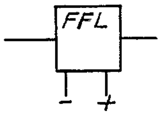
Figure 17:
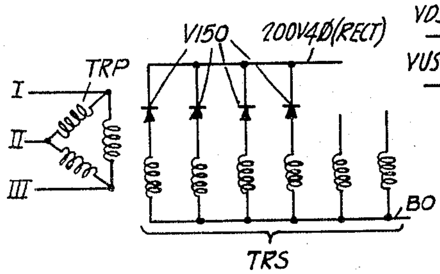
Figure 17A:
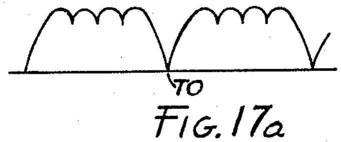
Figure 19:
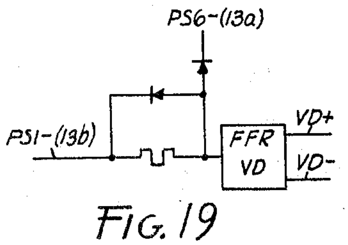
Figure 22:
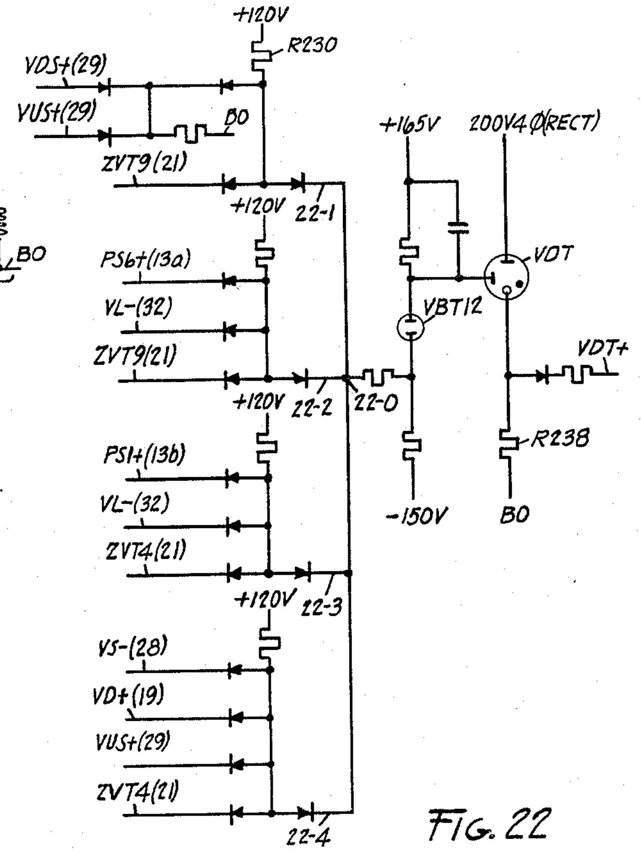
Figure 23:
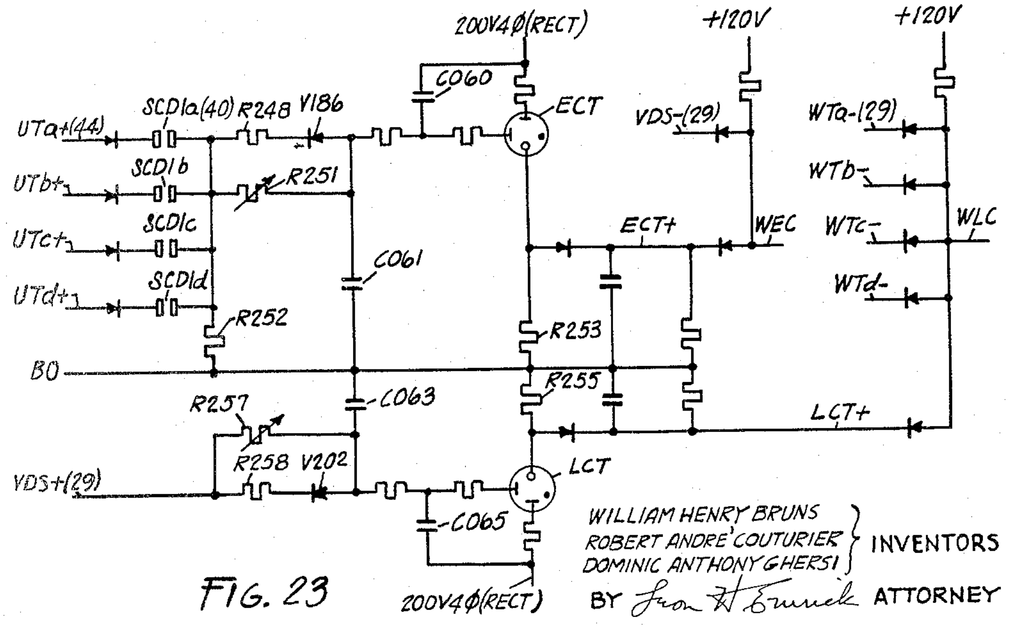
Figure 20:
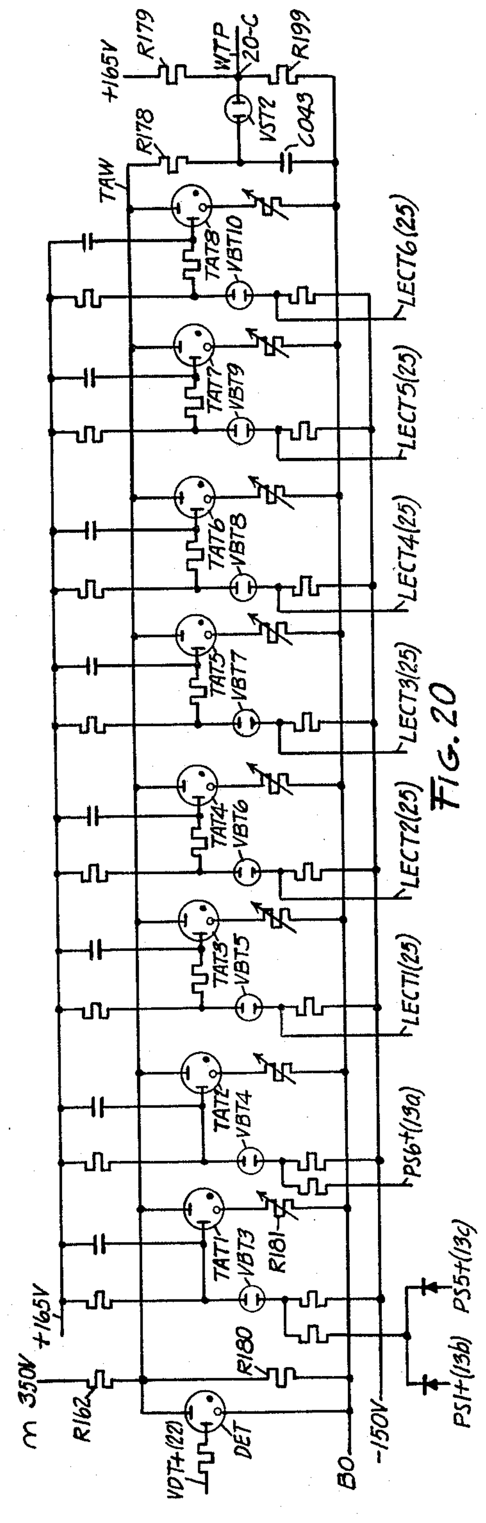
Figure 21:
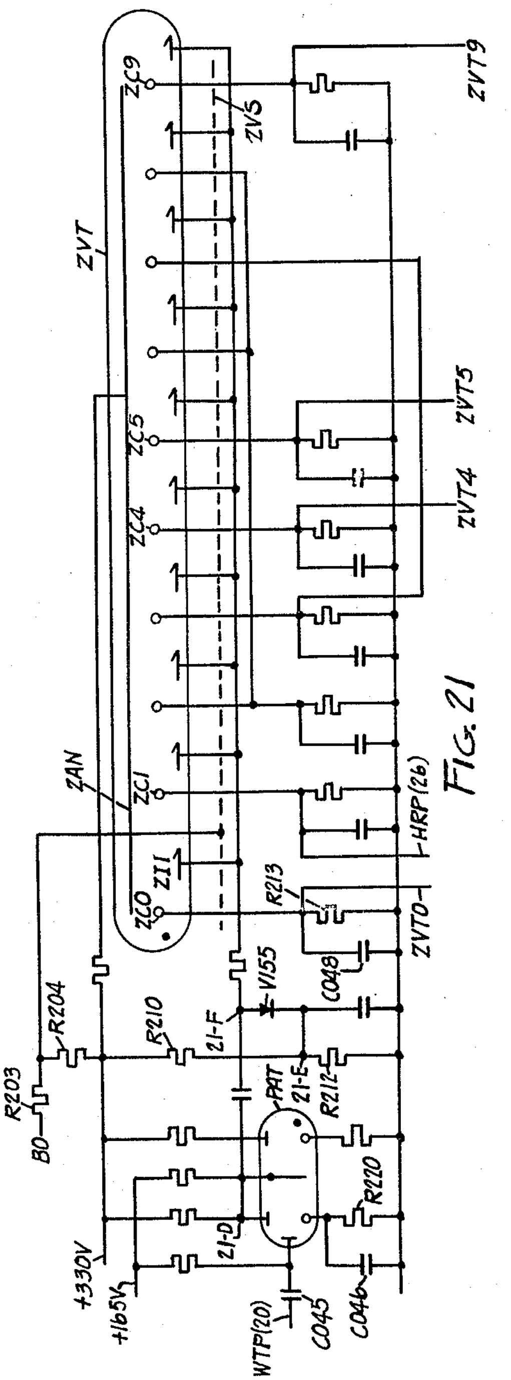
Figure 24:
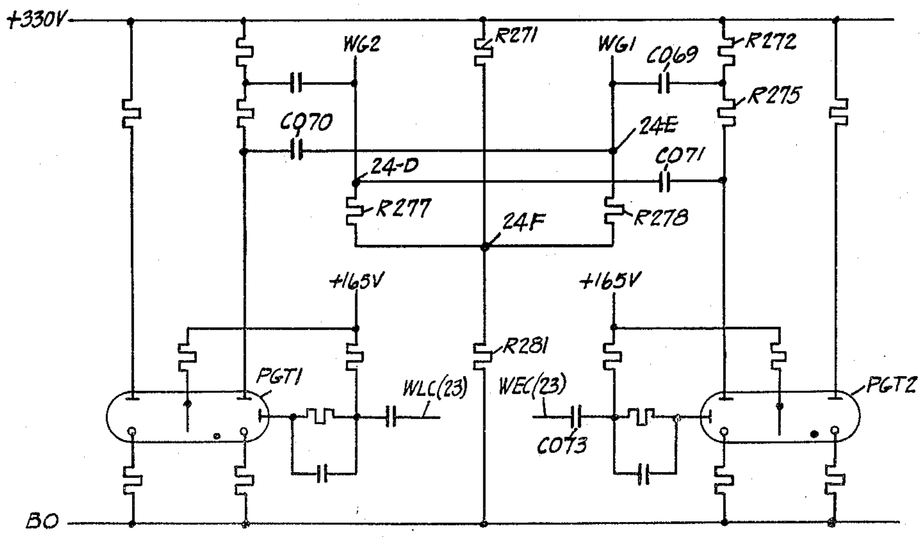
Figure 25:
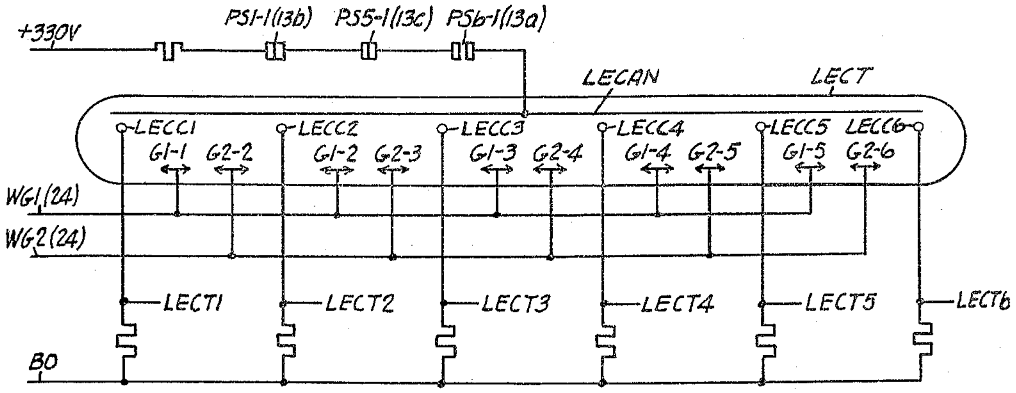
Figure 26:
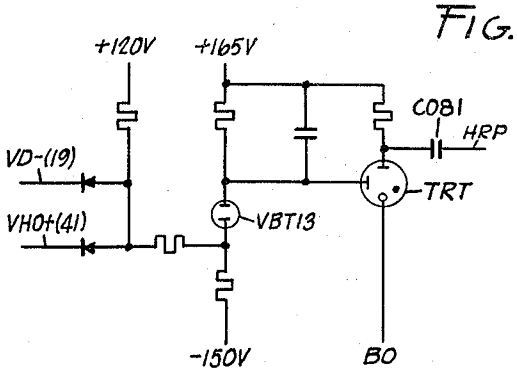
Figure 27:
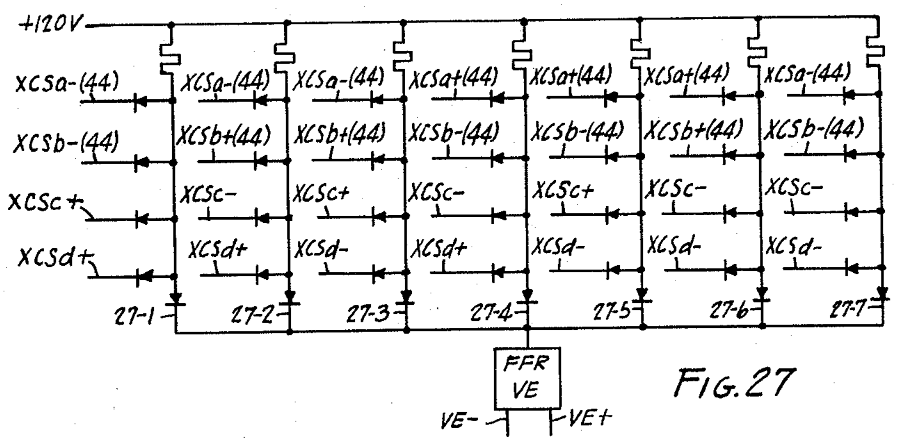
Figures 28, 29, 30:
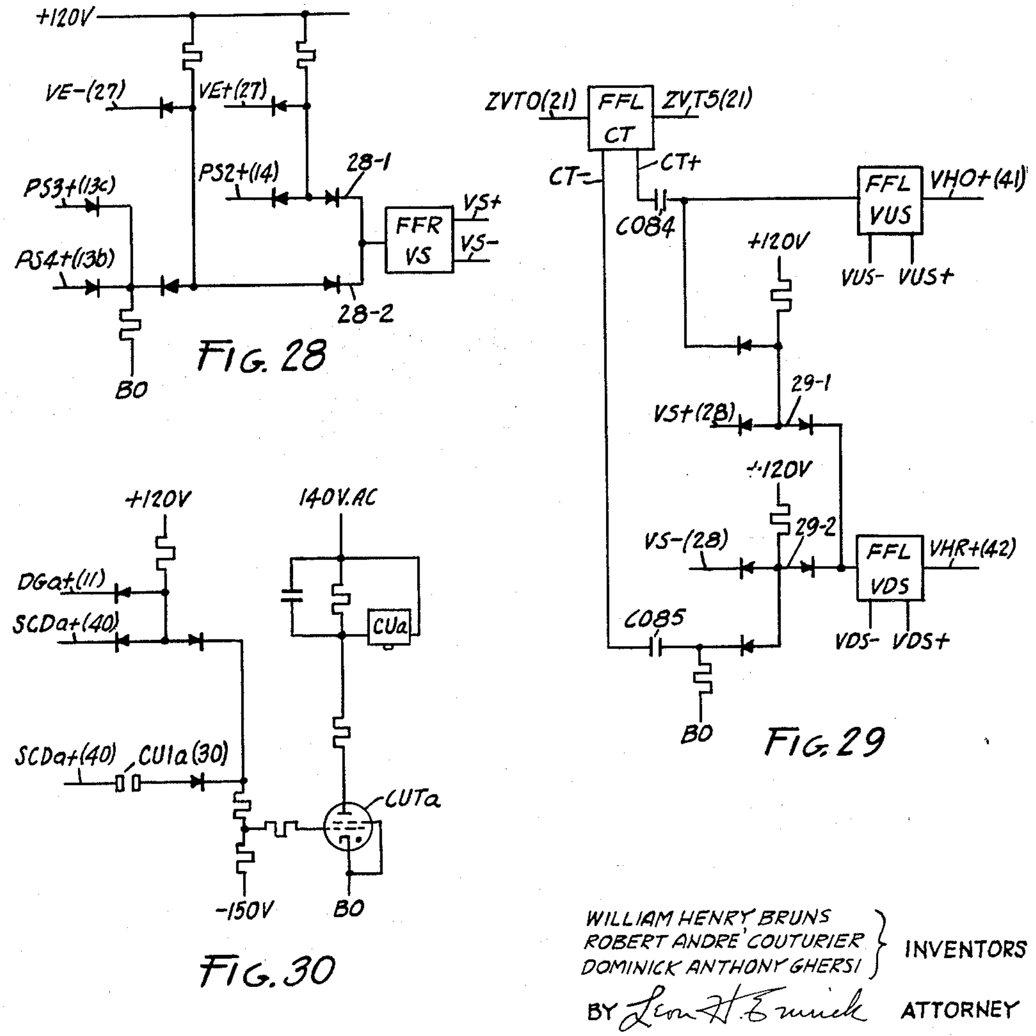
Figures 31, 33, 34:
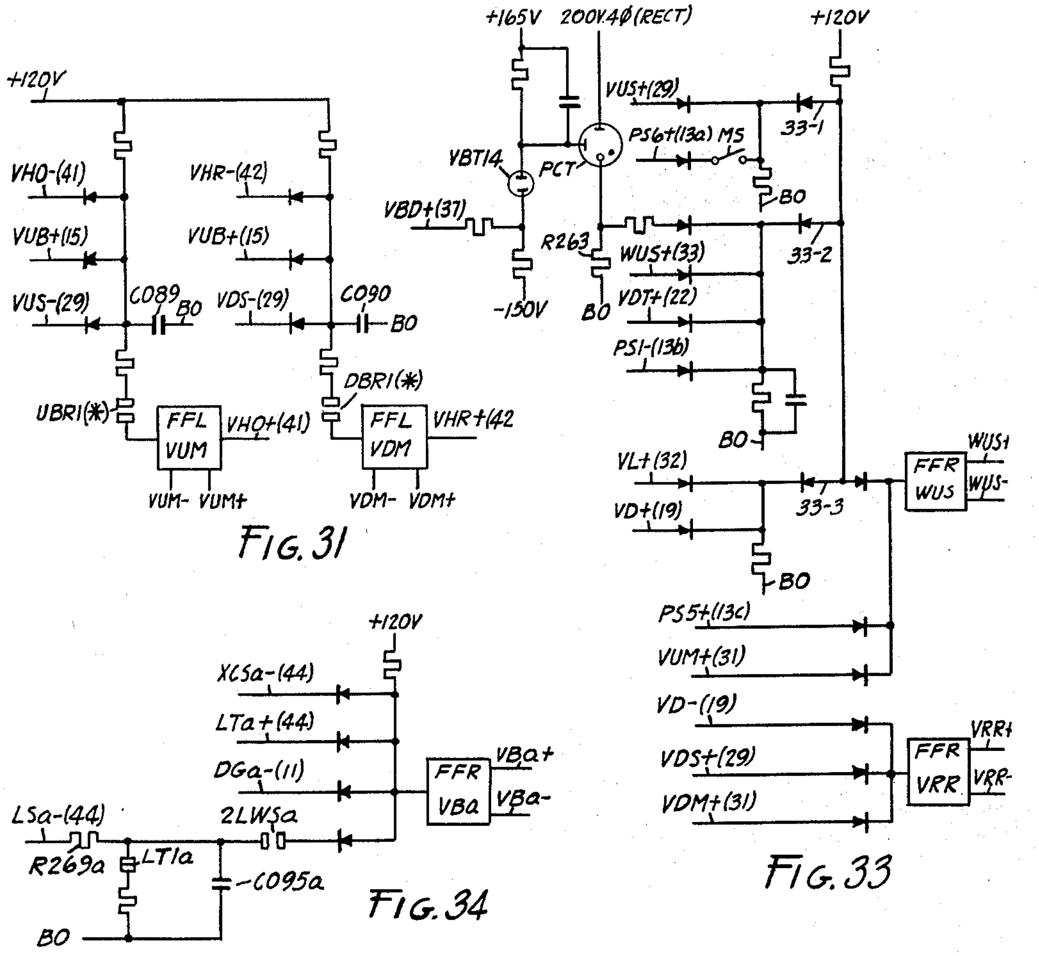
Figure 32:
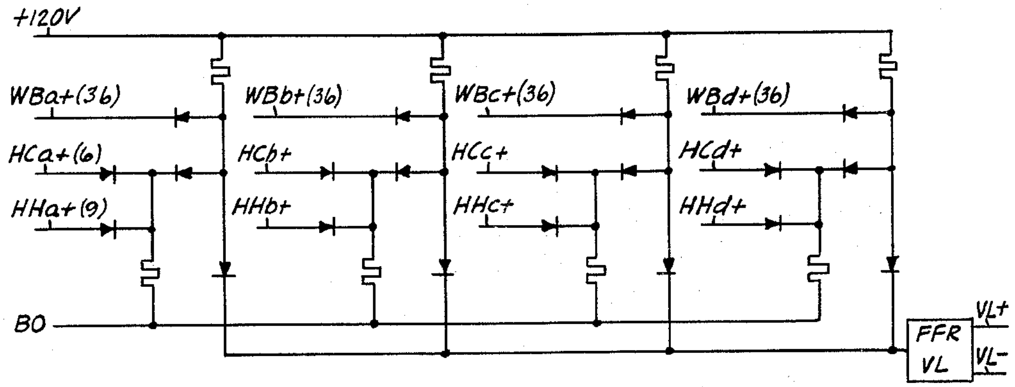
Figures 35, 37, 38, 40:
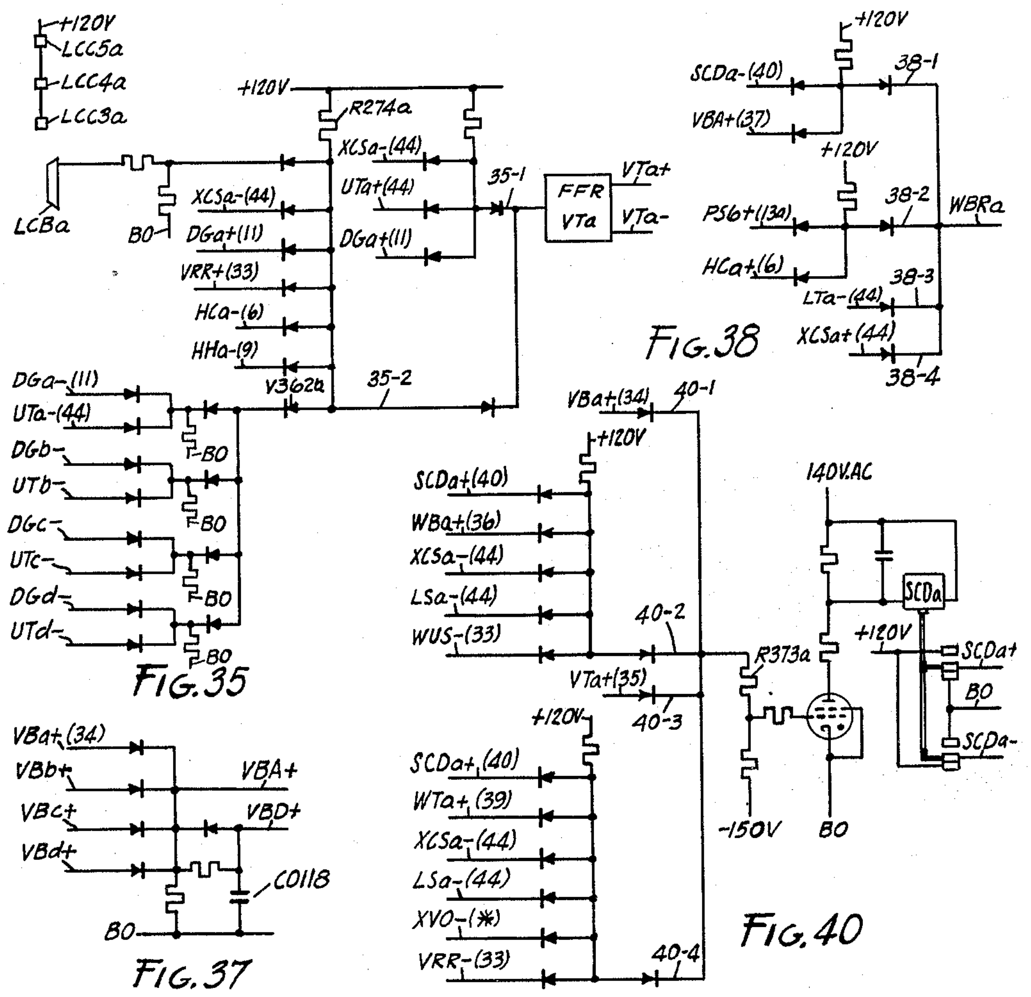
Figure 41:
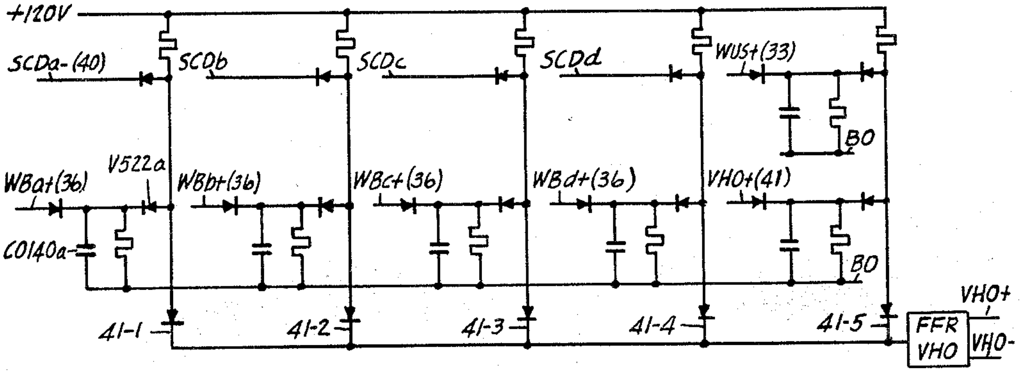
Figure 36:
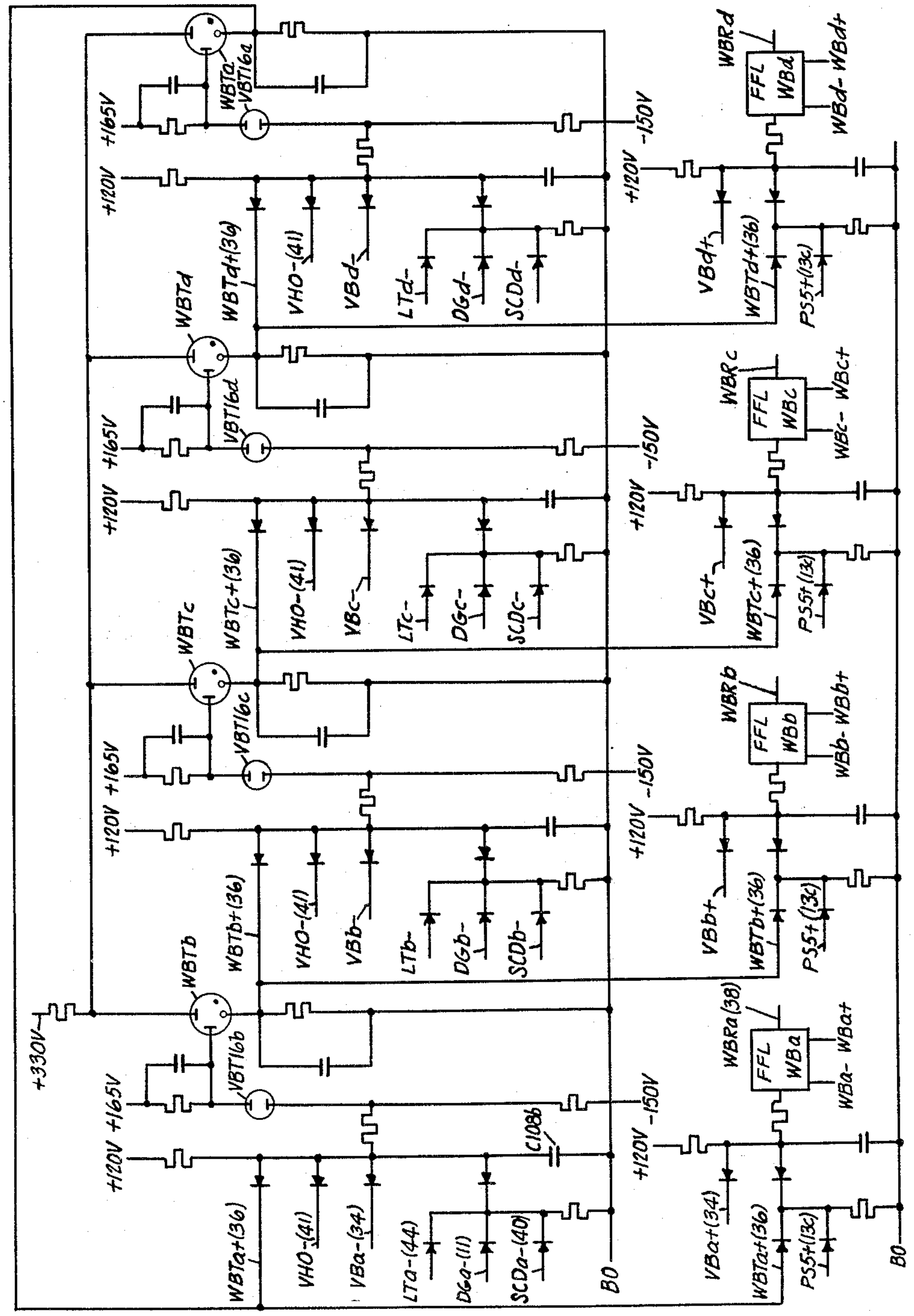
Figure 39:
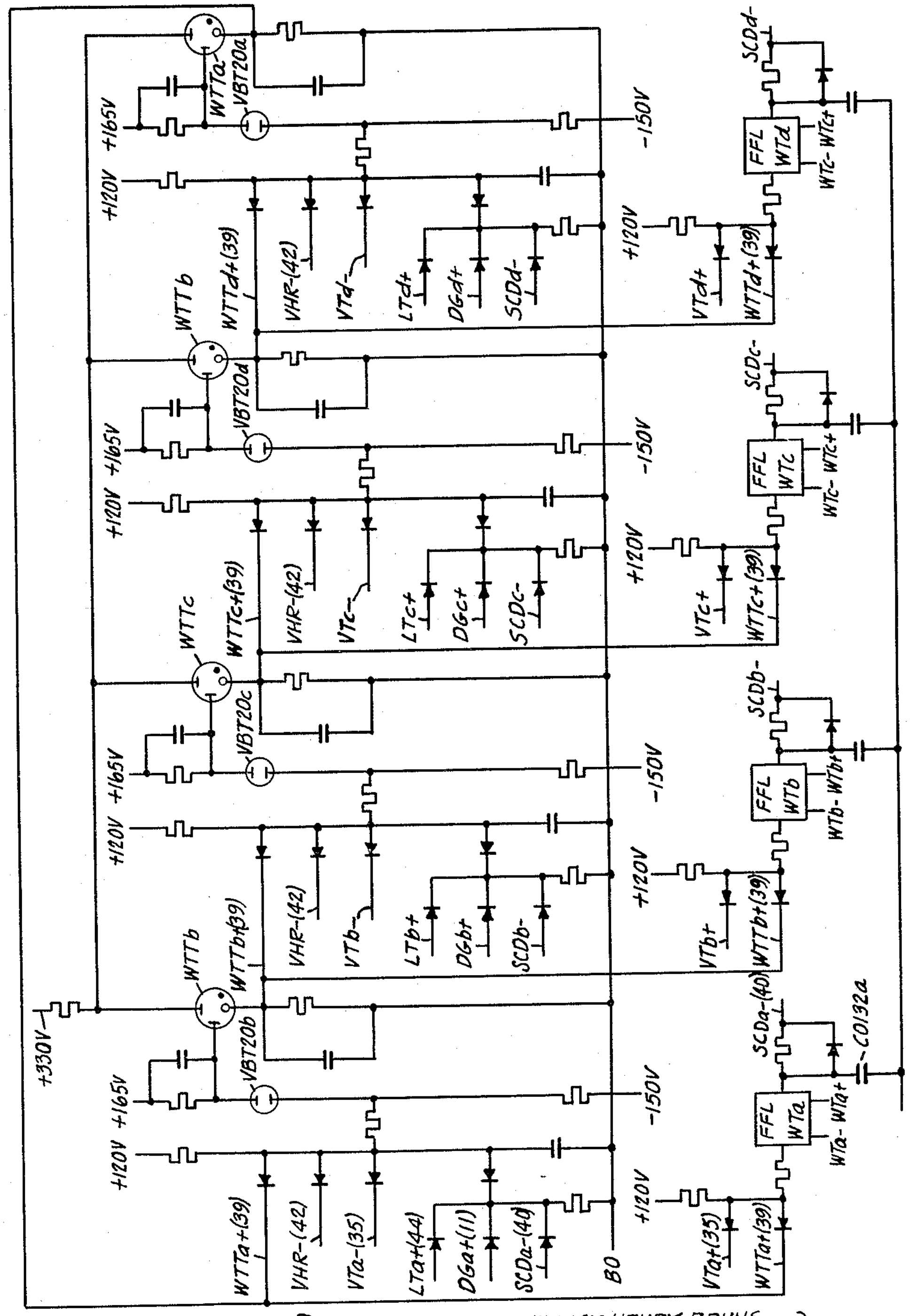
Figure 42:
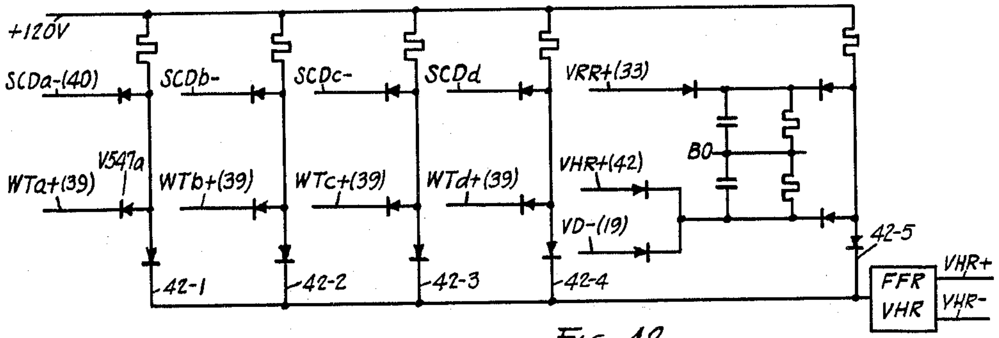
Figure 44:
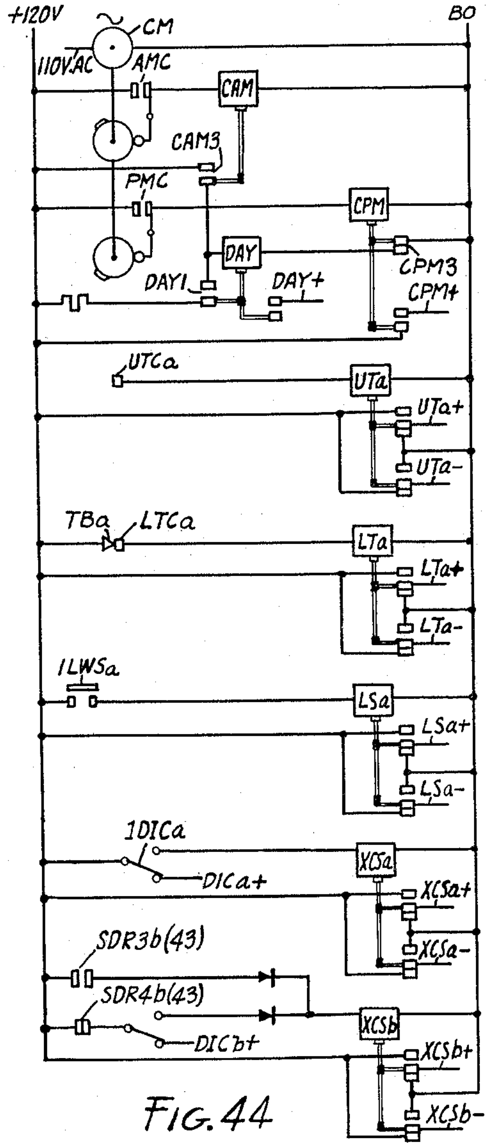
Figure 43:
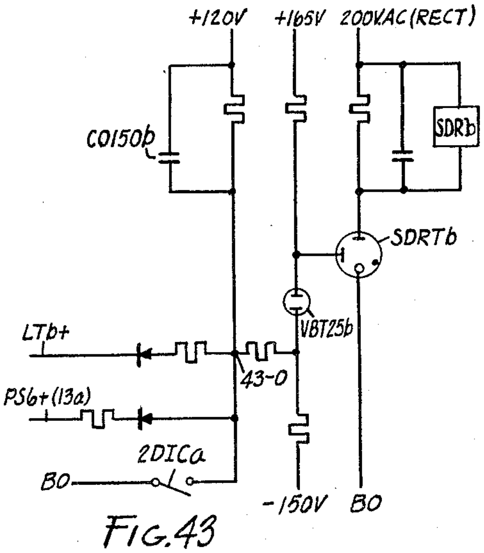
Figure 43A:
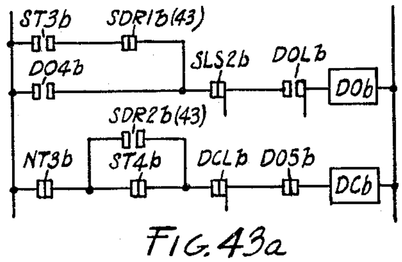
Figure 45:
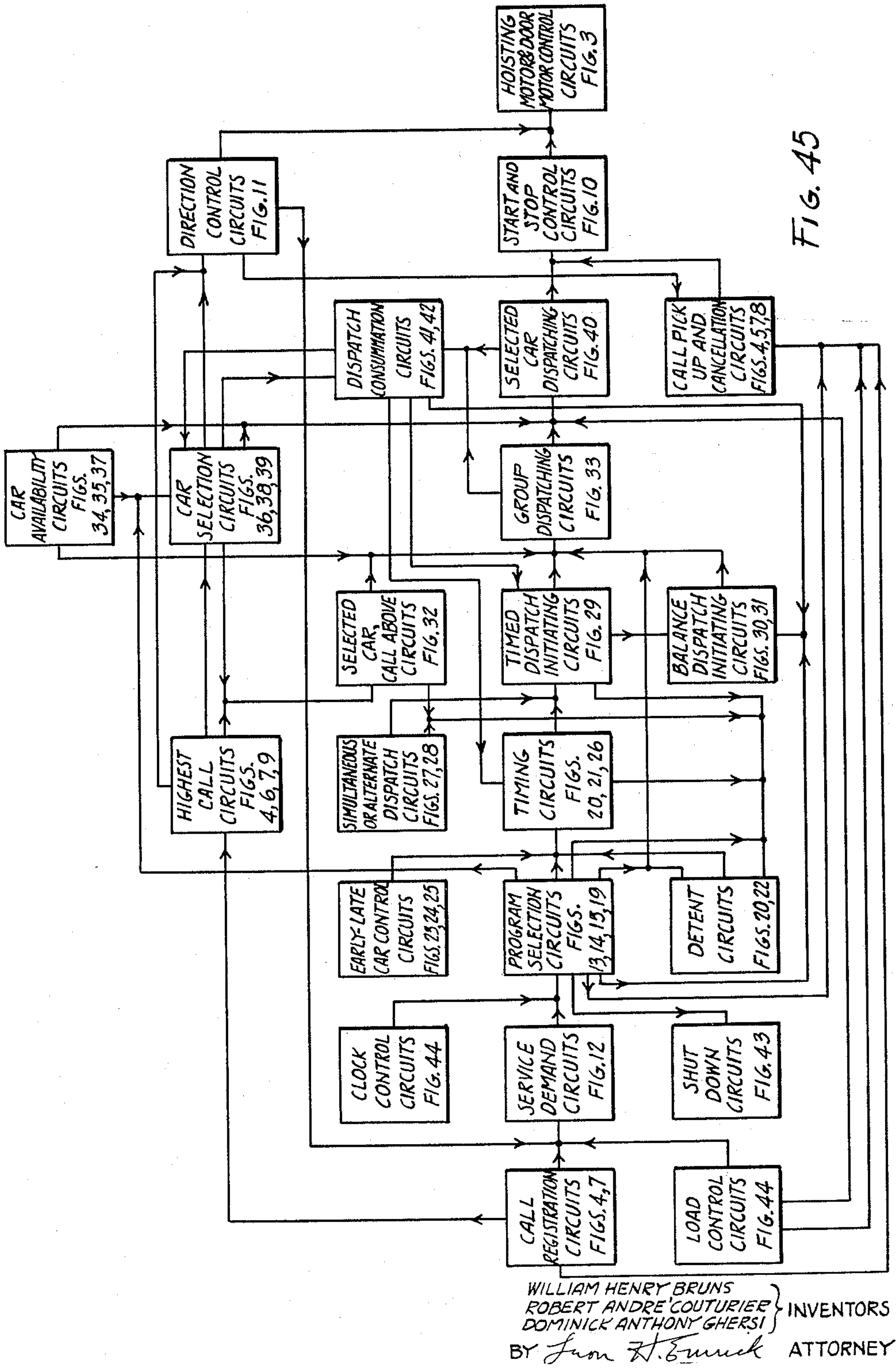

Figure 3*a* is a key sheet showing the electromagnetic switches of Figure 3 in spindle form to enable the coils and contacts of these switches to be readily located in Figure 3;

Figure 4 is a schematic wiring diagram of car call registration circuits for one elevator;

Figure 5, taken along with Figure 4, is a schematic wiring diagram of car call pickup and cancellation circuits for one elevator;

Figure 6, taken along with Figure 4, is a schematic wiring diagram of highest car call circuits for one elevator;

Figure 7 is a schematic wiring diagram of landing call registration circuits;

Figure 8, taken along with Figure 7, is a schematic wiring diagram of landing call pickup and cancellation circuits for one elevator;

Figure 9, taken along with Figure 7, is a schematic wiring diagram of highest landing call circuits for one elevator;

Figure 10 is a schematic wiring diagram of start and stop control circuits for one elevator;

Figure 11 is a schematic wiring diagram of direction control circuits for one elevator;

Figure 12 is a schematic wiring diagram of service demand circuits;

Figures 13*a*, 13*b* and 13*c* are a schematic wiring diagram of program selection circuits;

Figure 14 is a schematic wiring diagram of further program selection circuits;

Figure 15 is a schematic wiring diagram of further program selection circuits;

Figure 16 is a schematic wiring diagram of a flip-flop utilized in certain of the circuits;

Figure 16*a* is a symbol used to indicate the flip-flop of Figure 16 in the circuits in which it occurs;

Figure 17 is a schematic representation of a four phase rectified source of voltage employed in certain of the circuits;

Figure 17*a* is a representation of the wave form of the voltage provided by the source of Figure 17;

Figure 18 is a schematic wiring diagram of another form of flip-flop utilized in certain of the circuits;

Figure 18*a* is a symbol used to indicate the flip-flop of Figure 18 in the circuits in which it occurs;

Figure 19 is a schematic wiring diagram of further program selection circuits;

Figure 20 is a schematic wiring diagram of pulsing circuits;

Figure 21, taken along with Figure 20, is a schematic wiring diagram of circuits for providing timing intervals for dispatching;

Figure 22, taken along with Figure 20, is a schematic wiring diagram of detent circuits;

Figure 23 is a schematic wiring diagram of early-late car determining circuits;

Figure 24 is a schematic wiring diagram of pulse generating circuits utilized in the early-late car control circuits;

Figure 25 is a schematic wiring diagram of circuits for a multi-cathode tube in the early-late car circuits, controlled by the circuits of Figure 24 and utilized to control the pulsing circuits of Figure 20;

Figure 26 is a schematic wiring diagram of further circuits for controlling the circuits of Figure 21;

Figure 27 is a schematic wiring diagram of circuits for registering whether an odd or even number of cars is under group supervision;

Figure 28 is a schematic wiring diagram of circuits for determining whether the cars are to be dispatched on up trips and down trips simultaneously or alternately;

Figure 29 is a schematic wiring diagram of timed dispatch initiating circuits;

Figure 30 is a schematic wiring diagram of car direction circuits for one elevator;

Figure 31 is a schematic wiring diagram of balance dispatch initiating circuits;

Figure 32 is a schematic wiring diagram of selected car, call above circuits;

Figure 33 is a schematic wiring diagram of group dispatching circuits;

Figure 34 is a schematic wiring diagram of circuits for one elevator for registering availability of the car for up dispatching;

Figure 35 is a schematic wiring diagram of circuits for one elevator for registering availability of the car for down dispatching;

Figure 36 is a schematic wiring diagram of circuits for selecting the cars for up dispatching;

Figure 37 is a schematic wiring diagram of further circuits involving car availability for up dispatching;

Figure 38 is a schematic wiring diagram of further circuits for one elevator relating to the selection of the cars for up dispatching;

Figure 39 is a schematic wiring diagram of circuits for selecting the cars for down dispatching;

Figure 40 is a schematic wiring diagram of selected car dispatching circuits for one elevator;

Figure 41 is a schematic wiring diagram of up dispatch consummation circuits;

Figure 42 is a schematic wiring diagram of down dispatch consummation circuits;

Figure 43 is a schematic wiring diagram of motor generator shut down control circuits for one elevator;

Figure 43*a* is supplementary to Figure 43;

Figure 44 is a schematic wiring diagram of circuits for certain controls utilized in certain of the circuits of previously mentioned figures;

Figure 45 is a block diagram indicating connections of the circuits of the various figures of wiring diagram; and Figures 46*a*, 46*b* and 46*c* provide an index for circuits other than those of Figure 3 from which the location of source voltages and the application of these source voltages in the wiring diagrams can be readily ascertained.

Figure 1:
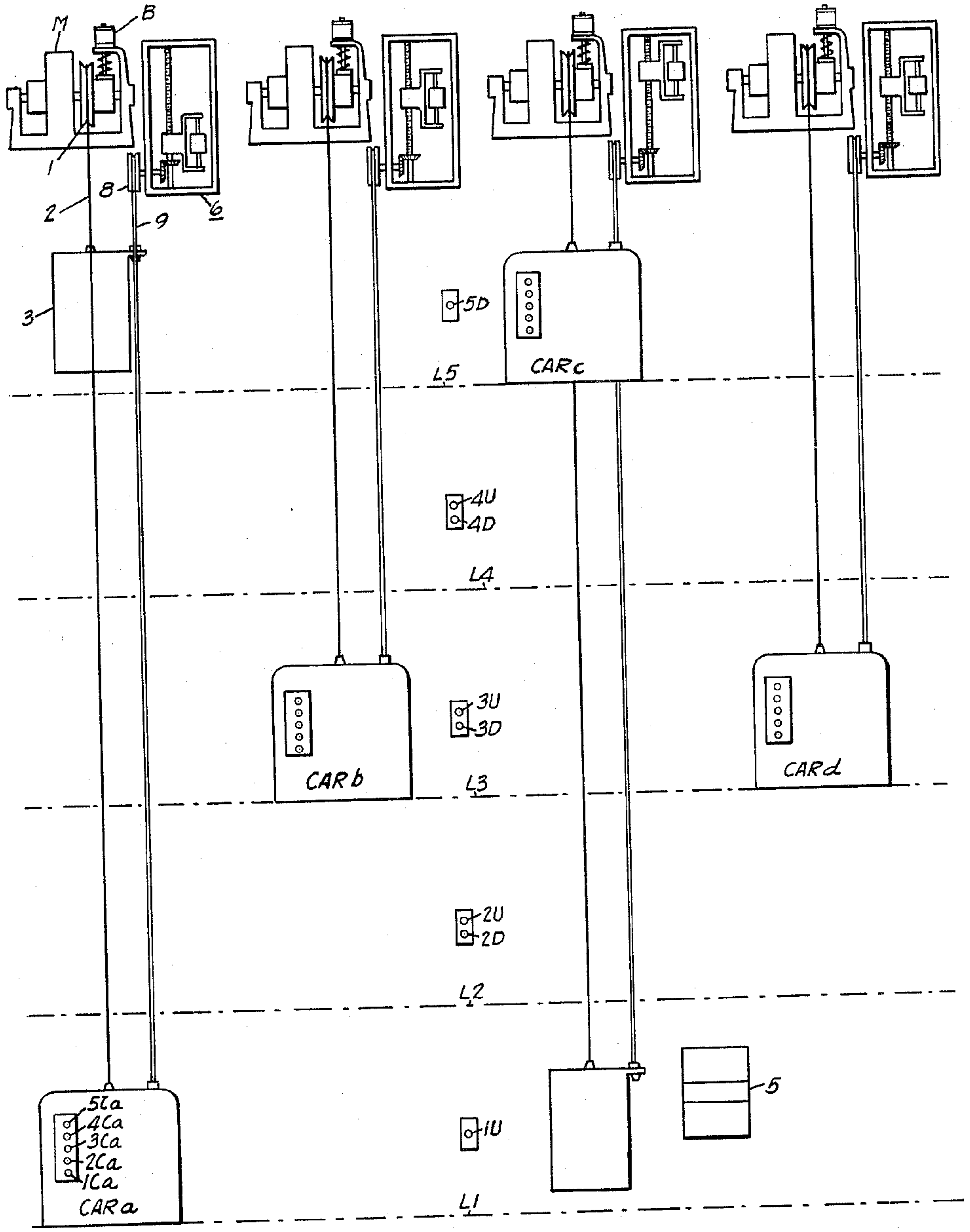
Figure 1 is a schematic representation of an elevator installation of four cars as illustrative of an installation to which the invention is applicable.

For a general understanding of the invention, reference may be had to Figure 1, wherein various parts of the system chosen to illustrate the principles of the invention are schematically shown. A four car, five floor installation has been illustrated, the arrangement being the same for each elevator. Each car (*a*, *b*, *c*, *d*) is raised and lowered by means of a hoisting motor M, which motor drives a traction sheave 1 over which pass hoisting ropes 2 for the car and counterweight 3. An electromagnetic brake B is provided and is applied to effect the final stopping operation and to hold the car when at rest. Each elevator car is provided with a car operating panel

4 on which are located a plurality of controls C, one for each floor L, hereinafter termed car buttons, for registering car calls. These buttons are individual to the elevators and are shown for one elevator in Figure 4. Controls are provided at the floors to enable intending passengers to register landing calls, an up control U and a down control D being provided at each intermediate floor and one control at each terminal floor. These landing call registering controls, which will hereinafter be termed landing buttons, are common to the cars and are shown in Figure 7. Manually operable in-service switches are provided on a panel 5 at the starter's station, usually at the lower terminal floor. This panel may also have other switches and signals and indicating devices, not shown.

Figure 2:
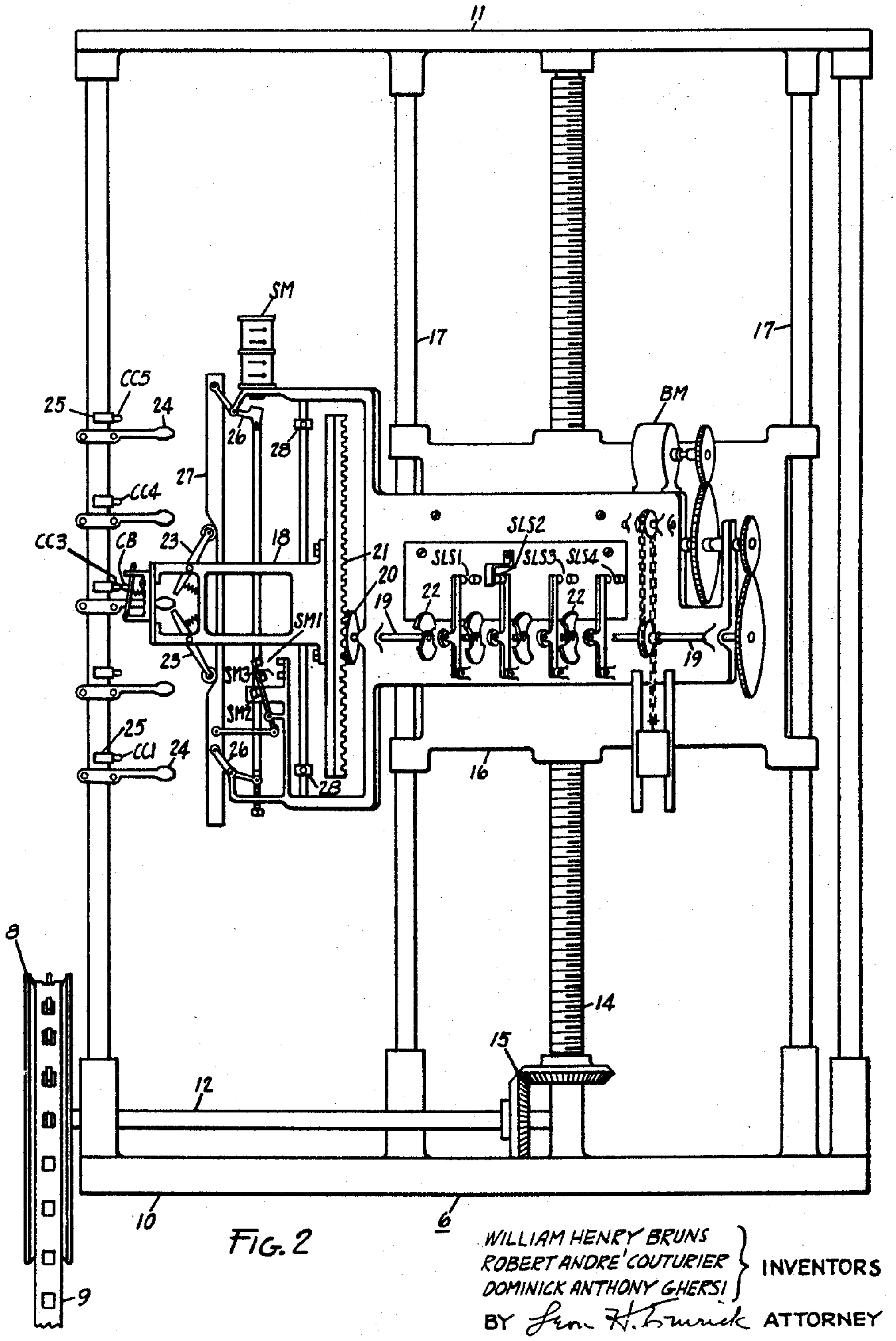
Figure 2 is a schematic representation of a selector machine used for each of the elevator cars.

Mechanism actuated in accordance with movement of the elevator car is utilized in the circuits of each elevator. Such mechanism may be in the form of a selector machine 6 as indicated in Figure 1. The selector machine is driven preferably by means of a steel tape 9 attached to the car and counterweight and having teeth formed thereon for engaging teeth on the selector driving wheel 8. An understanding of a selector machine suitable for use in the control system may be had from the schematic illustration of such a machine in Figure 2, the machine being considerably simplified to go with the simplified control circuits of Figure 3.

The selector machine comprises a frame formed by a base plate 10 and a top plate 11 supported from the base plate by standards. The operating shaft 12 for the selector machine is rotatably supported on the base plate 10. The toothed tape 9 meshes with the toothed driving wheel 8 which is secured to the outer end of shaft 12 to drive the machine. A vertical screw 14 is driven by shaft 12 through the intermediary of bevel gears 15. The vertical screw 14 drives a crosshead 16 guided in its vertical movement by guide bars 17. With this arrangement the crosshead is moved in accordance with the movement of the elevator car.

The crosshead carries a carriage 18 upon which is mounted mechanism for causing slowdown to begin at a certain distance from the floor for which a call has been picked up and for causing the car to be brought to a stop as it arrives at the floor. The carriage is advanced from a neutral position with respect to the crosshead incident to starting the car. This advance is effected by means of a torque motor which will be hereinafter termed the brush motor and designated BM. The brush motor acts through a chain of gears to rotate a shaft 19. On the end of this shaft is a gear 20 which meshes with a rack 21 to move the carriage either up or down depending upon the direction of rotation of the shaft, thereby advancing the carriage. The brush motor in advancing the carriage also effects the engagement of the contacts of selector switches SLS1, SLS3 and SLS4 and the separation of the contacts of selector switch SLS2, these switches being operated by cams 22 arranged on shaft 19. If a call is not picked up during the advance of the carriage, the carriage is brought to a stop by one or the other of stopping collars 28. The brush motor remains energized so that the carriage is thereafter moved with the crosshead until a call is picked up.

The carriage is returned to neutral position by means of pawls 23 which are spring biased to extended position for engaging stopping lugs 24. There are two pawls, one effective for up car travel and the other for down car travel. These pawls are carried by the carriage. A stopping lug is provided for each floor and is arranged on a floor bar 25, these floor bars being arranged on supporting standards for top plate 11 on which they are spaced in accordance with the distance between the floors for which the lugs are provided. An electromagnet is provided for controlling the extension and retraction of the pawls. This magnet, termed a stopping magnet and designated SM, is carried by the crosshead. The stopping magnet has two coils, one an operating or set coil and the other a reset coil. Upon energization of the set coil, bell crank levers 26 are pulled upwardly to cause a cam 27 to be extended outwardly to push rollers on the ends of the pawls in a direction to force the pawls into retracted positions. In moving outwardly the cam acts through a link to pull a contact lever clockwise about its pivot to close a switch having three pairs of contacts, one pair SM3 of which controls the energization of motor BM. Thus the pawls are released from the stopping collar for the floor at which the car is stopped before the brush motor is energized to advance the carriage. The stopping magnet and its switch contacts are included in the spindle sheet (Figure 3*a*) to enable them to be readily located in the wiring diagram.

When a call is picked up, the reset coil of the stopping magnet is energized. This neutralizes the operating coil, releasing cam 27 to permit the pawls to be extended for cooperation with the stopping lug for the floor for which the call is registered and to cause opening of contacts SM3 to deenergize the brush motor. This may occur either during the advance of the carriage, in which event the advance is immediately stopped, or after the carriage has been fully advanced, in which event the carriage remains in advanced condition with respect to the crosshead. In either event the crosshead either in its initial movement as a result of starting the car or in its continued movement moves the carriage the additional amount sufficient to take up the small amount of pawl clearance for the pawl for the direction in which the car is traveling whereupon the pawl engages the stopping lug, bringing the carriage to a stop. The crosshead continues its movement and, due to the relative movement between the crosshead and the carriage, acts through rack 21 and gear 20 to effect the opening of the selector switches SLS4 and SLS1 to effect the slowdown and stopping of the car. Also selector switch SLS3*a* is opened and selector switch SLS2*a* is closed.

A plurality of brushes, for example brush CB, are carried by a panel on the carriage to cooperate with stationary contacts, for example CC, for the various floors arranged on the floor bars 25. This panel, being advanced with the carriage, will hereinafter be termed the advancer panel. When the car is stopped at a floor, these brushes are in engagement with their cooperating stationary contacts for that floor. Being on the advancer panel, however, the brushes are advanced in starting the car, are latched in engagement with their contacts for a floor by a pawl when a stop is initiated and are maintained in that condition as the advance is taken up as the car comes into the floor. Another panel is carried by the crosshead which is moved in synchronism therewith and will hereinafter be termed the synchronous panel. Certain brushes are mounted on this panel for engaging stationary contacts mounted on the floor bars. These brushes, stationary contacts and switches are shown in the wiring diagram and occur in Figures 4, 5, 6, 7, 8, 9, 10, 35 and 44. The stationary contacts are given general designations and differentiated as to the floors by appended numerals.

In the circuits which will be described, differentiation between elevators is made by appending to the characters employed small case letters *a, b, c* and *d,* indicative of the different elevators. In order to render the circuits more readily understandable, they are arranged in separate figures having to do with certain control operations and the interconnections between figures are indicated by giving the wires in those figures from which voltages are taken and the wires in those figures to which these voltages are applied the same designating characters, with numbers in brackets appended to the designations for the wires to which the voltages are applied, indicating the figures in which the source voltages appear. For example, wire SCD*a*+(40) of Figure 10, indicates that this wire is connected to source wire SCD*a*+ in Figure 40. This avoids the mass of interconnecting wires which would be present if the circuits were arranged in a single figure on several sheets of drawings and the interconnections made between these sheets, and yet enables the connections to be readily ascertained. As an aid, the interconnections may also be found from the index sheets of Figure 46 which also list all the figures to which each source voltage is connected and also indicate the number of connections of the source voltage in each figure. In some figures, connections from a source voltage wire is made at more than one point. When the cross connections of wires to indicate such multiple connection would make the circuits less readily followable, such cross connections have not been made, but the wires are given the same designation. As an example of this, reference may be made to Figure 11 where the connecting together of all DG*a*+ wires, of the HC*a*+ wires, of the FMA— wires and of the LT*a*+ wires would involve a considerable amount of crossing of wires and thus complicate the circuits. Also, there are contacts of switches connected in figures other than those in which the operating coils of the switches appear. These contacts have numbers in brackets appended to their designations indicative of the figures in which their operating coils appear. This is also indicated on the index sheets.

It is believed that an understanding of the invention will be facilitated by first describing the operation of starting and stopping an elevator car, say car *a*, together with the mechanism and circuits employed. The circuits for controlling the starting and stopping of car *a* are shown in Figure 3. The electromagnetic switches shown in this figure and those having contacts in this figure are designated as follows:

D—Down direction switch
DC—Door close switch
DG—Direction holding switch
DO—Door open switch
E—Speed switch
H—Field and brake switch
NT—Door time switch
SM—Stopping magnet (on selector)
ST—Start and stop switch
U—Up direction switch
XDG—Auxiliary direction relay The electromagnetic switches in this and other figures are illustrated in deenergized condition. The circuits of Figure 3 have been greatly simplified as compared with control systems utilized in commercial installations. Also, the circuits of Figure 3 are in "across-the-line" form with the coils and contacts of the switches shown in Figure 3*a* on spindles in alignment with their positions in the wiring diagram. The location of coils of certain of the switches and of other contacts of switches not appearing in Figure 3 will be found from the index sheets, Figure 46.

Any suitable form of power supply may be provided for the elevator motor. One of the preferred arrangements is to employ a direct current elevator motor and to cause current to be supplied to the motor at a variable voltage, as from a driven generator in accordance with Ward Leonard principles. The generator of such arrangement has been illustrated. The driving motor for the motor generator set and control arrangement therefor have not been illustrated. The armature of the generator is designated GA*a*, its separately excited field winding being designated GF*a* and its series field winding GSF*a*. The armature of the elevator motor M is designated MA*a* and its separately excited field winding MF*a*. A resistance RGF*a* is provided for controlling the strength of the generator separately excited field and therefore the voltage applied to the elevator motor armature.

There are two pairs of contacts operated by the car gate, each engaged when the gate is closed. These contacts are designated G1*a* and G2*a*. The door contacts operated by the various hoistway doors are arranged in series relation. These contacts are not closed until the doors are closed and locked. For convenience these door contacts are shown as a single pair of contacts designated DCO*a*. The car gate and hoistway doors for each elevator have not been shown. The car gate and hoistway doors are power operated. The door operating mechanism, other than the circuits for the door operating motor, are not shown.

It will be assumed that the car is parked at the lower terminal floor with the gate and door open, the door time interval provided by time switch NT*a* having expired. With the car selected as will be explained later in describing Figure 11, contacts DG1*a* are engaged and relay XDG*a* is operated. Inasmuch as the door and gate are assumed to be open, gate contacts G1*a* and G2*a*, door contacts DLO*a* and door open limit switch DOL are shown open and door close limit switch DCL1*a* closed. Start and stop switch ST*a* was operated in the stopping operation, causing slowdown and stopping of the car and the opening of the gate and door as the car arrived at the floor. Switch ST*a* is deenergized when the up dispatching operation takes place, as will be explained in describing Figure 10. Upon dropping out, switch ST*a* engages contacts ST2*a* to prepare the circuit for the set coil of stopping magnet SM*a* and engages contacts ST4*a* to complete a circuit through contacts NT3*a* and DO5*a* and door close limit switch DCL1*a* for the coil of door switch DC*a*. Switch DC*a* operates to engage contacts DC1*a* and DC2*a*, completing a circuit for the armature DMA*a* of the door operating motor to effect the closing of the gate and door, the field winding DMF*a* of the door motor being shown connected across supply lines + and —. As the gate and door reach closed position, door close limit switch DCL*a* opens to break the circuit for the coil of switch DC*a*. Also as the gate and door reach closed position, the engagement of gate contacts G2*a* and door contacts DCO*a* prepares a circuit for the coils of up direction switch U*a* and field and brake switch H*a*. Also, gate contacts G1*a* engage to complete a circuit through contacts ST2*a*, NT1*a* and SM2*a* for the set coil of the stopping magnet SM*a*. As a result, the stopping magnet operates to retract the pawls. It also engages contacts SM1*a* to prepare a circuit for its reset coil. It also separates contacts SM2*a* to disconnect the set coil from the supply lines, the stopping magnet being maintained in operated condition by residual magnetism of its core. It also engages contacts SM3*a* to complete a circuit through field winding BMF1*a* and armature BMA*a* of the brush motor connected in parallel by contacts XDG1*a* and field winding BMG2*a*, causing the advance of the advancer panel in the up direction. In effecting this advance, selector switches SLS1*a*, SLS3*a* and SLS4*a* are closed in sequence and selector switch SLS2*a* is opened. The closing of switch SLS1*a* completes a circuit for the coils of switches U*a* and H*a* through contacts G2*a*, DCO*a* and XDG3*a*. Switch U*a* engages contacts U1*a* and U2*a* in the circuit for the generator field winding GF*a* for up direction of car travel. Switch H*a* engages contacts H2*a* to complete the circuit for the generator field winding and at the same time engages contacts H1*a* to complete a circuit for the brake release coil B*a*, with the result that the brake is released and the car is started in the up direction. The closure of selector switch SLS4*a* completes a circuit for the coil of speed switch E*a* which engages contacts E1*a* to short circuit resistance RGF*a* in the generator field winding circuit, increasing the excitation of the generator to bring the elevator hoisting motor up to full speed.

When a call is picked up during the upward trip of the car, switch ST*a* is operated as will be explained in discussing Figure 10. This switch engages contacts ST3*a* to prepare the circuits for a door opening operation. Also contacts ST1*a* engage to complete a circuit through contacts SM1*a* for the reset coil of stopping magnet SM*a*. This coil acts to overcome the residual magnetism of the stopping magnet, effecting the release of the pawls and the separation of contacts SM1*a* and SM3*a* in the circuits for the stopping magnet reset coil and for the brush motor BM*a*. As the car moves upwardly the up pawl engages the stopping collar for the floor for which a call has been picked up, bringing the carriage to a stop. Continued movement of the selector crosshead causes the opening of selector switch SLS4*a* to break the circuit for the coil of switch E*a*. As a result contacts E1*a* separate to insert resistance RGF*a* in circuit with generator field winding GF*a*. This decreases the voltage of the generator, causing the car to slow down. As the car arrives at the floor, selector switch SLS1*a* opens to break the circuit for the coils of switches U*a* and H*a*. The resultant separation of contacts H1*a*, H2*a*, U1*a* and U2*a* effects the disconnection of the generator field winding GF*a* from the supply lines and the deenergization of the brake release coil B*a*. Thus the external excitation of the generator is discontinued and the brake is applied, bringing the car to a stop at the floor.

As the car arrives within a short distance of the floor and slightly ahead of the opening of selector switch SLS1*a*, selector switch SLS2*a* closes, completing the circuit through contacts ST3*a* and door open limit switch DOL*a* for the coil of door open switch DO*a*. This switch operates to engage contacts DO1*a* and DO2*a* to complete a circuit for the armature DMA*a* of the door operating motor to effect the opening of the car gate and hoistway door for the floor at which the stop is being made. Switch DO*a* also engages contacts DO4*a* to establish a self holding circuit. It also engages contacts DO3*a* to complete a circuit for the coil of time relay NT*a* and also to effect the charging of condenser CO1*a*. As the door and gate reach open position, door open limit switch DOL*a* opens to break the circuit for the coil of switch DO*a*. This switch drops out, separating contacts DO1*a* and DO2*a* to deenergize the armature of the door operating motor DMA*a* and separating contacts DO3*a* to disconnect the coil of switch NT*a* from the supply lines. Switch NT*a* does not drop out immediately, being delayed by the discharge of condenser CO1*a* for a period sufficient to enable passenger transfer to be effected.

When switch NT*a* drops out, it engages contacts NT3*a* to complete a circuit through contacts ST4*a* (now closed as will be seen from the description of Figure 10) and DO5*a* and door close limit switch DCL1*a* to cause operation of the door close switch DC*a* to effect reclosure of the door and gate. As the door and gate reach closed position, the stopping magnet SM*a* is operated, and the car is automatically restarted in the up direction.

Operation of the car on a downward trip is similar to that on an upward trip. When car *a* is set for down, contacts DG1*a* are separated so that auxiliary direction relay XDG*a* is deenergized and contacts XDG2*a* and XDG4*a* are engaged instead of contacts XDG1*a* and XDG3*a*. As a result, the advancer panel is advanced in the down direction and switch D*a* is operated so that the car is started in the down direction upon operation of the stopping magnet, instead of the up direction as previously described. When a call is picked up during a downward trip, switch ST*a* is operated and the car is caused to be brought to a stop at the calling floor in a manner similar to that above described.

The car call registration circuits for car *a* are illustrated in Figure 4, where the car buttons are designated C preceded by numerals indicating the floors for which the buttons are provided. Like car call registration circuits are provided for each of the other cars. Each of these car buttons comprises an electronic tube and a fixed button connected to the tube envelope with the circuits arranged so that the tube breaks down in response to manual touch of the fixed button and remains conductive, thereby registering the call and enabling the touch to be discontinued. These electronic tubes are cold cathode gas tubes, the type having a wire anode extending to within a short distance of the glass envelope of the tube, such as the RCA 1C21, having been found satisfactory. With such a tube, the button is connected to the tube envelope adjacent the anode. The tubes of the type mentioned are three element tubes having an anode, a cathode and a control electrode designated for car button 4C*a* for example, as AN, CD and GD respectively, with the fixed button designated TB. The control electrode is connected to the cathode. RCL*a* are loading resistors for the tubes. For such tubes, the preferred voltage values +135 volts above line BO (0 volt) and 150 volts R.M.S. from line BO to the grounded end of the secondary of transformer TR1. Line BO in this circuit and the circuits which follow serves as a reference voltage line. The 135 volts direct current applied to the anode-cathode circuit of the tube is not sufficient to break down the tube. However, upon a passenger touching a car button, a circuit is established from ground GR through the secondary of transformer TR1 to line BO which is connected through the 135 volt source to the anode of the tube and thence from the tube envelope through the body of the passenger back to ground. As a result, sufficient alternating current voltage is applied between the anode and the tube envelope to break down the tube. When the tube fires, it becomes illuminated to indicate that the call is registered.

The car call pick-up circuits and automatic car call cancelling circuits are illustrated for elevator *a* in Figure 5 in conjunction with Figure 4. When a call is registered, a potential is placed on the corresponding selector stationary call pick-up contact CC*a*. Assume that a car call is registered for the fourth floor. This places the potential drop across load resistor RCL4*a* on contact CC4*a*. The call is picked up by the engagement of brush CB*a* on the advancer panel with contact CC4*a*. This causes conduction of car call stop initiating tube CST*a* to take place. So long as no call is picked up, the potential applied to the control electrode of tube CST*a* is insufficient to cause conduction. However, when a call is picked up, the potential applied to the control electrode is raised about 65 volts which is the voltage drop across the load resistor of the call registering tube, in this case resistor RCL4*a*. This causes conduction of tube CST*a* to take place. This tube is a hot gas tube a G.E. 5727 thyratron having been found satisfactory.

The brush CB*a* is connected through voltage divider resistors R5*a*, R8*a* to a source of −150 volts (with respect to line BO). The connection to the control electrode of tube CST*a* is at a point on the voltage divider to provide the desired voltage level for operation of the tube. An alternating current voltage of 100 volt R.M.S. with respect to line BO is applied to the anode-cathode circuit of tube CST*a*. When tube CST*a* conducts, the potential drop across cathode resistor R9*a* is applied to the circuit for causing operation of switch ST*a* (Figure 10) as will be explained later. At the same time the cathode resistor voltage of tube CST*a* is applied by way of rectifier V12*a*, brush CB*a* and contact CC4*a* to the cathode of the car call registering tube 4C*a*. This voltage, which is approximately 132 volts peak, raises the cathode potential of the call registering tube from 65 to 132 volts, pulsing out the tube and thus cancelling the call. As alternating current voltage is applied to the anode-cathode circuit of tube CST*a*, tube CST*a* ceases conduction when the call is cancelled. Sufficiently constant D.C. voltage is applied to the wire CST*a*+ for operating switch ST*a* due to the filtering of the output voltage across cathode resistor R9*a* by means of condenser CO2*a*, resistor R10*a* and rectifier V13*a*. While the conduction of tube CST*a* is only momentary, condenser CO2*a* is only momentary, condenser CO2*a* sustains the voltage applied to wire CST*a*+ for a sufficient time to insure the operation of switch ST*a*. The control exercised on tube CST*a* by wire DG*a*− will be described later.

The landing call registering circuits are illustrated in Figure 7, where the up landing buttons are designated U and the down landing buttons are designated D, preceded in each case by numerals indicating the floors for which the buttons are provided. These buttons are of the same type and have the same circuitry as the car buttons. The landing buttons are common to the cars and, upon being touched by intending passengers, register calls for stopping cars at the floors at which the calls are registered, the firing voltage being obtained from transformer TR1 of Figure 4.

The landing call pick-up circuits and automatic landing call cancelling circuits are illustrated for elevator *a* in Figure 8 in conjunction with Figure 7 and are similar to those described in connection with car calls. When a landing call is registered, say an up call for the fourth floor, potential is placed on contact UHC4 for each car. Cross connections of the corresponding stationary contacts of the selectors are indicated by the short wires, for example wire 4U+. This call is picked up by the engagement of the up hall brush UHB on the advancer panel of an up car first to engage its UHC4 contact. This will be assumed to be car *a*.

The point OU*a* in Figure 8 is connected through resistor R20*a* and rectifier V34*a* to a source of +120 volts. With car *a* set for upward travel, switch DG*a* is operated to engage movable contact DG2*a* with its left-hand stationary contact, which connects point OU*a* through voltage divider resistors R25*a* and R27*a* to line −150 volts. Voltage is taken off the voltage divider for application to the control electrode of landing call stop initiating tube HST*a*. This tube may be a thyratron like tube CST*a*. The resistance of voltage divider resistors R25*a* and R27*a* is high with respect to that of resistor R20*a*, say 470K ohms plus 2.2 megohms with respect to 220K ohms respectively. So long as there is a relatively low resistance path by way of any of wires LS*a*−, DIC*a* through resistor R21*a* of low ohmic value, or PS5*a*− to line BO, or by way of resistor R22*a* of low ohmic value, say 15K ohms, to line BO, there is sufficient potential drop across resistor R20*a* to cause the potential at point OU*a* to be of a value which is insufficient to effect conduction of tube HST*a*. When +120 volts is applied to each of wires LS*a*−, DIC*a* and PS5*a*−, raising the potential on the left-hand side of rectifiers V26*a*, V28*a* and V30*a*, the application of the potential drop across resistor RUL4 to brush UHB*a* raises the potential on the left-hand side of rectifier V32*a* so that the current flow through resistor R20*a* is reduced. This raises the potential of point OU*a* to a value sufficient to cause tube conduction. The rectifiers in these circuits prevent the potential applied to any of wires LS*a*−, DIC*a*+ or PS5−, or to brush UHB*a* causing conduction of the tube by this potential direct and isolate these circuits from one another, thus obviating unwanted operations. Rectifiers similarly arranged in circuits in other figures are for a like purpose. Voltage is applied to wire LS*a*− when the car is not fully loaded. Voltage is applied to wire DIC*a*+ when the car is operating under group supervision. Voltage is applied to wire PS5− when the system is not under the Down Peak program, this circuit being provided only for low zone cars. If all these conditions are satisfied, an up call may be picked up by brush UHB*a* during up car travel to cause the car to be brought to a stop at the calling floor. The control of the connections of these wires to voltage sources will be described later.

When voltage is applied to the left-hand side of say rectifier V26*a*, the path through this rectifier to line BO may be said to be blocked. In some instances, as will be seen from later description, the path to line BO is direct through switch contacts which are opened when the connection is made on the left-hand side of the rectifier to a voltage source. In other instances, the connection to line BO may be through resistance, as for example resistance R22*a*. A path may be said to be blocked even though the voltage applied to block the path is lower than the voltage of the source which applies potential to the output point, OU*a* of Figure 8, so long as it raises the output point potential to a value to effect tube conduction. Also, a path may be said to be blocked when it is disconnected from line BO, even though no potential is applied to the left-hand side of the rectifier. Therefore, in the description which follows, such paths under such conditions will be referred to as blocked. Under opposite conditions where the path to line BO is a low resistance one, the path will be referred to as unblocked.

The anode-cathode and output circuits for tube HST*a* are the same as those described for tube CST*a*. The output voltage HST*a*+ across the cathode resistor R28*a* is applied in the circuits for controlling switch ST*a*. Also the voltage across resistor R28*a* is applied by way of rectifiers V37*a* and V35*a* to brush UHB and thus to the cathode of tube 4U for pulsing out the tube, cancelling the call.

When a down landing call is registered, the call is picked up by the engagement of the down hall brush DHB on the advancer panel of a down car first to engage its DHC contact for the floor for which the call is registered. Referring to the circuits for car *a*, when the car is set for downward travel, switch DG*a* is not operated so that movable contact DG2*a* is in engagement with its right-hand stationary contact. The engagement of brush DHB*a* with stationary contact DHC3*a* for example applies the potential drop across load resistor DRL3 to the left-hand side of rectifier V31*a*, blocking this path to line BO. With the paths by way of wires LS*a*— and DIC*a*+ also blocked, the potential of point OD*a* is raised sufficiently to cause conduction of tube HST*a*. Thus voltage HST*a*+ is again taken off the cathode resistor R28*a* for application to the circuits for causing operation of switch ST*a* and a voltage pulse is applied from across the cathode resistor to cancel the call.

The circuit for the ST*a* switch is shown in Figure 10. Upon conduction of either the CST*a* tube or the HST*a* tube, the output voltage thereof is applied by way of wire CST*a*+ from Figure 5 or wire HST*a*+ from Figure 8 in control circuits in Figure 10 for tube STT*a*. This tube like tubes CST*a* and HST*a* may be a thyratron and similarly controlled by voltage taken off voltage divider R51*a*, R53*a*. The coil of the ST*a* switch is arranged in the anode circuit of tube STT*a*, which is supplied from a 140 volt A.C. source. Four parallel operating circuits (10–1, 10–2, 10–3, 10–4) are provided which are connected to output circuit 10–0 to which the voltage divider is connected. Circuit 10–4 is involved in causing the operation of the ST*a* switch in response to application of voltage to the CST*a*+ and HST*a*+ wires. Referring to this operating circuit, potential from the +120 volt source is applied to the wire leading through resistor R46*a* and rectifier V64*a* to output circuit 10–0. Inasmuch as the car is running when a call is picked up, switch H*a* is operated, causing contact H3*a* of Figure 10 to be engaged. This applies +120 volts to the left-hand side of rectifier V62*a*, thereby blocking the low resistance path by way of resistor R47*a* to line BO. Also, since the doors are in closed position, door close limit switch DCL2*a* is open so that the path by way of rectifier V63*a* to line BO is blocked. Thus upon the application of voltage to wire CST*a*+ or wire HST*a*+, the path to line BO through rectifier V66*a* and resistor R48*a* is blocked. As a result, the potential of output circuit 10–0 is raised sufficiently to cause conduction of tube STT*a* to take place. This in turn causes energization of the ST*a* switch coil and switch ST*a* operates. Resistor R45*a* and condenser CO7*a* connected across the coil of switch ST*a* are to prevent chattering.

Switch ST*a* is schematically illustrated as operating two movable contacts, one connected to wire ST*a*+ and the other connected to wire ST*a*—. When the switch is not operated, wire ST*a*+ is connected to line BO and wire ST*a*— is connected to the +120 volt source. When the switch is operated, wire ST*a*+ is disconnected from line BO and connected to the +120 volt source while wire ST*a*— is disconnected from the +120 volt source and connected to line BO. The wires ST*a*+ and ST*a*— are connected to various points in the system for effecting certain control operations as will be seen as the description proceeds. Wire ST*a*+ is connected in parallel with wires CST*a*+ and HST*a*+ in circuit 10–4 and thus maintains tube STT*a* conductive and switch ST*a* operated after voltage is no longer applied to wire CST*a*+ or wire HST*a*+. Switch ST*a* also causes operation of the ST*a* contacts of Figure 3. As set forth in describing Figure 3, the engagement of contacts ST1*a* effects the reset of stopping magnet SM*a*, causing the car to be slowed down and brought to a stop at the calling floor. Also, the engagement of contacts ST3*a* causes, upon the reclosure of switch SLS2*a*, operation of switch DO*a* to cause the opening of the car gate and hoistway door as the car is brought to a stop. Incident to the opening of the gate and door, door close limit switch DCL2*a* of Figure 10 closes, unblocking this path to line BO. This lowers the voltage applied to the control electrode of tube STT*a* to a point where the tube stops conduction and as a consequence switch ST*a* drops out. Condenser CO8*a* causes sufficient voltage to remain on the left-hand side of rectifier V62*a* for a time to insure continued conduction of the tube until limit switch DCL2*a* opens, should contacts H3*a* separate before switch DCL2*a* opens. Contacts ST4*a* (Figure 3) reengage when switch ST*a* drops out. Thus the circuit for the coil of door close switch DC*a* can be completed and the door and gate closed as a result of the engagement of contacts NT3*a* as the NT time interval expires. Also contacts ST2*a* engage to cause, through operation of the stopping magnet SM*a*, starting of the car when the door and gate reach closed position.

Operation of switch ST*a* at the terminals is insured by circuits 10–2 and 10–3. As the car arrives at call pick-up distance from the lower terminal on its downward trip, brush SLB*a* on the advancer panel engages selector lower terminal stationary contact SLT*a*, applying +120 volts to this contact, thus blocking the path by way of rectifier V57*a* and resistor R44*a* to line BO. Since the car is set for down, wire DG*a*— is disconnected from line BO and connected to the +120 volt source, as will be seen from the description of Figure 11, blocking the path by way of rectifier V60*a* to line BO. As a result, sufficient voltage is applied from the +120 volt source by way of resistor R43*a* and rectifier V58*a* to output circuit 10–0 to cause conduction of tube STT*a* and thus the operation of switch ST*a*. Brush SLB*a* is maintained on contact SLT*a* as the slowdown and stopping take place. Also voltage is maintained on wire DG*a*— until the car is selected for dispatching. Thus switch ST*a* is maintained operated during this time.

As will be seen from the description of Figure 40, the path by way of wire SCD*a*+ in circuit 10–1 to line BO is blocked before the car is selected for dispatching. Thus, with the car under the control of the group supervisory system so that the path by way of the wire XCS*a*— to line BO is blocked, the blocking of the path to line BO by way of wire ST*a*+ establishes a holding circuit by way of rectifier V52*a* for tube STT*a*, maintaining the tube conductive and switch ST*a* operated after the car is selected for dispatching and the path to line BO by way of wire DG*a*— is unblocked in circuit 10–3. This holding circuit is maintained until the up dispatching operation takes place at which time the path to line BO by way of wire SCD*a*+ is unblocked. Switch ST*a* thereupon drops out to close the door and gate and start the car in the up direction.

Similar operation of switch ST*a* is effected by circuit 10–2 as the car approaches the upper terminal upon the engagement of brush SLB*a* with stationary contact SUT*a*, the path to line BO by way of wire DG*a*+ being blocked because the car is set for up. Switch ST*a* is maintained operated by this circuit and later by circuit 10–1 as switch DG*a* is operated for down car travel. As the down dispatching operation takes place, the path to line BO by way of wire SCD*a*+ is unblocked and switch ST*a* drops out to close the door and gate and start the car in the down direction.

The control of the direction holding switch DG*a* is illustrated in Figure 11. The coil of this switch is in the anode circuit of tube DGT*a* which may be a thyratron. The level of the voltage applied to the control electrode of the tube is controlled by a voltage divider as in preceding figures. Upon operation, the switch transfer wire DG*a*+ from line BO to the +120 volts source and wire DG*a*— from the +120 volts source to line BO. It also operates contacts in Figures 3 and 8. The contacts in Figures 3 control the direction of car travel while those in Figure 8 control the cancellation of landing calls. The transfer of wires DG*a*+ and DG*a*— is effective in several of the control circuits, including those of Figure 10 just described. As set forth in describing Figure 10, not only does the blocking of the path to line BO by way of wire DG*a*+ render the control of switch ST*a* by brush SLB*a* effective for the upper terminal but the unblocking of the path to line BO by way of wire DG*a*— prevents the circuit through brush SLB*a* maintaining switch ST*a* operated after the car is selected at the lower terminal.

There are six parallel circuits (11–1, 11–2, 11–3, 11–4, 11–5, 11–6) controlling tube DGT*a*. When the car is at the lower terminal, with the particular arrangement illustrated, DGT*a* remains non-conductive until car *a* is selected. When this selection occurs, +120 volts is applied to wire WB*a*+ as will be explained in describing Figure 36, circuit 11–1, causing the tube to conduct and switch DG*a* to operate. Switch DG*a* is also operated by circuit 11–4 under conditions where, with the car stopped at the lower terminal, under which conditions the paths to line BO by way of wires ST*a*+ and LT*a*+ are blocked, full load is taken in the car, in which event the path to line BO by way of wire LS*a*+ is blocked, and a car call is registered, in which event the path to line BO by way of wire HC*a*+ is blocked. Condenser CO11*a* prevents the immediate operation of switch DG*a* by circuit 11–4 when all of its paths to line BO are blocked to avoid unwanted operation when the car comes into the lower terminal fully loaded. Switch DG*a* is also operated by circuit 11–6 when the car either is operating under the Intermittent program, in which event the path to line BO through rectifier V96*a* and resistor R66*a* is blocked by application of voltage to wire PS6+, or is not under the group supervisory system, in which event this path to line BO is blocked by the application of voltage to wire XCS*a*+, and the car is at the lower terminal so that the path to line BO by way of wire LT*a*+ is blocked and a car call is registered for a floor above so that the path to line BO by way of wire HC*a*+ is blocked. Circuits 11–2, 11–3 and 11–5 are holding circuits. When switch DG*a* is operated, it blocks the path to line BO by way of wire DG*a*+ in circuit 11–2 to maintain itself operated until there is no car call above the car which unblocks the path to line BO by way of wire HC*a*+. It also blocks the path by way of wire DG*a*+ in circuit 11–3 to maintain itself operated until no landing call exists above the car which unblocks the path to line BO by way of wire HH*a*+, or until the car reaches the upper terminal, which unblocks the path by way of wire UT*a*—, or until a forgotten man call is picked up, which unblocks the path by way of wire FM*a*—. It also blocks the path by way of wire DG*a*+ in circuit 11–5 to maintain itself operated on all programs except Up Peak or Intermittent, in which event the path by way of wire VD+ is blocked, until the car is selected for down dispatching which unblocks a path by way of wire WT*a*—, or until a forgotten man call is picked up which unblocks a path by way of wire FM*a*—, or until the system goes on zone return operation which unblocks a path by way of wire XVO—. The forgotten man and zone return circuits are not shown and may be arranged as shown in Figure 10 of the patent to Glaser and Hornung, No. 2,589,242, in which event the control voltages applied to wires FM*a*— and XVO— may be obtained from contacts of switches FM*a* and XVO of that patent.

The application of voltage to wires HC*a*+ and HHa+ is controlled by the highest call circuits shown in Figures 4, 6, 7 and 9. Referring first to the highest car call circuits of Figures 4 and 6, the registration of a car call for a floor places potential on selector stationary contacts HCC*a* for all floors below. The stationary contacts are illustrated as elongated and adapted to be engaged by tandem brushes HCB1*a* and HCB2*a* connected through voltage divider R14*a*, R17*a* to control highest car call tube HCT*a*, which may be a thyratron. The arrangement is such that during up car travel, before brush HCB2*a* leaves a contact, brush HCB1*a* engages the contact for the floor ahead and, before brush HCB1*a* leaves a contact, this contact is engaged by brush HCB2*a*. With this arrangement, there will be potential on one or the other of these brushes to cause conduction of tube HCT*a* and thus operation of highest car call switch HC*a* until the car nears call pick-up distance from the floor of highest car call. When the following brush HCB2*a* runs off the highest contact having potential thereon, the tube ceases conduction and switch HC*a* drops out. Assume for example that the highest car call for car *a* is a call for the fourth floor. This causes the cathode potential of tube 4C*a* to be placed on contacts HCC3*a*, HCC2*a* and HCC1*a*. With the car at the lower terminal, brush HCB2*a* is in engagement with contact HCC1*a* so that potential is placed on the control electrode of tube HCT*a* to cause tube conduction and thus operation of switch HC*a*. Before brush HCB2*a* disengages contact HCC1*a*, brush HCB1*a* engages contact HCC2*a* and, before brush HCB1*a* leaves contact HCC2*a*, this contact is engaged by brush HCB2*a*, thus maintaining switch HC*a* operated. However, upon the disengagement of brush HCB2*a* from contact HCC3*a*, as there is no potential on contact HCC4*a*, switch HCa drops out. When operated, switch HC*a* places potential on wire HC*a*+ and takes it off wire HC*a*—, and when dropped out, switch HC*a* takes potential off wire HC*a*+ and places it on wire HC*a*—. Wires HC*a*+ and HC*a*— are connected in various circuits. For example, in Figure 11, the transfer of wire HC*a*+ from the +120 volt source to line BO breaks holding circuit 11–2 for tube DGT*a*.

The highest landing call circuits of Figures 7 and 9 are similar to the highest car call circuits. The landing calls control the potential on selector stationary contacts HHC for each car, the corresponding contacts for each floor for the various elevators being connected together, for example the fourth floor contacts HHC4 by wire WHH4. These contacts, like the highest car call contacts, are elongated and adapted to be engaged by tandem brushes, HHB1*a* and HHB2*a* in the case of car *a*. Brushes HHB1*a* and HHB2*a* are connected to voltage divider R34*a*, R38*a*. An up landing call for a floor places for each elevator potential on the stationary contacts for that floor and for floors below, while a down landing call for a floor places for each elevator potential on the stationary contacts for floors below. So long as there is potential on either of brushes HHB1*a* or HHB2*a* for car *a* for example, sufficient potential is applied to tube HHT*a* to cause it to be conductive and thus highest landing call switch HH*a* to be operated. Like tube HCT*a*, tube HHT*a* may be a thyratron. Assume that the highest landing call is a down call at the fourth floor. This places potential on contacts HHC3*a*, HHC2*a* and HHC1*a*. Until brush HHB2*a* during upward travel of the car runs off contact HHC3*a*, tube HHT*a* is conductive and switch HH*a* is operated. This causes potential to be on wire HH*a*+ and off wire HH*a*—. When brush HHB2*a* runs off contact HHC3*a*, tube HHT*a* ceases conduction, switch HH$a$ drops out, and potential is taken off wire HH$a$+ and placed on wire HH$a$—. Wires HH$a$+ and HH$a$— are connected in various circuits. In Figure 11, the transfer of wire HH$a$+ from the +120 volt source to line BO breaks the holding circuit 11–3 for tube DGT$a$.

When both holding circuits 11–2 and 11–3 for switch DG$a$ in Figure 11 are broken and the car is operating under the Up Peak or Intermittent program so that circuit 11–5 is not effective, swich DG$a$ drops out. Assume first that, when operating under either of these programs, the only call above the car is a car call. Before the car reaches call pick-up distance from the floor, switch HC$a$ is dropped out as above explained, causing switch DG$a$ to drop out. This applies voltage to wire DG$a$— which, as switch U$a$ is operated, applies voltage in Figure 5 by way of contacts U3$a$ and rectifier V11$a$ to cause conduction of tube CST$a$. Such voltage is also applied as a result of the engagement of brush CB$a$ with the highest car call stationary contact. As a result, switch ST$a$ (Figure 10) is operated, causing the car to be brought to a stop at the floor of highest car call in the manner previously explained. If the highest call is a down call, switch HH$a$ and then switch DG$a$ is dropped out before the car reaches call pick-up distance from the floor. This transfers movable contact DG2$a$ of Figure 8 to the right-hand position so that, upon the engagement of down brush DHB$a$ with stationary contact corresponding to this highest down call, tube HST$a$ is rendered conductive and voltage is applied to wire HST$a$+ to cause operation of switch ST$a$. If the car loses its call above because of this call being picked up by another car, switch HH$a$ is dropped out which drops out switch DG$a$. The resultant application of voltage to wire DG$a$— in Figure 5 causes conduction of tube CST$a$ and thus application of voltage to wire CST$a$+ as above explained. This causes operation of switch ST$a$ to bring the car to a stop at the next floor at which a stop can be made. In each of these three cases of highest call stop, direction is changed to down so that the car will restart from the floor in the down direction.

If the highest call is an up landing call, brush HHB2$a$ (Figure 9) is in engagement with its stationary contact for the floor for which the call is registered at the time the call is picked up and automatically cancelled. Condenser CQ6$a$ maintains tube HHT$a$ conductive and thus switch HH$a$ operated long enough to insure the operation of switch ST$a$ upon picking up the call and the establishment of its maintaining circuit. As the paths to line BO by way of wires HH$a$+ and LT$a$— are blocked because switch HH$a$ is operated and the car is above the lower terminal, the resultant application of voltage to wire ST$a$+ in Figure 9, and later by way of contacts NT4$a$, acts to maintain switch HH$a$ operated until the time interval of switch NT$a$ expires after the door and gate reach open position. Thus switch DG$a$ is maintained operated during this time by circuit 11–3. In this way, when the highest call in response to which the stop is made is an up call, preference is given to a call registered for a floor above the car before expiration of the passenger transfer time provided by switch NTA for controlling switch DG$a$, and thus maintaining upward direction of car travel. When this time expires with no such call registered, switch DG$a$ drops out and the car becomes set for downward travel.

Reference will now be made to Figure 12 which illustrates service demand measuring circuits which form a part of the group supervisory system. Each car is provided with a plurality of up resistors RUC, one for each of its car buttons 2C, 3C, 4C and 5C, designated respectively as RUC2, RUC3, RUC4 and RUC5. Also each car is provided with a plurality of down resistors RDC, one for each of car buttons 2C, 3C and 4C, designated respectively as RDC2, RDC3 and RDC4. The resistors for each car for the same floor are joined together and the junction point is connected to the cathode of the car call registering tube for that car for that floor, for example by wire 5C$a$+. The other sides of the up resistors for each car are connected by way of wire W12U and rectifier V100 for that car to wire WMU and the other sides of the down resistors for each car are connected by way of wire W12D and rectifier V107 for that car to wire WMD. Also wire W12U for each car is connected through rectifier V103 to wire XCS— for that car, through rectifier V102 to wire DG+ for that car, and through protective resistor R70 and adjusting resistor R71 to wire LS+ for that car. Wire W12D for each car is connected through rectifier V104 to wire LT— for that car, through rectifier V105 to wire XCS— for that car, through rectifier V106 to wire DG— for that car, and through protective resistor R72 and adjusting resistor R73 to wire LS+ for that car.

Also, a resistor is provided for each landing call registering tube, those designated RUH for the up landing calls being connected to the cathodes of the down landing call registering tubes, for examples by wide 4U+, and those designated RDH for the down landing calls being connected to the cathodes of the down landing call registering tubes, for example by wire 4D+. Resistors RUH are connected by wire W12UH through rectifier V101 to wire WMU, while resistors RDH are connected by wire W12DH through rectifier V108 to wire WMD.

With this arrangement, the amount of current flow in wires WMU and WMD is determined by the number of landing calls registered, the number of car calls registered for each car and the load in the cars. In the case of up landing calls, the more registered, the greater the current flow by way of wire W12UH to wire WMU, and in the case of down landing calls, the more registered, the greater the current flow by way of wire W12DH to wire WMD. Also, for each car set for up, in which case the path by way of wire DG+ for that car to line BO is blocked, and under group supervision, in which case the path by way of wire XCS— for that car to line BO is blocked, the amount of current flow by way of wire W12U for that car to wire WMU is determined by the number of car calls registered for that car and the load in the car. Similarly, for each car set for down and under group supervision, in which case the paths to line BO by way of wires DG— and XCS— for that car are blocked, and provided the car is above the lower terminal in which case the path by way of wire LT— for that car to line BO is blocked, the amount of current flow by way of wire W12D for that car to wire WMD is determined by the number of car calls registered for that car and the load in the car.

The current in wires WMU and WMD of Figure 12 is fed to the input coils of magnetic amplifiers in the automatic program selection circuits of Figures 13$a$, 13$b$ and 13$c$. Referring first to Figure 13$a$ which is directed to the circuits for selecting the Intermittent program, the magnetic amplifier is designated IMA. Its input coil is fed with current from both wires WMU and WMD so as to measure total service demand, the circuit being from wire WMU through resistor R74 and from wire WMD through resistor R88, in parallel, thence through adjusting resistor R76 and the input coil to line BO, the input coil also being provided with a parallel adjusting resistor R75.

Alternating current of approximately 110 volts R.M.S. above line BO is fed to the output coil of magnetic amplifier IMA in series with resistor R84. With variation in the excitation of the input coil, the inductance of the output coil varies correspondingly, thus varying the impedance offered to the flow of current therethrough from the 110 volt A.C. source and thus the voltage drop across resistance R84. Thus an alternating current output voltage is obtained across resistor R84 which varies in accordance with total service demand.

The output voltage is applied to point 13–O. To avoid the effect of temporary changes in service demand, time lags are provided. These are obtained by means of condensers CO14 and CO15 and discharge resistor R85. Condenser CO15 is a large condenser, say 125 mf., while condenser CO14 is a relatively small condenser, say 1 mf. Owing to the action of rectifiers V114 and V115, during one half cycle, condenser CO14 charges but the charging of condenser CO15 is blocked, while during the other half cycle, condenser CO15 is charged by the potential across resistor R84 and across condenser CO14. The net result is that upon an increase in service demand, the charge on condenser CO15 gradually builds up to build up the potential drop across resistor R85. Thus if there is a sustained increase in service demand, the potential drop across resistor R85 builds up to a value indicative of the service demand. When the service demand falls off, the potential drop across resistor R85 does not fall off abruptly, but gradually decreases as condenser CO15 discharges into resistor R85. Thus a direct current output voltage is obtained across resistor R85 which is a measure of service demand, exclusive of transient conditions. Intermittent program selection switch PS6, which is subject to intermittent program selection tube PS6T, is controlled in accordance with the potential drop across resistor R85.

In order to avoid undesirable operations which would be obtained if the slowly varying direct current output voltage across resistor R85 were utilized directly to control the firing of tube PS6T, this voltage is converted into an alternating current voltage which is utilized to control the extent of conduction of tube IDAT and the output of this tube is utilized in turn to control the firing of tube PS6T. Tube IDAT is a vacuum tube and may be one half of a 6SN7. The grid of this tube is connected to a 130 volt A.C. source through resistor R77. The junction point 13–C of the grid and resistor R77 is connected by way of rectifier V113 to resistor R85 and thus through resistor R85 to line BO. With this circuit the positive half of each alternating current voltage wave applied to the grid is clipped to a value equal to the charge on condenser CO15 and thus proportional to actual service demand.

The anode of tube IDAT is connected through resistor R78 to a +330 volt source. The cathode of the tube is connected to a biasing resistor R82, R87, in turn connected between a +120 volt source and line BO. With this arrangement the input voltage is of such amplitude that it drives the tube beyond cut-off for a part of the cycle. Thus the operating range of the tube is from cut-off to that value of grid voltage representing service demand. The potential at the output point 13–N of tube IDAT is determined by the current flow through the tube, i.e., the greater the current flow, the lower the potential. Since the value of input potential above tube cut-off and thus the amount of current flow is in proportion to service demand, the greater the service demand, the lower the potential of point 13–N. The net result is that a square wave voltage appears at point 13–N with its maximum peak value 330 volts and its minimum peak value determined by the voltage applied to the grid. Thus the extent of the variation of voltage at point 13–N is in direct proportion to the amount of service demand.

The output voltage of point 13–N controls the conduction of tube PS6T. Due to condenser CO13, only the alternating current component of the output voltage is utilized. Like tubes CST, etc., tube PS6T may be a thyratron. Its cathode is connected to line BO and its anode to a 200 volt A.C. source through the coil of intermittent program selection switch PS6. A negative voltage bias is applied to the grid of tube PS6T, this voltage being taken off resistor R89 connected between line BO and a −150 volt source. This bias is of a value to prevent the firing of the tube. The alternating current component of the output voltage is superimposed on this negative bias and thus the average value of this component is at the value of the bias. Hence the value of the square wave voltage that contributes to the firing of tube PS6T is half the peak-to-peak value of the square wave and is in direct proportion to the total service demand. The bias adjustment is such that the tube conducts and switch PS6 operates when the service demand exceeds a certain amount and that the conduction ceases and the switch drops out when the service demand is below this amount. The phases of the 130 v. A.C. and 200 v. A.C. sources are related as by taking them off a six phase secondary of a transformer so as to fire tube PS6T near the beginning of the positive half cycle of the 200 v. A.C. source. The control exercised by this switch is such that it places the group supervisory system on the Intermittent program when the service demand is below the certain value and the switch is dropped out. On other than the Intermittent program, the switch is operated. When operated, switch PS6 connects wire PS6+ to line BO and wire PS6− to source +120 volts, and when dropped out switch PS6 connects wire PS6+ to the +120 volt source and wire PS6− to line BO. These wires are connected in various circuits. The connection in Figure 11 has already been referred to, while the others will be referred to as the description proceeds.

Additional controls may be provided for switch PS6. One of these is a clock operated switch CPM which when operated throws the system to the Down Peak program. When this switch operates it applies voltage to wire CPM+ and by way of rectifier V117 and voltage switch tube VST1 to the bottom of resistor R89, raising the bias voltage applied to tube PS6T to a positive value to cause the tube to fire and thus the operation of switch PS6. The other control is provided by switch DAY which when operated locks the system in on day operation. When this switch operates, voltage is applied to wire DAY+ to raise the potential applied to tube PS6T and thus cause operation of switch PS6. The operation of switch CPM and DAY will be described later in connection with Figure 44. At all other times, switch PS6 is under the control of the service demand circuits through amplifier IMA.

The control of the program selecting switches of Figures 13*b* and 13*c* is effected in a similar manner but in accordance with the preponderance of service demand in a given direction. Referring first to Figure 13*b*, when wire WMU is more positive with respect to line BO than is wire WMD, which is the case when there is a preponderance of up service demand, current flows from wire WMU by way of wire 13U through contacts CAM1 and CPM1, thence through adjusting resistor R92, tube UMAT, input coil of magnetic amplifier UMA, by way of wire 13D back to Figure 13*a*, thence through resistors R88, R76 and input coil of amplifier IMA to line BO. Tube UMAT is a vacuum tube serving as a rectifier and may be one half of a 6AL5. Similarly to the operation set forth in describing Figure 13*a*, this causes an alternating current voltage drop across resistor R100 which is proportional to the preponderance of up service demand, a direct current voltage drop across resistor R101 which is proportional to the persistent preponderance of up service demand and a square wave output voltage at the output point 13P of tube UDAT which varies in amplitude in accordance with persistent preponderance of up service demand.

The output voltage of poinf 13P is utilized to control through tube PS1T the operation of Up Peak program selection switch PS1 and through tube PS4T the operation of Heavier Up program selection switch PS4. Tubes PS1T and PS4T may be thyratrons. These operations are effected in the same manner as set forth in describing the operation of switch PS6 except that switch PS4 is operated on a less preponderance of up service demand than is switch PS1. This operation is obtained by providing different degrees of bias on tubes PS4T and PS1T, the negative bias obtained from resistor R106 for tube PS4T being sufficiently less than that obtained from resistor R105 for tube PS1T to effect the desired difference in operation.

When switch PS4 is operated, it places +120 volts on wire PS4+ and connects wire PS4— to line BO. This causes certain operations to be effected which place the group supervisory system on the Heavier Up program. The various connections of wires PS4+ and PS4— in the circuits by which this is effected will be seen as the description proceeds.

When switch PS1 is operated, it places +120 volts on wire PS1+ and connects wire PS1— to line BO. This causes certain operations to be effected which place the group supervisory system on the Up Peak program. The various connections of wires PS1+ and PS1— in the circuits by which this is effected will be seen as the description proceeds. One of the connections of wire PS1— is through resistor R107 to biasing resistor R106 for tube PS4T. When switch PS1 is dropped out, wire PS1— is connected to the +120 volt source which gives the desired negative biasing potential for tube PS4T. When switch PS1 operates to throw over to the Up Peak program, wire PS1— is connected to line BO which lowers this negative bias sufficiently to prevent conduction of tube PS4T by service demand. Thus when switch PS1 operates, the operation of switch PS4 is prevented, or if operated, switch PS4 is dropped out to take the system off the Heavier Up program as it is switched to the Up Peak program. Switch PS1 may also be operated by another clock operated switch CAM to throw the system into the Up Peak program at a given time in the morning. When this switch operates it engages contacts CAM2 to connect through rectifier V122 the coil of switch PS1 between the 200 volt A.C. source and a 90 volt A.C. source, these sources being synchronized to place 110 volts across the switch coil. When switch CAM operates it also separates contacts CAM1 to prevent the control of switches PS1, PS4, PS3 and PS5 by the service demand circuits.

Referring now to Figure 13*c*, when wire WMD is more positive with respect to line BO than is wire WMU, which is the case when there is a preponderance of down service demand, current flows from wire WMD by way of wire 13D through the input coil of magnetic amplifier DMA, tube DMAT, adjusting resistor R110, by way of wire 13U through contacts CPM1 and CAM1, thence through resistors R74, R76 and input coil of amplifier IMA to line BO. Tube DMAT may be the other half of the 6AL5 tube, the connection being reversed with respect to that for amplifier UMA. The current flowing through the input coil of amplifier DMA causes an alternating current voltage drop across resistor R118 which is proportional to the preponderance of down service demand, a direct current voltage drop across resistor R119 which is proportional to the persistent preponderance of down service demand, and a square wave output voltage at the output point 13Q of tube DMAT, which varies in amplitude in accordance with persistent preponderance of down service demand.

The output voltage of point 13Q is utilized to control through tube PS3T the operation of Heavier Down program selection switch PS3 and through tube PS5T the operation of Down Peak program selection switch PS5. Tubes PS3T and PS5T may be thyratrons. These operations are effected in the same manner as set forth in describing the operation of switches PS6, PS4 and PS1, switch PS3 being operated on a less preponderance of down service demand than is switch PS5. This difference in operation of switches PS3 and PS5 is obtained by providing different degrees of bias on tubes PS3T and PS5T, the negative bias obtained from resistor R124 for tube PS3T being sufficiently less than that obtained from resistor R123 for tube PS5T to effect the desired difference in operation.

When switch PS3 is operated, it places +120 volts on wire PS3+ and connects wire PS3— to line BO. This causes certain operations to be effected which place the group supervisory system on the Heavier Down program. The various connections of wires PS3+ and PS3— in the circuits by which this is effected will be seen as the description proceeds.

When switch PS5 is operated, it places +120 volts on wire PS5+ and connects wire PS5— to line BO. This causes certain operations to be effected which place the group supervisory system on the Down Peak program. The connection of wire PS5— in the circuits of Figure 8 for cars *a* and *b* has already been referred to. Another connection of wire PS5— is through resistor R125 to biasing resistor R124 for tube PS3T. When switch PS5 is dropped out, wire PS5— is connected to the +120 volt source which gives the desired negative biasing potential for tube PS3T. When switch PS5 operates to throw over to the Down Peak program, wire PS5— is connected to line BO which lowers this negative bias sufficiently to prevent conduction of tube PS3T by service demand. Thus, when switch PS5 operates, the operation of switch PS3 is prevented, or if operated, switch PS3 is dropped out to take the system off the Heavier Down program as it is switched to the Down Peak program. Various other connections of wires PS5+ and PS5— in the circuits by which the transfer to the Down Peak program is effected will be seen as the description proceeds. Switch PS5 may also be operated by clock operated switch CPM to throw the system into the Down Peak program at a given time in the evening. When this switch operates it also engages contacts CPM2 to connect through rectifier V127 the coil of switch PS5 between the 200 volt A.C. source and the 90 volt A.C. source as in the case of the coil of switch PS1. When switch CPM operates, it also separates contacts CPM1 to prevent the control of switches PS1, PS4, PS3 and PS5 by the service demand circuits.

The group supervisory system is placed on the Balanced program (substantially balanced up and down traffic) when conditions are such that none of the other programs is indicated. This is effected by the circuits of Figure 14. When not under the Up Peak program so that voltage is applied to wire PS1—, balanced program selection switch PS2 is operated, provided the other program selection switches are dropped out so that the paths to line BO by way of wires PS3—, PS4—, PS5— and PS6— are blocked. Upon operation, switch PS2 disconnects wire PS2+ from line BO and connects it to a +120 volt source. The connections of wire PS2+ in the system will be seen as the description proceeds.

In Figure 15 are shown circuits for applying voltage to wire VUB+ when the group supervisory system is under the balanced program in which event voltage is applied to wire PS2+, or is under the Heavier Down program in which event voltage is applied to wire PS3+, or is under the Heavier Up program in which event voltage is applied to wire PS4+. Since these programs are usually referred to as the interim programs, that is the programs between Up Peak and Down Peak, the application of voltage to wire VUB+ indicates that the system is on an interim program.

Reference may now be had to Figure 16 which represents a circuit arrangement utilized in several instances in circuits which follow. In this arrangement, one input circuit FFRI controls two output circuits FFR+ and FFR—. The voltages of the output circuits are determined by the voltage drops across resistors R143 and R145 in the cathode circuits of tubes FFRT1 and FFRT2, respectively. These tubes are cold cathode triodes, for example of the 5823 type. Voltage biasing tubes VBT1 and VBT2 of the gaseous diode type control the level of the voltage applied to the control electrodes of tubes FFRT2 and FFRT1, tube VBT2 being a 50 volt drop tube and tube VBT1 being a 70 volt drop tube. With the voltages indicated, resistors R136 and R142 of 5 megohms, R135 and R139 of 470K ohms, R137, R143 and R145 of 51K ohms, R140 and R141 of 1K ohm, R146 and R147 of 6.2K ohms, R138 of 1 megohm and R144 of 2.2 megohms, have been found satisfactory. Condensers CO20 and CO30 may be 4 mf. condensers and condenser CO28 may be a .005 mf. condenser. With 200 volts applied to the anode of tube FFRT1, an input voltage of at least 105 volts is applied to the control electrode to effect conduction. To insure the tube ceasing conduction, an input voltage of not greater than 60 volts is desired. This is an input voltage swing of at least 45 volts. To insure the proper voltage level with the input voltages had, tube VBT2 is utilized to provide a constant 50 volt bias above the input voltage.

In operation, assume first that input wire FFRI is connected to line BO, the voltage at point 16–C is less than 50 volts which is not sufficient to fire tube FFRT1. Upon the raising of the input voltage to say 75 volts above line BO, the potential at point 16–C rises to a value sufficient to fire the tube. This causes a voltage drop across cathode resistor R143 which is utilized for further control operations and the control of tube FFRT2. When tube FFRT1 is nonconductive, the potential at point 16–D is substantially that of line BO and owing to the values of the resistors in the circuit, the potential of point 16–E is in the negihborhood of 85 volts which is sufficient to fire tube FFRT2. However, upon the firing of tube FFRT1, the potential of point 16–D rises to a value of say 75 volts which raises the potential of 16–E to a point which cannot fire tube FFRT2 and tube FFRT2 ceases conduction. When tube FFRT1 ceases conduction, the potential of point 16–E reverts to the negative value to cause tube FFRT2 to again conduct. This circuit is in the nature of a flip-flop of the monostable type and is designated FFR. It acts when tube FFRT1 is conducting to provide a plus voltage at output wire FFR+ and the voltage of line BO at output wire FFR— and, when tube FFRT2 is conducting to provide a plus voltage at output wire FFR— and the voltage of line BO at output wire FFR+. In the circuits which follow in which this flip-flop arrangement is utilized, it will be represented by a block, with an input wire on the left and two output wires on the right, and designated FFR, as shown in Figure 16*a*, with the further designation of the particular application, for example the block FFR in Figure 19 which is further designated VD.

It is preferred to utilize a 4 $\phi$ rectified source of voltage for the anode circuits of tubes FFRT1 and FFRT2 as this provides smoother output voltage for application to wires FFR+ and FFR—. Such voltage may be obtained from the arrangement illustrated in Figure 17. TRP indicates a three phase delta connected primary winding of a transformer supplied from three phase supply lines designated I, II and III. This transformer is provided with a six phase start connected secondary winding designated TRS. Of this latter winding, only four consecutive phase windings are utilized, the other two being left disconnected. The four utilized windings are connected through rectifiers V150 to the 200 4 $\phi$ (rect.) feed wire. This arrangement provides a voltage of the wave shapes indicated in Figure 17*a*. When the voltage passes through the trough TO, if the voltage applied to the conductive tube FFRT of Figure 16 is below firing value, the tube ceases conduction.

At this point another form of flip-flop utilized in the circuits will be described. This is a bistable flip-flop illustrated in Figure 18 and designated FFL. This flip-flop has two inputs, one designated "set" and the other "reset." It also has two outputs, one designated FFL+ and the other FFL—. Two tubes are employed and may be 5727 thyratrons in previous circuits. In operation, assume that sufficient voltage has been applied to wire "set" to cause tube FFLT1 to be conductive. Owing to the 8 volts drop in the tube, this causes the potential on the anode side of the tube and thus on the left side of condenser CO32 and output wire FFL— to be +8 volts above line BO. At this time the potential on the right-hand side of condenser CO32 and thus the potential of output wire FFL+ is that of the source voltage, namely +120 volts. Tube FFLT1 remains conductive after the discontinuance of the application of operating potential to the "set" wire. Upon the application of sufficient voltage to the "reset" wire, tube FFLT2 is caused to conduct. This lowers the potential of the anode of tube FFLT2 and thus of right-hand side of condenser CO32 and output wire FFL+ to +8 volts above line BO. Owing to the charge 112 volts which was on condenser CO32, this lowers the potential applied to the anode of tube FFLT1 to —104 volts, pulsing out the tube. Tube FFLT2 remains conductive after the discontinuance of the application of operating potential to the "reset" wire. In a similar manner, upon the application of voltage to the input of tube FFLT1, causing the tube to fire, tube FFLT2 is pulsed out. The —150 volt source and resistors connected to the control electrode of each of tubes FFLT1 and FFLT2 are to prevent operation of the tube when less than the operating potential is applied thereto. In the circuits which follow in which this flip-flop arrangement is utilized, it will be represented by a block, with the input wires on the right and left and two output wires extending below, and designated FFL, as shown in Figure 18*a*, with the further designation of the particular application, for example the block VUS, Figure 29.

Referring now to Figure 19, the voltages applied to wires PS1— and PS6— are utilized to control an FFR flip-flop VD to apply voltages to wires VD+ and VD—. If the system is not on the Up Peak program so that voltage is applied to wire PS1— and not on the Intermittent program so that the path to line BO by way of wire PS6— is blocked, the flip-flop is operated to apply voltage to output wire VD+. If on either program, the flip-flop is not operated so that voltage is applied to wire VD—. The connection of wires VD+ and VD— in the circuits will be seen as the description proceeds.

The timing circuits will now be described with respect to which reference will first be had to Figures 20 and 21. A multi-cathode tube ZVT is utilized in these circuits and is controlled by pulsing. The pulses are taken from a pulse amplifying tube PAT which acts to trigger tube ZVT and for which a 371K type tube has been found satisfactory. The control of tube PAT is by means of a relaxation oscillator, shown at the right-hand end of Figure 20. Upon the application of voltage by way of resistor R178 to condenser CO43, the condenser is charged until its potential above point 20–C is sufficient, say 80 volts, to break down the 50 volt tube VST2. Assuming that point 20–C is biased by resistors R179 and R199 to 15 volts above line BO, as soon as tube VST2 breaks down, the potential of point 20–C rises to 45 volts. Upon the breakdown of tube VST2 the condenser discharges and, when its potential above point 20–C falls below 50 volts, tube VST2 stops conducting and the condenser starts charging again. This provides a pulsating voltage between 15 and 45 volts at the point 20–C.

The voltage at point 20–C is applied by way of wire WTP to the left-hand control electrode of tube PAT of Figure 21. Owing to condenser CO45, these voltage pulses are added to the voltage of the +165 volt source for application to the control electrode. Resistor R220 in the cathode circuit of tube PAT causes the tube to stop conducting as each control pulse subsides while condenser CO46 enables the tube to break down upon the application of each control pulse. Since tube PAT has a 180 volt tube drop, a pulsating voltage ranging between +330 volts, the voltage of the source to which the anode of tube PAT is connected and exists when the tube is not conducting, and +180 volts, the tube drop when the tube is conducting, is obtained at point 21–D. These pulses are superimposed on say +135 volts obtained at point 21–E off voltage divider R210, R212. Rectifier V155 enables the point 21–F to be at a potential of +135 volts or less. Thus a voltage exists at point 21–F which is a maximum of +135 volts and falls off to −15 volts below line BO as each pulse is applied.

The voltage of point 21–F is applied to the transfer cathodes or guides ZI. Assuming that cathode ZCO was the last to glow, then the transfer cathode ZI1 will be the next to glow when the applied pulse voltage decreases to −15 volts, as this now provides the greatest potential difference with respect to the common anode ZAN. As the voltage pulse starts to decay and the voltage of transfer cathode passes above that of line BO, the glow is transferred to cathode ZC1 whose voltage is that of line BO and thereby of greater potential difference with respect to the anode. The transfer is not back to cathode ZCO because condenser CO48 delays the decay of the potential of this cathode and thus insures a greater potential difference between the anode and cathode ZC1. In a like manner, the glow is transferred to each succeeding cathode as each pulse is applied and back to cathode ZCO from cathode ZC9. A potential taken off voltage divider R203, R204 is applied to the shield ZVS of the tube.

The rate at which the pulses provided by tube PAT is applied and thus the rate at which the transfers to the successive cathodes of tube ZVT takes place is controlled by the voltage applied to charge condenser CO43 of the relaxation oscillator at the right-hand end of Figure 20. The higher the voltage, the faster the charging rate and the more pulses per unit of time. The value of the voltage applied to charge condenser CO43 is controlled by the timing adjustment tubes TAT which may be of the 5823 type. The voltage applied to the anodes of these tubes is taken off voltage divider R162, R180 connected between a source of 350 volts and line BO. The 350 volt source provides full wave rectified alternating current. The voltage taken off the voltage divider is approximately 220 volts. But one of these tubes is conductive at a time. When a tube breaks down, the potential of wire TAW is reduced to that of the anode potential of the tube which has broken down. This in turn is determined by the value of resistance in the cathode circuit of the tube, for example resistor R181 for tube TAT1. These cathode resistors are adjusted to different ohmic values so as to cause different values of voltage to be applied to charge condenser CO43, depending upon the tube which is conductive.

The selection of the tube which is conductive is determined by which tube has firing potential applied to its control anode. Tubes TAT3 to TAT8 are controlled in accordance with whether the cars are early or late in arriving at say the upper terminal as will be explained in connection with Figures 23 to 25. A late car causes conduction of a TAT tube to decrease the voltage applied to condenser CO43 and thus to decrease the pulsing rate, while an early car causes conduction of a TAT tube to increase the voltage applied to condenser CO43 and thus to increase the pulsing rate. Tube TAT1 controls the charging rate when the system is operating under the Up Peak or Down Peak program, +120 volts being applied to wire PS1+ or wire PS5+, while tube TAT2 controls the charging rate when the system is operating under the Intermittent program, +120 volts being applied to wire PS6+. The value of the cathode resistor for tube TAT1 is such as to give the highest condenser charging voltage so as to pulse tube ZVT at the fastest rate and thus provide the shortest time interval. The value of the cathode resistor for tube TAT2 is such as to give the lowest condenser charging voltage so as to pulse tube ZVT at the slowest rate and thus provide the longest time interval.

The circuits for each of the TAT tubes is similar to those for tube FFRT1 of Figure 16, previously described. Voltage biasing tubes control the level of the voltages applied to the control electrodes. Referring to tube TAT1 by way of example, the voltage biasing tube for which is designated VBT3, when wire PS1+ is connected to line BO, the voltage applied to the control electrode is insufficient to fire the tube. Upon the connection of wire PS1+ to the +120 volts source when switch PS1 is operated, the potential is raised to a value which causes tube TAT1 to fire. This fixes the voltage of wire TAW at a value determined by the effective value of resistor R181. Owing to the fact that the voltage of the 350 volt source is full wave, the tube ceases conduction upon the connection of wire PS1+ back to line BO.

Thus it is seen that, due to the different values of cathode resistors for tubes TAT, the pulsing rate is determined by which tube TAT is conductive. The pulsing rate in turn determines the rate at which the glow is transferred from cathode to cathode in tube ZVT. Tube ZVT provides the timing intervals for dispatching the cars as will be seen as the description proceeds.

Before proceeding with the description of the control of tubes TAT3 to TAT8, it is to be pointed out that a car is sometimes not available for dispatching as the timing interval expires and may be so late that a detent operation is desirable to suspend operation of the timing circuits. This is effected through the control of the detent tube DET in Figure 20. When voltage is applied to wire VDT+, the detent tube is rendered conductive. Since there is no resistance in its cathode circuit, when this tube conducts, it lowers the potential of wire TAW to tube drop above line BO or 65 volts. This is insufficient to cause breakdown of tube VST2 so that pulsing ceases and timing is suspended.

The circuits for controlling the voltage applied to wire VDT+ are illustrated in Figure 22. The voltage applied to wire VDT+ is taken off the cathode resistor R238 for amplifying tube VDT, the circuits for which are similar to those for tube FFRT1 of Figure 16. The input voltage applied to tube VDT is determined by the voltage of point 22–0. There are four parallel circuits (22–1, 22–2, 22–3, 22–4) controlling tube VDT.

In circuit 22–1, as will be seen from the description of Figure 29, when a down timed dispatching operation has been initiated, voltage is applied to wire VDS+ and, when an up timed dispatching operation has been initiated, voltage is applied to wire VUS+. When either of these conditions obtains, blocking one path to line BO, and the dispatching is not consummated by the time that timer tube ZVT has reached cathode ZC4 to cause application of potential to wire ZVT4, blocking the other path to line BO, the current flow through resistor R230 is reduced. This raises the potential at point 22–0 to a value to cause conduction of tube VDT.

In circuit 22–2, as will be seen from the description of Figure 32, if no car is selected for up dispatching or, if a car is selected and no car call for that car or landing call is in registration, voltage is applied to wire VL—. If this condition exists at the time that the timer has caused application of potential to wire ZVT9 to block this path to line BO, when the system is under the Intermittent program so that the path by way of wire PS6+ to line BO is blocked, the potential of point 22–0 is raised to a value to cause conduction of tube VDT.

In circuit 22–3, if the system is under the Up Peak program so that the path by way of wire PS1+ to line BO is blocked, and if no car is selected or if selected no car call for that car or landing call is registered so that the path by way of wire VL— to line BO is blocked at the time that the timer reaches cathode ZC4 to block the path by way of wire ZVT4 to line BO, the potential of point 22–0 is raised to a value to cause conduction of tube VDT.

In circuit 22–4, as will be seen from the decription of Figure 28, if the timed dispatching operations are being initiated alternately, the path by way of wire VS— to line BO is blocked. Under such conditions if, on any program other than Intermittent or Up Peak so that the path by way of wire VD+ to line BO is blocked, a down timed dispatching operation has been initiated to block the path by way of wire VDS+ to line BO, and is not consummated by the time the timer reaches cathode ZC9 to block the path by way of wire ZVT9 to line BO, the potential of point 22–0 is raised sufficiently to cause conduction of tube VDT.

When tube VDT is rendered conductive under any of the above conditions, it applies sufficient voltage to operate the detent tube DET to suspend the timing. When the condition which caused the detent is removed, the detent tube is rendered non-conductive, permitting the timing circuits to continue in operation.

As pointed out previously, tubes TAT3 to TAT8 of Figure 20 control the rate of pulsing of tube ZVT of Figure 21 in accordance with whether the cars are early or late in arriving at the upper terminal floor. These tubes are controlled by the late-early car multi-cathode tube LECT of Figure 25. The input circuits for tubes TAT3 to TAT8 are respectively connected by wires LECT1 to LECT6 to the cathodes LECC1 to LECC6 of tube LECT. When cars are early in arriving at the upper terminal floor, the cathode glow of tube LECT is shifted successively to cathodes LECC of lower numbers, i.e. to the left, while when cars are late, the shift is to cathodes of higher numbers, i.e. to the right.

The circuits for determining whether the cars are early or late are shown in Figure 23. Upon the arrival of a car, say car *a*, at the upper terminal, +120 volts are applied to wire UT*a*+, as will be seen from the description of Figure 44. Contacts SCD1*a* are closed incident to the arrival of the car as will be seen from the description of Figure 40, these contacts being provided to prevent unwanted operations. This causes the charging of condenser CO61 through resistor R251. The charging of the condenser is delayed, the extent of delay being dependent on the adjustment of resistor R251. When the charge on the condenser reaches a certain amount, tube ECT is rendered conductive. This tube, like tube FFRT1 of Figure 16, may be of the 5823 type. A biasing voltage is provided from the 200 volt 4$\phi$ (rect.) source by way of condenser CO60 to which the voltage of condenser CO61 is added for application to the control anode of tube ECT. The circuit constants may be chosen so that tube ECT is rendered conductive about 4 to 6 seconds after the arrival of a car at the upper terminal. When tube ECT conducts, a potential due to the potential drop across cathode resistor R253 is applied to wire ECT+, blocking this path to line BO. If at the same time, the down timed dispatching operation has not been initiated so that the path to line BO is blocked by way of wire VDS—, the potential applied to wire WEC from the +120 volt source is raised to indicate the arrival of an early car at the upper terminal. When selected car *a* has been dispatched, contacts SCD1*a* separate and condenser CO61 discharges quickly by way of rectifier V186 and resistors R248 and R252. Thus, upon the subsequent arrival of another car, condenser CO61 is charged as before to register another early car provided tube ECT is rendered conductive before the next timed dispatching operation is initiated.

When the down timed dispatching operation is initiated, +120 volts are applied to wire VDS+ to cause the delayed charging of condenser CO63 through resistor R257. This voltage is added to the biasing voltage applied from the 200 volt 4$\phi$ source by way of condenser CO65 to which the voltage of condenser CO63 is added and when the combined voltage attains a certain value, late car tube LCT is rendered conductive. Potential due to the potential drop across cathode resistor R255 is thus applied to wire LCT+. If at this time, no car has been selected for down dispatching so that the paths to line BO by way of wires WT*a*—, WT*b*—, WT*c*— and WT*d*— are all blocked, the potential applied to wire WLC from the +120 volt source is raised to indicate that a car is late. When a car becomes selected, the path to line BO by way of wire WT— for that car is unblocked, lowering the potential applied to wire WLC. Incident to the selection, the down timed dispatching operation is consummated and condenser CO63 is discharged by way of rectifier V202, resistor R258 and wire VDS+. As a result of the consummation of the dispatching operation, voltage is again applied to wire WT— for the selected car and the circuits are restored for detecting another late car.

Wires WEC and WLC are connected in the circuits of Figure 24 to control the operation of pulse generating tubes PGT1 and PGT2. These tubes may be of the 371K type, like tube PAT of Figure 21. Referring first to the circuits for tube PGT2, the voltage from wire WEC is added to the voltage of the +165 volt source owing to condenser CO73 and applied to the control electrode of the tube. This causes conduction of tube PGT2 to take place. At this time, condensers CO69 and CO71 are in a charged state, the charging circuit for condenser CO69 being from the +330 volt source through resistors R272, R278 and R281 to line BO, and the charging circuit for condenser CO71 being from the +330 volt source through resistors R272, R275, R277 and R281. Voltage divider resistors R271 and R281 provide a potential of say 15 volts at points 24–F. Thus with the condensers charged, the potential at points 24–D and 24–E also is 15 volts. As soon as tube conduction takes place, the potential at the anode of the tube falls to +180 volts. Thus the potential at the right-hand side of condenser CO71 falls to +180 volts with the result that the potential at the left-hand side of condenser CO71 falls to —135 volts. Similarly, the potentials on the two sides of condenser CO69 fall but, due to the ratio of resistors R275 and R278, to a higher value, say 210 volts and —105 volts. These condensers discharge through tube PGT2. As condenser CO71 is smaller than condenser CO69 (say .005 mf. as compared to .01 mf.) and as it has less resistance in its discharge circuit, it discharges more quickly than condenser CO69. Thus the potential of point 24–D rises more quickly than that of point 24–E. As a result, the potential of wire WG2, as tube PGT fires, initially falls to a greater extent below line BO than wire WG1 and then, as the discharge of the condensers takes place, becomes less negative than wire WG1. Tube PGT2 is not maintained conductive from the +330 volt source after the initial pulse but by the discharge of the condensers until their voltages have decreased to the value of the tube drop, whereupon tube PGT2 extinguishes and the condensers are recharged.

A similar operation is had in connection with the circuits for tube PGT1. The voltage from wire WLC, added to the +165 volt source voltage is applied to the control anode. This causes conduction of the tube and reduction of the potentials on the right-hand sides of charged condensers CO68 and CO70. The potential of condenser CO70 decreases to the lower value and the condenser discharges more quickly with the result that the potential of wire WG1, as tube PGT1 fires, falls to a greater extent below line BO than wire WG2 and then, as the discharge of the condensers takes place, becomes less negative than wire WG2. These sequences of predominant potentials below line BO are utilized to control the direction of shift of cathode glow in tube LECT of Figure 25.

Referring back to Figure 25, wire WG1 is connected to the transfer cathodes G1 while wire WG2 is connected to the transfer cathodes G2. Assuming for example that cathode LECC3 is aglow, upon a car coming in early at the upper terminal, the potentials of wires WG1 and WG2 are reduced to below that of cathode LECC3 and, owing to the fact that the reduction is greater in case of wire WG2, the glow shifts to transfer cathode G2–3. As the condensers discharge and the potential of wire WG2 rises above that of wire WG1, the glow shifts to transfer cathode G1–2. As tube PGT2 ceases conduction and the voltage of transfer cathode rises above that of line BO, the glow is transferred to cathode LECC2. Should another car come in early, the glow is similarly transferred to cathode LECC1. Should a car come in late at the upper terminal, owing to the fact that the reduction in potential is greater in case of wire WG1, the glow shifts from say cathode LECC3 to transfer cathode G1–3, then to transfer cathode G2–4 as the potential of wire WG1 rises above that of wire WG2 and then to cathode LECC4 as the condenser discharge ceases. As previously pointed out, the potential of the cathode which is aglow is applied by way of wire LECT for that cathode to the control electrode of the tube TAT controlled thereby to adjust accordingly the rate that the pulses are applied to tube ZVT and thus the duration of the dispatching interval.

The LECT tube is effective only during the interim programs (Balanced, Heavier Up and Heavier Down). This operation is had by providing contacts PS1–1, PS5–1 and PS6–1 of the Up Peak, Down Peak and Intermittent program switches in the circuit connecting the anode LECAN of tube LECT to the +330 volt source. Thus when the group supervisory system is operating under either the Up Peak program, the Down Peak program or the Intermittent program, the corresponding contacts in the circuit to the anode are separated, rendering the LECT tube ineffective.

The control of the ZVT tube (Figure 21) which has so far been described is such that the glow is transferred from cathode to cathode in continuous sequence. The circuits are also arranged so that under the Up Peak and Intermittent programs the timing circuits may be recycled when a car is dispatched. This may be effected by the circuit arrangement shown in Figure 26. If the group supervisory system is under either the Up Peak program or the Intermittent program so that the path by way of wire VD— to line BO is blocked and if the up dispatching operation has been consumated so that the path by way of wire VHO+ to line BO is blocked as will be explained in connection with Figure 41, voltage is applied from the +120 volt source by way of voltage biasing tube VBT13 to render timing recycling tube TRT conductive. This tube may be of the 5823 type and its control anode circuit is similar to that described for tube FFRT1 of Figure 16. When the tube is rendered conductive, its anode potential drops to 70 volts (tube drop) or 95 volts below its previous potential of 165 volts. This drop in potential is transmitted as a pulse through condenser CO81 by way of wire HRP to cathode ZC1, lowering its potential from that of line BO to —95 volts. This causes transfer of the glow to cathode ZC1, the cathode which was glowing being extinguished by the lowering of the anode potential 95 volts as a result of the lowering of the ZC1 cathode potential. Thus the timing is recycled from the time of consummation of the dispatching operation.

Before describing the control exercised by tube ZVT on the dispatching of the cars, it is to be pointed out that the initiation of dispatching operations is further dependent upon whether there are an even or odd number of cars under the control of the group supervisory system. The circuits for registering whether an even or odd number of cars is under supervision are illustrated in Figure 27. As will be seen from the description of Figure 44, when a car is under the control of the group supervisory system, the path by way of its wire XCS— to line BO is blocked and when a car is not under the control of the group supervisory system, the path by way of its wire XCS+ to line BO is blocked. There are seven parallel circuits (27–1, 27–2, 27–3, 27–4, 27–5, 27–6, 27–7) controlled by voltages applied to the wires XCS— and XCS+ for the various cars for controlling the odd-even FFR flip-flop VE. With this circuit arrangement, any combination of only two cars under group supervision, i.e., cars *a* and *b* in circuit 27–1, cars *a* and *c* in circuit 27–2, cars *a* and *d* in circuit 27–3, cars *b* and *c* in circuit 27–4, cars *b* and *d* in circuit 27–5, cars *c* and *d* in circuit 27–6, or all four cars under group supervision, circuit 27–7, causes sufficient voltage to be applied from the +120 volt source to cause operation of the flip-flop to apply voltage to output wire VE+. Should three cars be under group supervision, a path to line BO is unblocked, such as by way of wire XCS*c*+ or XCS*d*+ in circuit 27–1, wire XCS*b*+ or XCS*d*+ in circuit 27–2, etc., so that no voltage is applied to the flip-flop. Thus the flip-flop is not operated and voltage is applied to wire VE—.

The output voltages of Figure 27 are utilized in Figure 28 to control another FFR flip-flop VS to establish whether the timed dispatching operations to dispatch the cars under the interim programs from the upper and lower terminals should be initiated simultaneously or alternately. There are two parallel input circuits (28–1, 28–2) for flip-flop VS. In circuit 28–1, when operation is under the Balanced program so that the path to line BO by way of wire PS2+ is blocked and an even number of cars are under group supervision so that the path to line BO by way of wire VE+ is blocked, sufficient voltage is applied to flip-flop VS to cause operation thereof to apply voltage to wire VS+. In circuit 28–2, when operation is under either the Heavier Up program or the Heavier Down program so that one path to line BO is blocked, either by way of wire PS3+ or wire PS4+ and an odd number of cars are under group supervision so that the other path to line BO by way of wire VE— is blocked, sufficient voltage is applied to flip-flop VS to cause operation thereof to apply voltage to wire VS+. If under the Balanced program, an odd number of cars are under group supervision so that the path to line BO by way of wire VE+ is unblocked or, if under either the Heavier Up or Heavier Down program, an even number of cars are under group supervision so that the path to line BO by way of wire VE— is unblocked, the flip-flop is not operated and voltage is applied to wire VS—. The application of voltage to wire VS+ registers that the timed dispatching operations to be initiated simultaneously and the application of voltage to wire VS— registers that the timed dispatching operations are to be initiated alternately.

The voltage of wires VS+ and VS— are utilized along with the control exercised by timing tube ZVT (Figure 21) to control the initiating of the timed dispatching operations. The circuits for this control are shown in Figure 29. The up timed dispatching operation is initiated by the timing circuits upon the transfer of cathode glow to cathode ZCO of tube ZVT, regardless of whether the number of cars under group supervision is even or odd. When the glow transfer to cathode ZCO takes place, the potential drop across its cathode resistor R213 is applied by way of wire ZVTO to the input of the FFL flip-flop CT, causing operation of this flip-flop to apply voltage to wire CT+. The application of voltage to wire CT+ causes a pulse, due to condenser CO84 in the circuit, to be applied to operate the FFL flip-flop VUS to initiate the up timed dispatching operation.

The operation of flip-flop CT to apply voltage to wire CT+ also causes operation of the FFL flip-flop VDS to initiate a down timed dispatching operation, provided simultaneous dispatch initiating operations are indicated. Two parallel circuits (29–1, 29–2) control the input circuit of the flip-flop. In circuit 29–1, if simultaneous dispatch initiating operations are indicated so that the path to line BO by way of wire VS+ is blocked, the application of voltage to wire CT+ causes the application of a pulse from the +120 volt source to operate flip-flop VDS. Thus, under the interim programs the down timed dispatching operations are initiated simultaneously with the up timed dispatching operations, provided that under the Balanced program an even number of cars is under group supervision and provided that under the Heavier Up or Down program an odd number of cars is under group supervision. In circuits 29–2, when the cathode glow proceeds to cathode ZC5 of the timing tube ZVT, voltage is applied to reset flip-flop CT. This applies voltage to wire CT–. If conditions are such that simultaneous dispatch initiating operations are not indicated so that the path to line BO by way of wire VS– is blocked, the application of voltage to wire CT–, due to condenser CO85, causes a pulse to be applied from the 120 volt source to operate flip-flop VDS. Thus, under the interim programs the up and down timed dispatching operations are initiated alternatively provided that under the Balanced program an odd number of cars is under group supervision and that under the Heavier Up and Heavier Down programs an even number of cars is under group supervision.

Inasmuch as the path to line BO by way of wire VS– is blocked in Figure 28 when not under an interim program, it is blocked under the Down Peak program. Thus flip-flop VDS in Figure 29 is operated to initiate timed dispatching operations under the Down Peak program each time the glow in tube ZVT reaches cathode ZC5.

"Car balance" operations may be provided so as to distribute the cars to balance them against traffic conditions under the interim programs. A circuit arrangement such as shown for controlling the balancing relays DBR and UBR of Figure 4 of the aforesaid patent to Glaser and Hornung, No. 2,589,242, may be utilized and contacts of these relays have been illustrated in Figure 31. In addition to other controls herein provided, the balancing relays are controlled by car direction relays CU, one for each car. The circuits for the coil of car direction relay CU*a* for car *a* are shown in Figure 30. With the car set for up, the path to line BO by way of wire DG*a*+ is blocked. Thus, upon the dispatching of selected car *a* on its upward trip, whereupon the path to line BO by way of wire SCD*a*– is blocked, sufficient voltage is applied to the control electrode of thyratron tube CUT*a* to cause conduction to take place and thus the operation of relay CU*a*. This relay also engages contacts CU1*a* so that when the car reaches the upper terminal and voltage is applied to wire SCD*a*+, as will be seen from the description of Figure 40, a holding circuit is established for relay CU*a*. When the down dispatching operation is initiated, the path to line BO is unblocked by way of line DG*a*+ so that as a result of the discontinuance of the application of voltage to wire SCD*a*+, tube CUT*a* stops conducting and relay CU*a* drops out.

Referring now to Figure 31, if the group supervisory system is under one of the interim programs so that the path is blocked to line BO by way of wire VUB+, the FFL flip-flop VUM is not being reset so that the path is blocked to line BO by way of wire VHO, the up timed dispatching operation has not been initiated so that the path is blocked to line BO by way of wire VUS– and a condition of unbalance arises in which more cars are on the down trip than the up trip for the particular program, contacts UBR1 engage to cause operation of flip-flop VUM to initiate an up balance dispatching operation. Similarly, if the group supervisory system is under one of the interim programs so that the path is blocked to line BO by way of wire VUB+, the FFL flip-flop VDM is not being reset so that the path is blocked to line BO by way of wire VHR–, the down timed dispatching operation has not been initiated so that the path is blocked to line BO by way of wire VDS– and a condition of unbalance arises in which more cars are on the up trip than the down trip for the particular program, contacts DBR1 engage to cause operation of flip-flop VDM to initiate a down balance dispatching operation. Condensers CO89 and CO90 are arranged in the circuits to line BO to prevent the initiation of a balance dispatching operation under conditions where a temporary false unbalance exists.

Before describing the control of the group dispatching circuits of Figure 33 by the timed and balance dispatch initiating operations, reference will be made to Figure 32 which provides a control voltage whenever a car is selected at the lower terminal and has a car call above or there is a landing call above. This voltage is utilized in controlling the up group dispatching circuits under the Intermittent or Up Peak programs. Assume car *a* for example has been selected. This blocks the path to line BO by way of wire WB*a*+ as will be explained in describing Figure 36. Thus if car *a* has a car call above, blocks the path to line BO by way of wire HC*a*+, or there is a landing call above, which blocks the path to line BO by way of wire HH*a*+, or as soon as such car or landing call is registered, voltage is applied to operate FFR flip-flop VL. The output voltages of this flip-flop are applied in the detent circuits of Figure 22 and in the group dispatching circuits of Figure 33.

Referring to Figure 33, circuits for controlling an up group dispatching FFR flip-flop WUS and a down group dispatching FFR flip-flop VRR are illustrated. There are three paths to line BO in the control of flip-flop WUS, namely 33–1, 33–2, 33–3. When the group supervisory system is not under the Intermittent or Up Peak program, voltage is applied to wire VD+, blocking path 33–3. Also voltage is applied to wire PS1–, blocking path 33–2. Thus when a timed up dispatching operation is initiated under these conditions, applying voltage to wire VUS+ to block path 33–1, sufficient voltage is applied from the +120 volt source to operate flip-flop WUS. Thus, the up group dispatching flip-flop WUS is operated each time an up timed dispatching operation is initiated when the group supervisory system is under any one of the interim programs. This operation is not had under the Down Peak program, as under this condition voltage is applied to wire PS5+ to cause flip-flop WUS to remain operated.

When operation is under the Intermittent program so that voltage is applied to wire PS1– but not to wire VD+, flip-flop WUS is operated by the up timed dispatch initiating circuits only in the event that the selected car has a car call or a landing call is in registration to cause application of voltage to wire VL+ to block path 33–3 to line BO. If desired to render flip-flop WUS subject only to calls under the Intermittent program, this may be effected by closing manual switch MS which continuously blocks path 33–1 to line BO under the Intermittent program with voltage applied to wire PS6+.

When operation is under the Up Peak program, voltage is not applied to wires VD+ and PS1–. Under such conditions, path 33–3 to line BO is blocked only by a call registration applying voltage to wire VL+ and path 33–2 to line BO is blocked by application of voltage to wire VDT+ or as a result of the application of voltage to wire VBD+. As will be seen from the description of Figure 37, voltage is applied to wire VBD+ when a second car is at the lower terminal landing in addition to the selected car. When this condition arises, the voltage is amplified by tube PCT in accordance with the circuits for tube FFRT1 of Figure 16. The voltage across cathode resistor R263 is applied to circuit 33–2, blocking the path to line BO. If an additional car does not arrive at the lower terminal before a further portion of an interval after the up timed dispatch initiating operation takes place, voltage is applied to wire VDT+, blocking path 33–2 to line BO. Thus, when the group supervisory system is operating under the Up Peak program, flip-flop WUS is operated by the up timed dispatch initiating circuits, provided a car in addition to the selected car is at the lower terminal at the time the time interval expires or, if not, upon the arrival of such car or upon the expiration of an additional portion of an interval, whichever occurs first.

When flip-flop WUS is operated, it applies voltage to wire WUS+ in the circuits controlling path 33-2 to line BO, obviating unwanted operations due to a race of circuits. When an up balance dispatching operation is initiated to cause operation of flip-flop VUM (Figure 31), voltage is applied to wire VUM+ in Figure 33 to cause immediate operation of flip-flop WUS.

The down group dispatching flip-flop VRR is controlled by three parallel circuits, namely wires VD—, VDS+ and VDM+. If the group supervisory system is operating under either the Intermittent or the Up Peak program, voltage is applied to wire VD— to cause flip-flop VRR to remain in operated condition. If not under either of these programs, flip-flop VRR is operated at intervals by the down timed dispatch initiating circuits, applying voltage to wire VDS+. If a down balance dispatching operation is initiated, voltage is applied to wire VDM+ to cause operation of flip-flop VRR.

Flip-flops WUS and VRR act to cause dispatching of the selected cars. Involved in the selection of the cars and in the application of voltage to wire VDB referred to in describing Figure 33 is the availability of the cars for dispatching. The circuits for detecting availability of car *a* for dispatching from the lower terminal are illustrated in Figure 34, the circuits for the other cars being the same. With car *a* under the control of the group supervisory system so that the path by way of wire XCS*a*— to line BO is blocked, it becomes available upon its arrival at the lower terminal which blocks the path by way of wire LT*a*+ to line BO, provided its direction remains set for down so that the path by way of wire DG*a*— to line BO is blocked, and provided also, when there are passengers in the car as it arrives at the lower terminal, the passengers are discharged or a time interval expires sufficient to enable the passenger discharge to be effected, whereupon the remaining path to line BO is blocked. This time interval is provided by condenser CO95*a*. When the load in the car is above that certain amount, switch LS*a* is operated, connecting wire LS*a*— to line BO so that there is no charge on condenser CO95*a*. When the car arrives at the lower terminal, contacts LT1*a* separate and when the load in the car decreases to below this amount, switch LS*a* drops out, connecting wire LS*a*— to the +120 volt source. This charges condenser CO95*a*, delayed by resistor R269*a*. When the condenser charge reaches a certain amount, sufficient voltage is applied from the +120 volt source to cause operation of the FFR flip-flop VB*a*, rendering car *a* available. If the load in the car when the car arrives at the lower terminal is less than this amount, wire LS*a*— is connected to the source so that the condenser is in a partially charged state. Thus when contacts LT1*a* separate, less time is required for the condenser charge to reach this certain amount. In either event should the car become empty before the condenser charge reaches this certain amount, load weighing switch 2LSW*a* opens, blocking the path to line BO.

The circuits for detecting the availability of car *a* for dispatching on a down trip are illustrated in Figure 35, the circuits for the other cars being the same. The availability of the car is detected on an FFR flip-flop VT*a*. There are two parallel circuits (35-1, 35-2) for controlling the flip-flop. In circuit 35-1, with car *a* under the control of the group supervisory system, blocking the path to line BO by way of wire XCS*a*—, it becomes available upon its arrival at the upper terminal, blocking the path to line BO by way of wire UT*a*+, provided its direction remains set for up so that the path to line BO by way of wire DG*a*+ is blocked. This causes operation of the flip-flop, rendering car *a* available for down dispatching.

Circuit 35-2 is to cause operation of the flip-flop to provide "late car reversal" operation. The late car reversal zone will be assumed to begin with the third floor. Detection of the entry of the car into this zone is afforded by the engagement of late car reversal brush LCB*a* on the selector advancer panel with third floor contact LCC3*a*, the brush being elongated to maintain circuit continuity as it passes from one contact to the next. The engagement of the brush with a contact blocks one path from resistor R274*a* to line BO. Thus with car *a* under the control of the group supervisory system, blocking the path to line BO by way of wire XCS*a*—, and an up car so that the path to line BO is blocked by way of wire DG*a*+, it becomes available for down dispatching when it is in the late car reversal zone, provided a down dispatching operation has been initiated and group dispatching flip-flop VRR operated, blocking the path to line BO by way of wire VRR+, it has reached its highest call so that the paths to line BO by way of wires HC*a*— and HH*a*— are blocked and no other car set for up is at the upper terminal, blocking the remaining path to line BO. This causes operation of flip-flop VT*a*, rendering car *a* available for down dispatching. As regards the path to line BO controlled by whether another car set for up is at the upper terminal, so long as no car has reached the upper terminal, voltage is applied to wire UT— for each car, blocking all four paths to line BO. Should any car be at the upper terminal, say car *a*, for the path to line BO for that car to be blocked, it must be set for down so that voltage is applied to wire DG*a*—. This latter circuit is also connected to the left-hand side of rectifier V362 for each of the other cars.

Car selection circuits are provided for both up dispatching and down dispatching. The car selection circuits for up dispatching are illustrated in Figure 36. These circuits involve an up car selection tube WBT for each car. These tubes may be cold cathode triodes, the operating circuits for each tube being similar to those for tube FFRT1 of Figure 16. They are rendered conductive in continuous sequence until conditions for a car selection are satisfied, whereupon the tube for the car to be selected remains conductive. So long as an up dispatching operation is not being reset so that the path to line BO by way of wire VHO— for each tube is blocked, no car is available for up dispatching so that the path by way of wire VB— for each tube to line BO is blocked, and each car either is not at the lower terminal, set for down or being dispatched so that the path to line BO is blocked by way of either wire LT—, wire DG— or wire SCD— for that car, then each tube as it becomes conductive, subject to a slight time delay due to the charging of the condenser in its cathode circuit, for example condenser CO104*b*, blocks by way of output wire WBT for that tube the remaining path to line BO for the next tube, rendering that tube conductive. As each tube becomes conductive, it renders the preceding tube non-conductive. This is due to the condensers in the cathode circuits. Referring to tubes WBT*b* and WBT*c* for example, at the instant tube WBT*c* is rendered conductive, its cathode is at line BO potential owing to the fact that condenser CO104*c* is in an uncharged state. As the potential of the anode of tube WBT*c* falls to tube potential drop above line BO, this momentarily fixes the anode potential of tube WBT*b* at the same value. As condenser CO104*b* is in a charged state at this time and therefore its potential is above that of line BO, this reduces the potential across tube WBT*b* to a value below that which sustains tube conduction.

Each time a WBT tube becomes conductive, it acts to block the path by way of its output wire WBT+ to line BO in the control circuit for its FFL flop-flop WB. This dies not cause operation of the flip-flop, however, unless the car for which the flip-flop is provided is then available. Assume that during the sequence, car *a* becomes available for dispatching from the lower terminal floor. This unblocks the path by way of wire VB*a*— to line BO in the control circuits for tube WBT*b*. Thus, upon tube WBT*a* for car *a* becoming conductive, it cannot cause conduction of tube WBT*b* and tube WBT*a* remains conductive. Since car *a* is now available for dispatching, the path by way of wire VB$a$+ to line BO is blocked in the control circuits for flip-flop WB$a$ so that upon the blocking of the path by way of wire WBT$a$+ by tube WBT$a$ becoming conductive, the flip-flop is operated. This selects car $a$ for dispatching. As soon as the car is selected, its direction becomes set for up, due to the blocking of the path by way of wire WB$a$+ to line BO in the circuits for direction holding relay DG$a$ in Figure 11. Thus the path by way of wire DG$a$— to line BO in the circuit for flip-flop VB$a$ in Figure 34 is unblocked and tht flip-flop is no longer operated. This blocks the path by way of wire VB$a$— to line BO in the control circuits for tube WBT$b$ in Figure 36. However, at the same time the path to line BO by way of wire DG$a$— becomes unblocked and since the car is at the lower terminal and has not been dispatched so that the paths by way of wires LT$a$— and SCD$a$— are also unblocked, the transfer from tube WBT$a$ to tube WBT$b$ is not effected. When relay SCD$a$ is operated to dispatch car $a$, the path to line BO by way of wire SCD$a$— becomes blocked. However, at the same time, relay SCD$a$ causes operation of the VHO flip-flop which acts to unblock the path to line BO by way of wire VHO—. Condenser CO108$b$ acts during the transition to prevent sufficient rise in the potential applied to the input of tube WBT$b$ to start conduction. Flip-flop VHO acts to reset flip-flop VUS which renders flip-flop WUS unoperated and which in turn renders flip-flop VHO unoperated as will be seen as the description proceeds. This may be said to consummate the dispatching operation as flip-flop VHO now blocks the path to line BO by way of wire VHO—, permitting tube WBT$b$ to become conductive to restart the car selection circuits in operation to select another car.

If, as tubes WBT restart their cycle, another car is available or becomes so, this car is selected as the next to be dispatched. Assume for example this to be car $c$. As tube WBT$c$ becomes conductive, it remains so and flip-flop WB$c$ is operated to select car $c$ in the manner above described. If at the time an up dispatching operation is consummated, two cars are available at the lower terminal floor for selection, the one which is selected is that one the tube WBT for which is first to become conductive. Assume for example that car $b$ is the one being dispatched and that cars $a$ and $d$ are available. As the selection cycle resumes, car $d$ is the one which will be selected as tube WBT$d$ is ahead of tube WBT$a$ in the sequence. With this arrangement, the cars are selected in the order in which they are found available, regardless of the order of their previous dispatch.

When the group supervisory system is under the Down Peak program, the path by way of wire PS5+ to line BO is blocked for each car. Thus, as each car arrives at the lower terminal floor and becomes available, its WB flip-flop is operated and it is selected immediately for up dispatching.

Involved in the reset of the WB flip-flops are the circuits of Figures 37 and 38. In Figure 37, when a car becomes available at the lower terminal, it causes voltage to be applied to wire VBA+. If it is the only car at the lower terminal, its immediate selection renders the application of voltage to wire VBA+ to appear as a pulse. However, if another car becomes available while a car is selected, voltage remains applied to its wire VB+ and thus to wire VBA+. A similar voltage is applied to wire VBD+ except that due to the action of condenser CO118, the pulse is not effective. The voltage applied to wire VBD+ is utilized in the circuits of Figure 33, previously described. The voltage applied to wire VBA is utilized in the circuits of Figure 38.

Referring now to Figure 38, the circuits are for controlling the reset of a WB flip-flop. There are individual reset circuits for each car. Those for car $a$ are illustrated, the reset circuits for the other cars being the same. Four parallel circuits (38–1, 38–2, 38–3, 38–4) are provided for controlling the voltage applied to wire WBR$a$. In circuit 38–1, if in addition to the selected car there is an available car at the lower terminal, the path by way of wire VBA to line BO is blocked so that upon the dispatching of car $a$, incident to which the path by way of wire SCD$a$— to line BO is blocked, voltage is applied to wire WBR$a$ which is applied in Figure 36 to reset flip-flop WB$a$. This circuit is particularly useful in effecting early extinguishing of the hall lantern of a car being dispatched under conditions where another car is available. If another car is not available, the reset of the WB flip-flop may be delayed and this is illustrated as being done by circuit 38–3 by the application of voltage to wire LT$a$— as the car leaves the floor. If car $a$ is removed from the group supervisory system and is selected for up dispatching at the time, the application in circuit 38–4 of voltage to wire XCS$a$+ causes reset of flip-flop WB$a$ along the the restart of the selection cycle by the unblocking of the path by way of wire VB$a$— to line BO, to select another car. When the group supervisory system is under the Intermittent program so that the path by way of wire PS6+ to line BO is blocked, if car $a$ is selected, its WB$a$ flip-flop is reset upon the registration of a car call which blocks the path by way of wire HC$a$+ to line BO.

The car selection circuits for down dispatching are illustrated in Figure 39. These circuits are very similar to those in Figure 36 for up dispatching, above described. A down selection tube WTT is provided for each car and these tubes become conductive in continuous sequence until selection takes place. So long as a down dispatching operation is not being reset so that the path by way of wire VHR— for each tube to line BO is blocked, no car is available for down dispatching so that the path by way of wire VT— for each tube to line BO is blocked, and each car either is at the lower terminal set for up or dispatched so that the path to line BO is blocked by way of either wire LT+, wire DG+ or wire SCD— for that car, then each tube, as it becomes conductive and its cathode condenser charges, acts to block by way of its output wire WTT+ the remaining path to line BO for the next tube, rendering that tube conductive and the tube which was conductive ceases conduction.

As each tube becomes conductive, it blocks the path by way of its output wire WTT+ to line BO in the control circuit for its flip-flop WT. Then, provided the car for which the flip-flop is provided is then available, blocking the path to line BO by way of its wire VT+, the flip-flop is operated. At the same time the tube WTT for that car remains conductive because of the unblocking of the path to line BO by way of wire VT— for that car. Thus this car is selected for down dispatching. Tube WTT for the selected car remains conductive due to the unblocking of the paths by way of wires DG+, LT+, SCD— and VHR— for that car until the down dispatching operation is consummated. The flip-flop WT for the selected car is reset upon the dispatching of the car, at which time voltage is applied to wire SCD— for that car to effect the reset operation. A condenser, for example condenser CO132 for car $a$, is provided for delaying this reset operation sufficiently to insure the rendering of flip-flop VHR unoperated to restart the car selection cycle to select another car.

If the tubes WTT restart their cycle, another car is available or becomes so, this car is selected as the next to be dispatched in a manner similar to that described in connection with the selection of the other cars for up dispatching. Also in a manner similar to that described in connection with selecting the cars for up dispatching if, at the time the tubes restart their cycle, two cars are available for selection, the one which is selected is that one the tube WTT for which is first to become conductive. Thus, the cars are selected for down dispatching in the order in which they are found available, regardless of the order of their previous dispatch.

A selected car is dispatched upon the initiating of the dispatching operation by the control exercised through the selected car dispatching relay SCD for that car. The circuits for relay SCD*a* for car *a* are illustrated in Figure 40, those for the other cars being the same. Four parallel circuits (40–1, 40–2, 40–3 and 40–4) are provided for controlling relay SCD*a*. When the car arrives at the lower terminal and becomes available, voltage is applied to wire VB*a*+ (circuit 40–1). This voltage is applied through voltage divider R373*a*, R376*a* to the control electrode of tube SCDT*a*, which may be a thyratron, causing this tube to conduct and thus cause operation of relay SCD*a*. This causes the application of voltage to wire SCD*a*+ to maintain the relay operated (circuit 40–2) after the car becomes selected, which blocks the path by way of wire WB*a*+ to line BO, the path by way of wire XCS*a*— to line BO being blocked as the car is under group supervision, provided the car is not fully loaded so that the path by way of wire LS*a*— to line BO is blocked, until an up dispatching operation is initiated and flip-flop WUS is operated to unblock the path by way of wire WUS— to line BO. Should the car become loaded before the up dispatching operation is initiated, the path by way of wire LS*a*— to line BO is unblocked, causing relay SCD*a* to drop out. When the car becomes available for down dispatching, voltage is applied to wire VT*a*+ (circuit 40–3) to cause operation of relay SCD*a* which becomes self-holding (circuit 40–4) upon its selection for dispatching, which blocks the path by way of wire WT*a*+ to line BO, the path to line BO by way of wire XCS*a*— being blocked because the car is under the group supervisory system, provided that the car is not fully loaded so that the path by way of wire LS*a*— to line BO is blocked and provided further that the cars are not on "zone return" operation which blocks the path by way of wire XVO— to line BO (see discussion of Figure 11), until the down dispatching operation is initiated and flip-flop VRR is operated to unblock the path by way of wire VRR— to line BO. Should the system be switched over to "zone return" operation after the car has become available for down dispatching and has operated relay SCD*a*, the path by way of wire XVO— to line BO is unblocked, causing relay SCD*a* to drop out. When the car is removed from the group supervisory system, the path by way of wire XCS*a*— to line BO is unblocked, breaking the holding circuit for relay SCD*a* which drops out.

When relay SCD*a* is dropped out, say as a result of the initiation of an up dispatching operation, it unblocks the path by way of wire SCD*a*+ to line BO, causing the dropping out of switch ST*a* to close the door and gate and start the car, as explained in discussing Figure 10.

Once a car has been dispatched, the dispatching circuits are restored to their former condition. This involves the reset of flip-flops VUS, VUM, VDS and VDM. The reset of the flip-flops VUS and VUM is effected by up dispatching reset FFR flip-flop VHO, controlled by the circuits illustrated in Figure 41. There are five parallel circuits for controlling flip-flop VHO. Circuits 41–1 to 4 are individual to the elevators and of the same circuitry. Taking for example circuit 41–1 which is for car *a*, upon the dispatch of the car in the up direction as relay SCD*a* drops out, as explained in describing Figure 40, the path by way of wire SCD*a*— to line BO is blocked, causing operation of flip-flop VHO, the path by way of wire WB*a*+ to line BO being blocked because car *a* is the selected car. The connection of wire WB*a*+ in this circuit is made to obviate the unwanted operation of flip-flop WHO by car *a* at a floor other than the lower terminal. Condenser CO140*a* is provided to maintain the voltage on the left-hand side of rectifier V522*a*, after loss of the voltage applied to wire WB*a*+, for an interval sufficient to insure the operation of flip-flop WHO and thus the reset of flip-flops VUS and VUM. When flip-flop VHO operates, it blocks the path by way of wire VHO+ to line BO in circuit 41–5. This maintains flip-flop VHO operated until flip-flop WUS has become unoperated to remove voltage from wire WUS+. The return of flip-flop WUS to unoperated condition is effected by operation of flip-flop VHO to apply voltage to the reset circuits of flip-flop VUS and flip-flop VUM, causing reset of whichever of these flip-flops is operated. This causes the return of flip-flop WUS to unoperated condition, in turn effecting the return of flip-flop VHO to unoperated conditoin. This consummates the up dispatching operation.

The reset of flip-flops VDS and VDM is effected by down dispatching reset FFR flip-flop VHR, controlled by the circuits illustrated in Figure 42. There are five parallel circuits for controlling flip-flop VHR. Circuits 42–1 to 4 are individual to the elevators and of the same circuitry. Taking for example circuit 42–1, which is for car *a*, upon the dispatch of the car in the down direction as relay SCD*a* drops out, the path by way of wire SCD*a*— to line BO is blocked, causing operation of flip-flop VHR, the path by way of wire WT*a*+ to line BO being blocked because car *a* is the selected car. The connection of wire WT*a*+ in this circuit is made to obviate the unwanted operation of flip-flop VHR by car *a* at a floor other than the one at which the down dispatching operation takes place. Condenser CO132*a* acts to maintain the voltage on the left-hand side of rectifier V547*a* in Figure 42 for an interval sufficient to insure the operation of flip-flop VHR and thus the reset of flip-flops VDS and VDM. When flip-flop VHR operates, it blocks the path by way of wire VHR+ to line BO in circuit 42–5. This maintains flip-flop VHR operated until flip-flop VRR has become unoperated to remove voltage from wire VRR+. The return of flip-flop VRR to unoperated condition is effected by operation of flip-flop VHR to apply voltage to the reset circuits of flip-flop VDS and flip-flop VDM to cause reset of whichever of these flip-flops is operated. This causes the return of flip-flop VRR to unoperated condition, in turn effecting the return of flip-flop VHR to unoperated condition. This consummates the up dispatching operation. If flip-flop VRR is in operated condition at the time the group supervisory system is switched to either the Intermittent or Up Peak program, the application of voltage to wire VD— blocks the path to line BO, thus causing the operation of flip-flop VHR to prevent an unwanted down dispatching operation when the system is returned to an interim program.

Reference may now be had to Figure 43 which illustrates circuitry for controlling a motor generator set shut down relay. This operation is effected when the group supervisory system is thrown over to the Intermittent program. The circuits for but one of the cars is illustrated, namely car *b*, the circuits for cars *c* and *d* being the same. Circuits are not provided for shutting down the motor generator set for car *a* as it will be assumed that this car provides the service under the Intermittent program. When under the Intermittent program, the path by way of wire PS6+ to line BO is blocked. When car *b* arrives at the lower terminal after completing its operation under the preceding program, or if it is at the lower terminal at the time the throw-over to the Intermittent program takes place, the other path to line BO by way of wire LT*b*+ is blocked. This enables the voltage applied to point 43–0 from the +120 volt source to be raised to a value to render tube SDRT*b* conductive, this being delayed sufficiently by the action of condenser CO150*b* to enable other operations to be completed before shut-down of the motor generator set takes place. When tube SDRT*b* is rendered conductive, shutdown relay SDR*b* is operated to shut down the motor generator set, the control circuits for the driving motor of the set not being shown as they are well understood in the art. Relay SDR*b*, upon operation, engages contacts SDR2*b* in Figure 43*a* to cause energization of the coil of door close switch DC*b* effecting closing of the door and gate upon expiration of the door time interval. Similarly, contacts SDR1*b* in opening prevent energization of the door open switch coil DO*b* to reopen the door and gate. Relay SDR*b* also operates contacts which will be referred to in describing Figure 44.

Reference may now be had to Figure 44 which illustrates the circuits for the remaining controls previously referred to. Among these are the clock operated switches CAM and CPM and a day switch DAY controlled thereby, referred to in describing Figure 13. Switches CAM and CPM are controlled by contacts of a 24-hour clock. The clock motor CM is connected to a 110-volt A.C. source, as indicated. The clock operates contacts AMC as by an adjustable cam on a driven disc to complete the circuit for the coil of switch CAM, causing this switch to be operated say from 8:50 a.m. to 9:20 a.m. It also operates contacts PMC as by another adjustable cam on a driven disc to complete the circuit for the coil of switch CPM, causing this switch to be operated say from 4:50 p.m. to 5:20 p.m. In addition to the contacts in the circuits of Figure 13, switch CAM engages contacts CAM3 to complete a circuit for the operating coil of switch DAY. Switch DAY upon operation connects wire DAY+ (Figure 13) to the +120 volt source. It also engages contacts DAY1 to bypass contacts CAM3, establishing a self holding circuit. In addition to the contacts in the circuits of Figure 13, switch CPM connects wire CPM+ (Figure 13) to the +120 volt source and separates contacts CPM3 to break the holding circuit for switch DAY.

The circuits for the coils of the upper and lower terminal switches UT and LT are controlled by the positions of the cars. Those for car *a* are shown, the circuits for the other cars being the same. When car *a* arrives at the lower terminal, brush TB*a* on the synchronous panel of the selector for car *a* engages lower terminal stationary contact LTC*a*, completing a circuit for the coil of lower terminal switch LT*a*. This switch operates to engage contacts to connect wire LT*a*+ to the +120 volt source and to connect wire LT*a*— to line BO. Thus the path to line BO by way of wire LT*a*+ in Figures 11, 34 and 39 is blocked while the path to line BO by way of wires LT*a*— in Figures 9, 12, 36 and 38 is unblocked. Also, switch LT*a* separates contacts LT1*a* in Figure 34. Upon the car leaving the lower terminal, switch LT*a* drops out, connecting wire LT*a*+ to line BO and wire LT*a*— to the +120 volt source. Thus the path to line BO by way of wire LT*a*+ in Figures 11, 34 and 39 is unblocked and by way of wire LT*a*— in Figures 9, 12, 36 and 38 is blocked. A similar action occurs when brush TB*a* engages contact UTC*a* as the car arrives at the upper terminal. Switch UT*a* is operated to connect wire UT*a*+ to the +120 volt source and wire UT*a*— to line BO. Wire UT*a*+ is connected in the circuits of Figures 23 and 35 and wire UT*a*— in the circuits of Figures 11 and 35.

The circuits for the coils of the load switches LS are controlled by load weighing switches. The circuit for the coil of load switch LS*a* for car *a* is illustrated, those for the other cars being the same. When load weighing switch 1LWS*a* closes, it completes a circuit for the coil of load switch LS*a*. This switch operates to connect wire LS*a*+ to the +120 volt source, applying voltage at the points in Figures 11 and 12 to which this wire is connected. It also connects wire LS*a*— to line BO, this wire being connected in Figures 8, 34 and 40. When switch 1LWS*a* opens, switch LS*a* drops out connecting wire LS*a*+ in Figures 11 and 12 to line BO and wire LS*a*— in Figures 8, 34 and 40 to the +120 volt source. Switch 1LWS*a* and switch 2LWS*a* of Figure 34 may be arranged for operation by depression of the car platform, with switch 1LWS*a* set to operate at say 80% full load on the hoisting motor and switch 2LWS*a* set to operate with only one passenger in the car.

The circuits for the coils of the under group supervision switches XCS are controlled both manually and automatically. The circuits for the coils of switch XCS*a* for car *a* and of switch XCS*b* for car *b* are illustrated, those for the other cars being the same as for car *b*. Switch XCS*a* when not operated connects wire XCS*a*+ to line BO and wire XCS*a*— to the +120 volt source. This places the car under the group supervisory system. These connections are reversed when the switch is operated, taking the car out of the group supervisory system. This switch is controlled by one pole 1DIC*a* of a double pole double throw manually operable switch, say at the starter's station. When in the lower position, deenergizing switch XCS*a*, it connects line DIC*a*+ (Figure 8 to the +120 volt source. When thrown to the upper position to operate switch XCS*a* and thus take car *a* out of the control of the group supervisory system, pole 2DIC*a* connects point 43–0 of Figure 43 to line BO, preventing the operation of relay SDR*b*. In the circuits for the coil of switch XCS*b* for car *b*, contacts SDR3*b* acts, when the motor generator set for car *b* is shut down, to cause operation of switch XCS*b* to remove car *b* from the control of the group supervisory system. At the same time contacts SDR4*b* act to disconnect wire DIC*b*+ from the +120 volt source. By arranging one blade of switch DIC*a* in the circuits for relay SDR*b*, this relay is prevented from operating when car *a* is manually removed from service and car *b* provides service instead of car *a* under the Intermittent program. It is to be understood that the circuits may be arranged so that when the system is thrown over to the Intermittent program, the last car of those not manually removed from control of the group supervisory system has its relay SDR remain deenergized and thus acts to provide service.

In describing the operation of the group supervisory system, it will be assumed first that all cars are at the lower terminal and that no calls are in registration. Under such conditions, inasmuch as there is no potential drop across resistor R84 (Figure 13*a*) with no calls registered, program selection switch PS6 is not operated, placing the group supervisory system under the Intermittent program. Thus, the path by way of wire PS6+ to line BO is blocked, automatically shutting down the motor generator sets for cars *b*, *c* and *d* and removing these cars from the group supervisory system and causing them to park with their doors and gates closed as explained in describing Figures 43 and 44. As car *a* is the only car under the group supervisory system, the path to line BO by way of wire XCS*a*— is blocked. Thus it became the only available car and flip-flop VB*a* (Figure 34) was operated, unblocking the path to line BO by way of wire VB*a*— and blocking the path to line BO by way of wire VB*a*+. As a result, flip-flop WB*a* is operated, selecting car *a* (Figure 36). Also, relay SCD*a* (Figure 40) and switch ST*a* (Figure 10) are operated so that the door and gate for car *a* remain open.

Upon the registration of a landing call, say a down call for the third floor, potential is placed on contact HHC3*a* (Figure 7). This potential is picked up by brush HHB2*a* (Figure 9) causing operation of highest landing call switch HH*a*. Thus the paths to line BO by way of wires WB*a*+ and HH*a*+ are blocked, causing operation of flip-flop VL (Figure 32). Upon the expiration of the timing interval provided by the circuits of Figures 20 and 21, flip-flop WUS (Figure 33) is operated, as the paths to line BO by way of wires PS1—, VUS+ and VL+ are all blocked. Upon the unblocking of the path by way of wire WUS— to line BO, relay SCD*a* (Figure 40) drops out. This unblocks the path by way of wire SCD*a*+ to line BO, causing the dropping out of start and stop switch ST*a* (Figure 10) to cause closure of the door and gate and starting of the car in the up direction as explained in describing Figure 3. Incident to the dropping out of relay SCD*a*, flip-flop VHO (Figure 41) is momentarily operated to consummate the dispatching operation.

As brush HHB2*a* runs off contact HHC2*a*, relay HH*a* is dropped out, there being no up landing call for the third floor and no landing call for a floor above. As a result, the path to line BO by way of wire HH*a*+ is unblocked in circuit 11–3 of Figure 11, permitting the dropping out of relay DG*a*. This moves contact DG2*a* to the right in Figure 8, rendering brush DHB*a* effective. Upon the engagement of brush DHB*a* with stationary contact DHC3*a* (Figures 7 and 8), the down third floor landing call is picked up, causing automatic cancellation of the call and, by the application of voltage to wire HST*a*+, the operation of switch ST*a* (Figure 10) to cause the car to be brought to a stop at the third floor and the door and gate to be opened as the stop is made (Figure 3). As a result of the dropping out of relay DG*a*, the car is set for downward travel as it is brought to a stop. Assume that the entering passenger touches the first floor car button 1C*a*. Upon expiration of the time interval provided by switch NT*a* (Figure 3), the door and gate are reclosed and the car is started in the down direction. Upon the engagement of brush CB*a* with contact CC1*a* as the car approaches the lower terminal, tube CST*a* (Figure 5) is rendered conductive, causing application of voltage to wire CST*a*+ to cause operation of switch ST*a* and thus the car to be brought to a stop at the lower terminal and the door and gate to be opened as the stop is made.

If a passenger enters the car at the lower terminal and registers a car call, say for the third floor, potential is placed on contact HCC1*a* (Figure 4) which is picked up by brush HCB2*a* (Figure 6), causing operation of switch HC*a*. This causes application of voltage to wire HC*a*+ and thus by way of circuit 38–2 to wire WBR*a* (Figure 38). This resets flip-flop WB*a* (Figure 36) and thus unblocks the path to line BO by way of wire WB*a*+ in Figure 40, causing the dropping out of relay SCD*a* to effect the starting of the car even though the timing interval has not expired. Under these conditions, the dropping out of relay SCD*a* causes operation of flip-flop VHO (Figure 41) which blocks the path to line BO by way of wire VHO+, rendering tube HTT (Figure 26) conductive. As a result a pulse is applied to recycle the timing tube ZVT (Figure 21).

The car picks up its third floor call upon the engagement of brush CB*a* with stationary contact CC3*a* (Figures 4 and 5), causing the automatic cancellation of the call and, by the application of voltage to wire CST*a*+, the operation of switch ST*a* (Figure 10) to cause the car to be brought to a stop at the third floor and the door and gate to be opened as the stop is made (Figure 3). As no call exists for a floor above, relay HC*a* (Figure 4) is dropped out, unblocking the path by way of wire HC*a*+ (Figure 11, circuit 11–2), permitting the dropping out of relay DG*a* to set the car for downward travel as it is brought to a stop.

Upon the operation of the time interval provided by switch NT*a* (Figure 3), the door and gate are reclosed and the car is started in the down direction. Upon the engagement of brush SLB*a* with contact SLT*a* (Figure 10) as the car approaches the lower terminal, switch ST*a* is operated, causing the car to be brought to a stop at that terminal and the door and gate to be opened as the stop is made. The car then awaits another call. If as the timing tube reaches cathode ZC9 to apply potential to wire ZVT9, the car has not returned to the lower terminal or, if it has, has on call above so that voltage is applied to wire VL—, all paths to line BO in circuit 22–2 of Figure 22 are blocked, rendering tube VDT conductive and thus causing the conduction of tube DET (Figure 20) to suspend the timing operation. As soon as the car returns and is selected or, if this has occurred, as soon as a call is registered, the path to line BO by way of wire VL— is unblocked and the timing operation is resumed and the car is dispatched as the glow is transferred to cathode ZCO, as previously explained.

Assume now that the time approaches in the morning for populating the building and that a number of passengers enter car *a* and register a sufficient number of different car calls to cause operation of program selection switches PS6 and either PS1 or PS4 (Figure 13), throwing the system over from the Intermittent program to either the Up Peak or the Heavier Up program. The resultant unblocking of the path to line BO by way of wire PS6+ causes dropping out of relay SDR (Figure 43) for each of the cars *b*, *c* and *d*, restarting their motor generator sets and causing the dropping out of switches XCS (Figure 44) for these cars to restore them to the control of the group supervisory system. The dropping out of switch XCS for each of these cars causes operation of flip-flop VB (Figure 34) for that car, rendering the car available. Also, the dropping out of relay SDR for each of these cars, for example car *b*, causes engagement of contacts SDR1*b*, completing a circuit for the coil of door open switch DO*b* (Figure 43*a*) and thus causing the opening of the door and gate for that car, as explained for car *a* in describing Figure 3.

Inasmuch as operation under the Heavier Up program, if at all at this time, would be of short duration and as operation would then shift to under the Up Peak program, it will be assumed that switch PS1 is operated to provide operation under the Up Peak program. Upon the expiration of the timing interval, flip-flop VUS (Figure 29) operates to apply voltage to wire VUS+. As a result, flip-flop WUS (Figure 33) is operated to cause dispatching of selected car *a*, inasmuch as the rendering of other cars available has caused the application of voltage to wire VBD+ and the registration of the car calls has caused the application of voltage to wire VL+. Incident to the dispatching of car *a*, with the consummation of the dispatching operation, voltage is applied to wire VHO— which causes car *b* to be selected as explained in describing Figure 36. Car *b* is then dispatched at the expiration of the next timing interval, provided it has a car call above (or a landing call exists for a floor above), causing voltage to be applied to wire VL+ (Figure 32). Cars *c* and *d* are similarly selected and dispatched.

If at any time after the dispatch of car *c*, no car other than the selected car is at the lower terminal when the timing interval expires, operation of flip-flop WUS (Figure 33) to dispatch the selected car is delayed until another car arrives, applying voltage to wire VBD+ or an additional time interval expires to apply voltage to wire VDT+ by circuit 22–1 of Figure 22, whichever occurs first. Under this condition, incident to the consummation of the dispatching operation, the application of voltage to wire VHO+ causes tube TRT (Figure 26) to apply a pulse to recycle the timing tube and thus start a new timing period. Should a car at the lower terminal become loaded before the time interval expires, the resultant unblocking of the path to line BO by way of wire LS— for that car causes the dropping out of relay SCD (Figure 40) for that car and, if not the selected car, the setting of the car for upward travel (Figure 11, circuit 11–4), and thus the immediate dispatch of that car on its upward trip. If it be the selected car, voltage will also be applied to wire WB+ for that car in Figure 41 to cause operation of flip-flop VHO and thus cause restart of the timing interval.

The cars reverse and return to the lower terminal upon answering their highest calls as described for car *a* under the Intermittent program. The cars upon return to the lower terminal are selected for dispatching in the order in which they are found available, regardless of the order of previous dispatch, as explained in describing Figure 36. If, after the dispatch of a car from the lower terminal, no other car is there and none arrives before the timer tube glow is transferred to cathode ZC4, or if another car is there and has no car call or no landing call exists by the time the glow is transferred to cathode ZC4 so that the path to line BO by way of wire VL— is blocked, tube VDT (Figure 22) is rendered conductive by circuit 22–3 to suspend operation of the timer circuits. Upon the arrival of a car and its selection or upon the registration of such a call the path to line BO by way of wire VL— is unblocked, rendering tube VDT non-conductive and thus restarting the timing operation. Thus the car is not dispatched until the glow is transferred to cathode ZCO, providing a period for getting a load in the car without undue sacrifice of service to intending passengers at floors above.

Should car *a* under the Intermittent program, or any car under the Up Peak program, travel to the upper terminal in response to a call, since flip-flop VRR (Figure 33) is maintained operated under such conditions, relay SCD for that car upon operation as the car becomes available is not held in as the car is selected so that the car starts in the down direction upon expiration of the door time interval.

Assume now that the building is sufficiently populated that there is considerable traffic in the down direction as well as in the up direction. Although in the transition to this stage a condition may arise to throw the system first over to the Heavier Up program, it will be assumed for convenience that up and down traffic has become substantially equal. This causes program selection switch PS6 to be operated but not program selection switches PS1, PS3, PS4 and PS5. As a result, program selection switch PS2 (Figure 14) is operated, throwing the system over to the Balanced program. Under this program, flip-flop WUS (Figure 33) is operated to dispatch the selected cars on their upward trips upon expiration of the timing intervals to cause applications of voltage to wire VUS+, the system not being under the Up Peak program so that voltage is applied to wire PS1— and also not being under the Intermittent program so that voltage is applied to wire VD+. The cars are selected in the order in which they are found available, as under the Up Peak program.

Each up car under the Balanced program is maintained set for upward travel by circuit 11–5 of Figure 11 until it is selected for down dispatching (Figure 39). Assuming that the down dispatching interval does not expire before a car reaches the upper terminal, this causes the cars to make terminal to terminal runs. Upon the arrival of each car at the upper terminal its flip-flop VT (Figure 35) is operated, rendering it available, and its flip-flop WT (Figure 39) is operated to select that car, provided it is the only car there and if not, upon the dispatching of the car ahead. Upon the expiration of the timing interval, flip-flop VDS (Figure 29) is operated to initiate the down timed dispatching operation simultaneously with the initiation of the up timed dispatching operation, an even number of cars being under the supervisory system so that voltage is applied to wire VS+. This causes operation of flip-flop VRR (Figure 33), in turn causing the dropping out of relay SCD (Figure 40) for the selected car and thus the starting of the car in the down direction and operation of flip-flop VHR to consummate the down dispatching operation. The cars are selected for dispatching in the down direction in the order in which they are found available, regardless of their order of previous dispatch as explained in describing Figure 39.

Under the Balanced program and other interim programs, if the selected car arrives at a terminal prior to the expiration of the dispatching interval, it awaits the expiration of the interval to be dispatched, flip-flop WUS (Figure 33) being operated upon operation of flip-flop VUS to initiate the up dispatching operation and flip-flop VRR being operated upon operation of flip-flop VDS to initiate the down dispatching operation. If the selected car arrives at a terminal after the expiration of the dispatching interval, the group dispatching flip-flop, say WUS, is maintained operated until the car arrives and is selected so as to cause the dispatching of the car, subject to the expiration of the door time interval.

If a car is late in arriving at the upper terminal and has no call at the upper terminal, it can stop and reverse at a floor in the late car reversal zone, provided it has reached its highest call. Under such conditions, flip-flop VT (Figure 35) for that car is operated to render the car available, inasmuch as for that car brush LCB is in engagement with a late car reversal zone contact LCC, the car is set for up applying voltage to wire DG+, the down timed dispatching operation has been initiated applying voltage to wire VRR+ and the car has reached its highest call applying voltage to wires HC— and HH—, and inasmuch as no other car set for up is at the upper terminal, blocking the remaining path to line BO in circuit 35–2 for that car.

Should a car be so late that after initiation of the dispatching operation, the timer tube has operated to the point of applying voltage to wire ZVT4, tube VDT (Figure 22) is rendered conductive by circuit 22–1, causing the detent tube DET (Figure 20) to suspend operation of the timing circuits. As soon as a car arrives, say car *a* at the lower terminal, it becomes available by the operation of flip-flop VB*a* (Figure 34) and relay SCD*a* (Figure 40) is thus operated. As soon as it becomes available, it is selected by the operation of flip-flop WB*a* (Figure 36) which sets the car for upward travel, unblocking a path to line BO by way of wire DG*a*— to render flip-flop VB*a* unoperated. Since flip-flop WUS (Figure 33) is operated, unblocking the path to line BO by way of wire WUS—, this causes the dropping out of relays SCD*a* and thus the dispatching of the car on its upward trip, subject to the expiration of the door time interval, and the operation of flip-flop VHO (Figure 41) to consummate the dispatching operation. Upon the reset of flip-flop VUS (Figure 29) in the consummation of the dispatching operation, the path to line BO by way of wire VUS+ is unblocked, rendering tube VDT and in turn tube VDE non-conductive and thus restarting the timing circuits in operation. Similar detent operation is had when a car is similarly late for its down dispatching operation.

Assume now that the outgoing lunch period arrives and that traffic predominates in the down direction. This causes operation of program selection switch PS3 (Figure 13*c*), throwing the system over to the Heavier Down program, program selection switch PS2 (Figure 14) being dropped out as a result of the unblocking of the path to line BO by way of wires PS3—. Inasmuch as under the assumed conditions an even number of cars are under the group supervisory system, the path to line BO by way of wire VE— is unblocked so that flip-flop VS (Figure 28) is not operated. This blocks the path to line BO by way of wire VS— in Figure 29. Thus, the control of the operation of flip-flop VDS to initiate the down timed dispatch initiating operation is transferred from wire ZVT0 to ZVT5, causing the up and down time dispatching operations to be initiated alternately. If this operation takes place at a time in the switching sequence such that the next timed dispatch operation to be initiated after the program change is a down operation, the cars will thereafter be dispatched to provide on the average more cars on the down trip than on the up trip. If the changeover takes place at a time that the next timed dispatch initiating operation is an up one, the balance circuits act to engage contacts DBR1 (Figure 31), as will be understood from the aforementioned Patent No. 2,589,242, causing operation of flip-flop VDM to initiate a down balance dispatching operation, which, together with the next timed dispatch initiating operation being a down one, causes two cars to be dispatched on their downward trips before an up car is dispatched, thus giving the desired balance of cars.

After the outgoing lunch period, traffic in the up and down direction will probably revert to substantially equal status, causing the dropping out of switch PS3 and as a result the operation of switch PS2 to return the system to the Balanced program. If this changeover takes place just after an up dispatching operation, the cars will be properly balanced for the Balanced program. If not, flip-flop VUM will be actuated by the engagement of contacts UBR1 to obtain the desired balance.

Assume now that people start returning after their lunch period and that traffic now predominates in the up direction. The change to heavier up traffic causes operation of program selection switch PS4 (Figure 13), throw.ng the system over to the Heavier Up program, switch PS2 (Figure 14) dropping out as a result of the unblocking of the path to line BO by way of wire PS4—. As described for the Heavier Down program, operation of flip-flop VDS (Figure 29) to initiate the down timed dispatching operations is controlled by wire ZVT5 so that the up and down timed dispatching operations are initiated alternately. If the switchover takes place at a time when the next timed dispatching operation to be initiated is an up one, the cars will thereafter be dispatched to provide on the average more cars on the up trip than on the down trip. If not, flip-flop VUM will be actuated by the engagement of contacts UBR1 to provide this distribution of the cars.

In the operations described under the interim programs, it has been assumed that an even number (four) of cars were operating under the group supervisory system. Under this assumption flip-flop VE (Figure 27) is operated and voltage is applied to wire VE+ but not to wire VE— so that flip-flop VS (Figure 28) is operated under the Balanced program to initiate simultaneous dispatch of the cars from opposite terminals as above described. Under the Heavier Up and Heavier Down programs, flip-flop VS is not operated so that the dispatching operations are initiated alternately as described. Should the number of cars under group supervision be changed, say to three, flip-flop VE is dropped out. Thus voltage is applied to wire VE— but not to wire VE+ so that under the Balanced program flip-flop VS is not operated but under the Heavier Up program and Heavier Down program, it is operated. Therefore, dispatching operations are initiated alternately under the Balanced program and simultaneously under the Heavier Up and Heavier Down programs. If upon a change in the number of cars under group supervision, the number of cars on the up and down trips as a result of the next initiation of a dispatching operation is such as not to provide the desired balance of the cars for the particular traffic conditions, the balance device operates to initiate a corrective dispatching operation to provide the desired balance. It is believed that this will be understood from the previous description.

It is seen from the above that the dispatch operations are initiated alternately under the Balanced program when an odd number of cars are under group supervision and under the Heavier Up and Heavier Down programs when an even number of cars are under group supervision. Under conditions of alternate dispatch should a car, after initiation of the up dispatching operation, be so late in becoming available that the timer tube has operated to the point of applying voltage to wire ZVT4, tube VDT (Figure 22) acts to cause suspension of the operation of the timing circuits. Similarly, should a car after initiation of the down dispatching operation be so late in becoming available that the timer tube has operated to the point of applying voltage to wire ZVT9, tube VDT is rendered conductive by circuit 22–4 to suspend operation of the timing circuits. As soon as the late car becomes available and the dispatching operation is consummated, the reset of the up dispatch initiation flip-flop VUS to unblock the path to line BO by way of wire VUS+ in case a down car is late, and the reset of down dispatch initiation flip-flop VDS to unblock the path to line BO by way of wire VDS+ in case an up car is late, causes release of the detent and thus the resumption of the timing operation.

Assume now that the time arrives for depopulating the building in the evening. This will be evidenced by the increasing number of down calls that are registered. This causes operation of program selection switch PS5 (Figure 13) to throw over the group supervisory system to the Down Peak program. If at the time the system is operating under the Balanced program, switch PS2 (Figure 14) is dropped out as a result of the unblocking of the path by way of wire PS5— to line BO. If operating under the Heavier Down program, switch PS3 (Figure 13) is dropped out as a result of unblocking of the path by way of wire PS5— to line BO. During the Down Peak program, operation of flip-flop VDS (Figure 29) to initiate the dispatching of the cars on their downward trips takes place upon the transfer of the glow to cathode ZC5 to apply voltage to wire ZVT5, since the path to line BO by way of wire VS— is blocked as explained in describing Figure 28. Since flip-flop WUS (Figure 33) is caused to remain operated under the Down Peak program, due to the blocking of the path to line BO by way of wire PS5+, relay SCD (Figure 40) for each car upon operation as the car arrives at the lower terminal and becomes available, is not held in as the car is selected, as the path to line BO by way of wire VRR— is unblocked. Thus the car starts on its upward trip upon expiration of the door time interval.

When operation is under the Down Peak program and when it is under the Up Peak program, a short time interval is provided by causing tube TAT1 to be conductive as set forth in describing Figure 20. When operation is under the Intermittent program a long time interval is provided by causing tube TAT2 to be operated. Under the interim programs, tube TAT3 to TAT8 control the duration of the timing interval and these tubes in turn are controlled by whether the cars are early or late in arriving at the upper terminal as set forth in describing Figures 23, 24 and 25.

Reference may now be had to the block diagram of Figure 45 which indicates connections between the circuits of the various figures. These blocks are designated in accordance with operations of the circuits to which they relate and the various figures in which the circuits appear are indicated. When no calls are in registration, the Service Demand Circuits control the Program Selection Circuits to cause the system to be on the Intermittent Program. Under this program only one car provides service and this car is selected by the Car Selection Circuits. The Car Selection Circuits also prepare the Selected Car, Call Above Circuits for operation. Upon the registration of a landing call in the Call Registration Circuits, the Highest Call Circuits act to cause operation of the Selected Car, Call Above Circuits. This, together with the operation of the Timed Dispatch Initiating Circuits upon operation of the Timing Circuits at the expiration of the timing interval, causes operation of the Group Dispatching Circuits. This causes operation of the Selected Car Dispatching Circuits, which in turn cause operation of the Start and Stop Control Circuits and thus together with the control exercised by the Direction Control Circuits actuate the Hoisting Motor and Door Motor Control Circuits to cause the closing of the door and gate and starting of the selected car in the up direction. Incident to the starting of the car, the Selected Car Dispatching Circuits cause operation of the Dispatch Consummation Circuits to restore the Timed Dispatch Initiating Circuits and the Group Dispatching Circuits. The Call Registration Circuits render the Call Pick-Up and Cancellation Circuits effective to pick up and cancel the call as the car approaches the floor for which the call is registered. As a result, the Start and Stop Control Circuits act to control the Hoisting Motor and Door Motor Control Circuits to cause the car to be brought to a stop at that floor. Upon the car reaching its highest call, the Highest Call Circuits cause operation of the Direction Control Circuits to condition the car for downward travel on its next start and to render the Call Pick-up and Cancelaltion Circuits effective to pick up and cancel the call if it be a down landing call. When the car makes the stop at the floor of highest call, the Hoisting Motor and Door Motor Control Circuits act to close the door and gate and start the car in the downward direction to return it to the lower terminal. In the above example, had a car call been registered in the selected car instead of a landing call, the Highest Call Circuits and Program Selection Circuits act through the Car Selection Circuits to cause the immediate starting of the car. A detent operation is had if the car does not return to the lower terminal before the next timing interval expires, the Detent Circuits being controlled by the Timing Circuits, Program Selection Circuits and Selected Car, Call Above Circuits to effect this operation.

Upon sufficient up service demand, the Service Demand Circuits, as affected by the Call Registration Circuits, Load Control Circuits and Direction Control Circuits, act to cause operation of the Program Selection Circuits to throw over the group supervisory system to the Up Peak Program. The Program Selection Circuits cause operation of the Shut Down Circuits to restore the other cars to the group supervisory system. Inasmuch as the Call Registration Circuits acting through the Highest Call Circuits have caused operation of the Selected Car, Call Above Circuits and the Car Availability Circuits are operated, the Group Dispatching Circuits are prepared for operation. As a result, upon the operation of the Timing Circuits, the Timed Dispatch Initiation Circuits are operated to cause operation of the Group Dispatching Circuits and the selected car is dispatched on its upward trip. With the dispatching of the car, the Dispatch Consummation Circuits cause operation of the Car Selection Circuits to select the next car. Each succeeding selected car is dispatched upon the expiration of the timing interval, provided it has a car call or a landing call exists for a floor above as above explained. If no car other than the selected car is at the lower terminal when the timing interval expires, the dispatching of the car is delayed until another car arrives, which causes operation of the Group Dispatching Circuits by the Car Availability Circuits, or until a further interval of time expires, which causes operation of the Group Dispatching Circuits by the Detent Circuits, which ever occurs first. With the dispatch of the car, the Dispatch Consummation Circuits cause operation of the Timing Circuits to restart the timing period. If there is no car at the lower terminal after the expiration of a given portion of a timing interval, the Timing Circuits, Program Selection Circuits and Selected Car, Call Above Circuits cause operation of the Detent Circuits to suspend operation of the Timing Circuits. As soon as a car arrives, the Selected Car, Call Above Circuits cause the Detent Circuits to release the detent and thus resume the timing operation. Should a car become loaded at the lower terminal, the Load Control Circuits cause operation of the Selected Car Dispatching Circuits to effect immediate dispatch of the car. If the dispatched car be the selected car, the Car Selection Circuits cause operation of the Dispatch Consummation Circuits to effect the restart of the timing interval.

When traffic in both directions becomes substantially equal, the Service Demand Circuits act on the Program Selection Circuits to throw over the group supervisory system to the Balanced program. Under this program, the Timed Dispatch Initiating Circuits and thus the Group Dispatching Circuits are actuated by the Timing Circuits to dispatch the selected cars on their upward and downward trips at the expiration of the timing intervals. The Car Selection Circuits are controlled by the Car Availability Circuits and select the cars as they are found available. Also the Car Selection Circuits control the Direction Control Circuits to maintain the cars set for upward travel until they reach the upper terminal and become selected. A car if late may become available in the late car reversal zone without running to the upper terminal. Under such conditions, the Car Selection Circuits controlled by the Car Availability Circuits act on the Direction Control Circuits to render the Call Pick-up and Cancellation Circuits effective to cause the car to be brought to a stop in the late car reversal zone, provided it has reached its highest call. When a car is late, the Selected Car Dispatching Circuits are not actuated until the availability of a car is registered by the Car Availability Circuits. Under such conditions the Group Dispatching Circuits control the Selected Car Dispatching Circuits to cause the car to be started down immediately upon expiration of the door time interval and closure of the gate and door. If a car is considerably late, the Timing Circuits, Timed Dispatch Initiating Circuits and, if the care are being alternately dispatched, the Simultaneous or Alternate Dispatch Circuits control the Detent Circuits to suspend operation of the Timing Circuits.

When conditions arise in which the traffic is heavier in one direction than the other, the Service Demand Circuits act on the Program Selection Circuits to throw over the group supervisory system to the Heavier Down program in case down traffic predominates and to the Heavier Up program in case up traffic predominates. The cars under these programs are time dispatched on both their up and down trips as under the Balanced program.

When conditions arise in which the traffic becomes mostly down as during an outgoing peak, the Service Demand Circuits act on the Program Selection Circuits to throw over the group supervisory system to the Down Peak program. Under this program, the Program Selection Circuits act through the Group Dispatching Circuits to cause the cars to start on the upward trips at the expiration of the door time interval after the stop at the lower terminal. The cars are dispatched on their downward trips at timed intervals, the Timing Circuits acting through the Timed Dispatch Initiating Circuits to control the Group Dispatching Circuits to provide this operation. The Program Selection Circuits act through the Call Pick-up and Cancellation Circuits to prevent the pick-up of up landing calls by cars *a* and *b*.

The Simultaneous or Alternate Dispatch Circuits control the Timed Dispatch Initiating Circuits to cause simultaneous or alternate dispatch initiating operations, depending on the particular program under which the group supervisory system is operating and the number of cars in service. Under the Balanced program, with an even number of cars under the group supervisory system, this causes the dispatching operations to be initiated simultaneously and, with an odd number of cars under the group supervisory system, this causes the dispatching operations to be initiated alternately. Under the Heavier Up and Heavier Down programs this causes, with an even number of cars under the group supervisory system, the dispatching operations to be initiated alternately and, with an odd number of cars under the group supervisory system, the dispatching operations to be initiated simultaneously. The Program Selection Circuits render the Balance Dispatch Initiating circuits effective under the interim programs. If, upon a change to the Balanced program, the Heavier Up program, or the Heavier Down program or, upon a change in the number of cars serving any of these programs, the changeover is effected at a time relative to the initiation of the next dispatching operation that the number of cars on the up and down trips would not be as desired for the particular program, the Balance Dispatch Initiating Circuits control the Group Dispatching Circuits to cause the dispatching of a car in the proper direction to provide the desired relationship. The Timed Dispatch Initiating Circuits act on the Balance Dispatch Initiating Circuits to prevent the balance dispatch of a car at a time when the timed dispatch has been initiated. Upon a balance dispatch operation, the Dispatch Consummation Circuits act to reset the Balance Dispatch Initiating Circuits.

The Program Selection Circuits act on the Timing Circuits to control the timing intervals under the Intermittent and Peak programs. Should the cars come in early or late at the upper terminal under any of the interim programs, the Early-Late Car Control Circuits control the Timing Circuits to reduce the timing interval in case the cars are early and to increase the timing interval in case the cars are late. The Clock Control Circuits act on the Program Selection Circuits to change over the group supervisory system to the Up Peak program in the morning when the building is being populated and to the Down Peak program in the evening when the building is being depopulated.

The Call Pick-Up and Cancellation Circuits control the Start and Stop Control Circuits to cause the cars during their upward trips to stop at floors for which up landing calls are registered and during their downward trips to stop at floors for which down landing calls are registered. If a car becomes loaded, the Load Control Circuits render the Call Pick-Up and Cancellation Circuits ineffective to pick up landing calls and thus cause the car to bypass landing calls automatically until room is again provided by the discharge of passengers.

As many changes could be made without departing from the scope of the invention, it is intended that all matter contained in the above description or shown in the accompanying drawings shall be interpreted as illustrative and not in a limiting sense.

What is claimed is:

1. An elevator system comprising; an elevator car serving a plurality of landings; a hoisting motor for said car; actuating and stopping mechanism for said car; a source of unidirectional voltage; an electroresponsive control adapted when actuated to provide a voltage representative of a certain condition of said system for controlling operation of said system, said control being connected on one side to one side of said source; a resistor connecting the other side of said control to the other side of said source; a plurality of bypass circuits, each providing a connection from the junction of said resistor and control to said one side of said source; unidirectional current conducting means for each of said bypass circuits connected in that circuit with a polarity to prevent current flow therein in a direction toward said control; and a plurality of additional controls, one for each bypass circuit, each adapted to provide with respect to said one side of said source a positive unidirectional voltage representative of a condition of the system different from that represented by the voltages provided by the other of said additional controls and by said first named control and each additional control being adapted when actuated to apply its voltage to the bypass circuit for which it is provided at a point between said unidirectional current conducting means in that circuit and said one side of said source, said control being operable in response to the application of such voltages to all of said bypass circuits but being unoperated when any of said bypass circuits does not have applied thereto said voltage provided for that circuit, whereby operation of said system is controlled by the presence of all or absence of any one of said voltages for application to said bypass circuits.

2. An elevator system comprising; an elevator car serving a plurality of landings; a hoisting motor for said car; actuating and stopping mechanism for said car; a source of unidirectional voltage; a control adapted when actuated to provide a voltage for controlling operation of said system and having electroresponsive actuating means; an input circuit for said actuating means, said actuating means being connected between said input circuit and one side of said source; a resistor connected to said input circuit; means for applying to said resistor positive unidirectional voltage with respect to said one side of said source; a plurality of bypass circuits, each providing a connection from the junction of said resistor and input circuit to said one side of said source; unidirectional current conducting means for each of said bypass circuits connected in that circuit with a polarity to prevent current flow therein in a direction toward said input circuit; and a plurality of additional controls, one for each bypass circuit, each adapted when actuated to provide a positive unidirectional voltage with respect to said one side of said source representative of a condition of the system different from that represented by voltages of the other of said additional controls, and each additional control being adapted when actuated to disconnect the bypass circuit for which it is provided from said one side of said source and to apply its voltage at a point between said unidirectional current conducting means in that circuit and said one side of said source, said control being operable in response to operation of all of said additional controls but being rendered unoperated when any of said additional controls is not operated, whereby operation of said system is controlled by the presence of all or absence of any of said voltages for application to said bypass circuits.

3. An elevator system comprising; an elevator car serving a plurality of landings; a hoisting motor for said car; actuating and stopping mechanism for said car; a source of unidirectional voltage; a control adapted when actuated to cause a certain condition of operation of said system and having electroresponsive actuating means; an input circuit for said actuating means, said actuating means being connected between said input circuit and said one side of said source; a resistor connected to said input circuit; means for applying to said resistor positive unidirectional voltage with respect to said one side of said source; a plurality of bypass circuits, each providing a connection from the junction of said resistor and input circuit to said one side of said source; unidirectional current conducting means for each of said bypass circuits connected in that circuit with a polarity to prevent current flow therein in a direction toward said input circuit; a plurality of control switches, one for each bypass circuit, each adapted to be actuated in response to a condition of operation of the system different from that in response to which the others are actuated and from that caused by said control and each having a pair of breaking contacts connected in the bypass circuit for which it is provided between said unidirectional current conducting means in that circuit and said one side of said source and a pair of making contacts; and means for each bypass circuit responsive to the engagement of said making contacts of said control switch for that bypass circuit for applying to the bypass circuit for which it is provided between said breaking contacts and unidirectional current conducting means in that circuit positive unidirectional voltage with respect to said one side of said source, said control being operable in response to the operation of all of said control switches to separate their breaking contacts and engage their making contacts to disconnect said bypass circuits from said one side of said source and to apply said positive voltage thereto but being rendered unoperated when any of said control switches is not operated to effect such change of connection of the bypass circuit for which that switch is provided.

4. An elevator system comprising; a plurality of elevator cars serving a plurality of landings; a hoisting motor for each car; actuating and stopping mechanism for each car; means for exercising individual control of said cars; means for exercising group supervision of said cars; a source of unidirectional voltage; and control means for each car comprising, a pair of controls, each for performing a different operation of control of said car and each having electroresponsive actuating means, an input circuit for each of said actuating means, said actuating means for each control being connected between said input circuit and one side of said source, a pair of control circuits, one for each of said controls, each of said control circuits being connected to said input circuit for the control for which it is provided, a resistor for each of said control circuits connected in the control circuit for which it is provided, unidirectional current conducting means for each control circuit connected in the circuit for which it is provided between the resistor and input circuit for the control for which the input circuit is provided with a polarity to permit the flow of current therein in a direction toward that input circuit, means for applying to said control circuits positive unidirectional voltage with respect to said one side of said source, a pair of low resistance bypass circuits for each of said control circuits, each bypass circuit providing a connection from the junction of said resistor and unidirectional current conducting means in the control circuit for which it is provided to said one side of said source, means responsive to an individual control operation for said car and to a group supervisory operation for applying to both of said bypass circuits for one of said control circuits positive unidirectional voltage with respect to said one side of said source, means responsive to a different individual control operation for said car and to a different group supervisory operation for applying to both of said bypass circuits for the other of said control circuits positive unidirectional voltage with respect to said one side of said source, each of said control circuits being effective to cause actuation of said control for which it is provided upon said application of positive voltage to both of its bypass circuits but being ineffective to do so so long as either of its bypass circuits does not have said positive voltage applied thereto, whereby each control is actuated in response to a different set of conditions of said system, and unidirectional current conducting means for each of said bypass circuits connected in that circuit with a polarity to prevent current flow therein in a direction toward said resistor.

5. An elevator system comprising; an elevator car serving a plurality of landings; a hoisting motor for said car; actuating and stopping mechanism for said car; a source of unidirectional voltage; a control for said car adapted when actuated to perform a certain operation of control of said system, said control having electroresponsive actuating means; an input circuit for said actuating means, said actuating means being connected between said input circuit and said one side of said source; a pair of control circuits for said control, each connected to said input circuit; unidirectional current conducting means for each control circuit connected in the control circuit for which it is provided with a polarity to permit the flow of current therein in a direction toward said input circuit; means for applying to one of said control circuits positive unidirectional voltage with respect to said one side of said source; a resistor for said one control circuit connected in that control circuit between said unidirectional current conducting means in that control circuit and said voltage applying means; a pair of low resistance bypass circuits, each bypass circuit providing a connection from the junction of said resistor and unidirectional current conducting means in said one control circuit to said one side of said source; an additional control adapted when actuated to perform a different operation of control of said system; means responsive to said additional control for applying to one of said bypass circuits positive unidirectional voltage with respect to said one side of said source, the other bypass circuit acting so long as it does not have positive voltage applied thereto to prevent operation of said first named control by said application of positive voltage to said one bypass circuit; a third control responsive to the occurrence of a third operation of control of said system to apply to the other of said control circuits positive unidirectional voltage with respect to said one side of said source to cause actuation of said first named control; means responsive to said actuation of said first named control for applying to said other bypass circuit positive unidirectional voltage with respect to said one side of said source to establish a holding circuit for said first named control subject to said application of positive voltage to said one bypass circuit; and unidirectional current conducting means for each of said bypass circuits connected in that circuit with a plurality to prevent current flow therein in a direction toward said resistor.

6. An elevator system comprising; an elevator car serving a plurality of landings; a hoisting motor for said car; actuating and stopping mechanism for said car; a source of unidirectional voltage; a control for said car adapted when actuated to cause a certain operation of said system, said control having electroresponsive actuating means; an input circuit for said actuating means, said actuating means being connected between said input circuit and one side of said source; a pair of control circuits for said control, each connected to said input circuit; means for applying to each control circuit positive unidirectional voltage with respect to said one side of said source; unidirectional current conducting means for each control circuit connected in the circuit for which it is provided with a polarity to permit the flow of current therein in a direction toward said input circuit; a resistor for each of said control circuits, each connected between said unidirectional current conducting means in the control circuit for which it is provided and said positive voltage applying means; four low resistance bypass circuits, two for each of said control circuits, each bypass circuit providing a connection from the junction of said resistor and unidirectional current conducting means in the control circuit for which it is provided to said one side of said source; a second control adapted when actuated to cause a different operation of said system; means responsive to actuation of said second control for applying to one of said bypass circuits for each control circuit positive unidirectional voltage with respect to said one side of said source; a third control adapted when actuated to cause another different operation of said system; means responsive to actuation of said third control for applying to the other of said bypass circuits for one of said control circuits positive unidirectional voltage with respect to said one side of said source; a fourth control adapted when actuated to cause still another different operation of said system; means responsive to actuation of said fourth control for applying to the other of said bypass circuits for the other of said control circuits positive unidirectional voltage with respect to said one side of said source, each of said control circuits being effective to cause actuation of said first named control upon said application to both of its bypass circuits of positive voltage but being ineffective to do so so long as either of its bypass circuits does not have positive voltage applied thereto; and unidirectional current conducting means for each of said bypass circuits connected in that circuit with a polarity to prevent current flow therein in a direction toward said resistor.

7. An elevator system comprising; an elevator car serving a plurality of landings; a hoisting motor for said car; actuating and stopping mechanism for said car; a source of direct voltage; a pair of controls for said car, each adapted when actuated to cause a different condition of said system and each control having electroresponsive actuating means; an input circuit for each of said actuating means, said actuating means for each control being connected between said input circuit and one side of said source; a pair of control circuits, one for each of said controls, each of said control circuits being connected to said input circuit for the control for which it is provided; unidirectional current conducting means for each control circuit connected in the circuit for which it is provided with a polarity to permit the flow of current therein in a direction toward the input circuit for the control for which the control circuit is provided; a resistor for each of said control circuits, each connected between said unidirectional current conducting means in the control circuit for which it is provided and the other side of said source; said other side of said source being the positive side; four low resistance bypass circuits, two for each of said control circuits, each bypass circuit providing a connection from the junction of said resistor and unidirectional current conducting means in the control circuit for which it is provided to said one side of said source; three additional controls, each adapted to be actuated in response to a condition of said system different from that caused by either of said first named controls and that in response to which any of the other additional controls is actuated, one of said additional controls when actuated connecting one of said bypass circuits for each control circuit to the positive side of said source, a second of said additional controls when actuated connecting the other of said bypass circuits for one of said control circuits to said positive side of said source, the third of said additional controls when actuated connecting the other of said bypass circuits for the other of said control circuits to said positive side of said source, each of said control circuits being effective to cause actuation of said control for which it is provided upon connection of both of its bypass circuits to said positive side of said source but being ineffective to do so so long as either of its bypass circuits is not connected to said positive side of said source, whereby each control is actuated in response to a different set of conditions of said system, one of which conditions is common to the two controls; and unidirectional current conducting means for each of said bypass circuits connected in that circuit with a polarity to prevent current flow therein in a direction toward said resistor.

8. An elevator system comprising; an elevator car; a hoisting motor for said car; car actuating and stopping mechanism for said car; a source of direct voltage; a plurality of control circuits for said car, each including a resistor connected at one end to the positive side of said source, a plurality of parallel circuits extending from the other end of that resistor to the other side of said source and unidirectional current conducting means in each parallel circuit with a polarity to permit the flow of current to said other side of said source; a plurality of control means, each for performing a different control operation of said car; means for each control circuit for blocking the paths from said other end of said resistor in that control circuit to the other side of said source by way of all of said parallel circuits in that control circuit, said means for one control circuit comprising means responsive to the operation of a certain one of said control means for causing the application of voltage from the positive side of said source to one of said parallel circuits in said one control circuit on said other side of said source side of said unidirectional current conducting means in that parallel circuit and to the operation of a different one of said control means for causing the application of voltage from the positive side of said source to another of said parallel circuits in said one control circuit on said other side of said source side of said unidirectional current conducting means in that parallel circuit, and said means for another of said control circuits comprising means responsive to the operation of said certain one of said control means for causing the application of voltage from the positive side of said source to one of said parallel circuits in said other control circuit on said other side of said source side of said unidirectional current conducting means in that parallel circuit and to the operation of a still different one of said control means for causing the application of voltage from the positive side of said source to another said parallel circuits in said other of said control circuits on said other side of said source side of said unidirectional current conducting means in that parallel circuit; a plurality of electroresponsive means, one for each control circuit, said electroresponsive means for each control circuit being connected to be subject to the potential of said other end of said resistor in that control circuit and being operable upon the raising of the potential of said other end of the resistor in that control circuit by the blocking of all of said paths of that control circuit to the other side of said source but rendered unoperated by the unblocking of any one of such paths to said other side of said source; and means responsive to the operation of each of said electroresponsive means for performing a different control operation of said car.

9. An elevator system comprising; an elevator car serving a plurality of landings; a hoisting motor for said car; actuating and stopping mechanism for said car; call registering means for each of said landings; means for picking up the calls as the car approaches the landings for which the calls are registered; closure means for the car; means for operating said closure means; a source of direct voltage; and start and stop control circuits for said car comprising, a control having electroresponsive actuating means, an input circuit for said actuating means, said actuating means being connected between said input circuit and one side of said source, a resistor connected on one side to said input circuit and on the other side to the other side of said source, said other side being the positive side, three low resistance bypass circuits, each bypass circuit providing a connection from the junction of said resistor and input circuit to said one side of said source for preventing operation of said control, one of said bypass circuits having a pair of feed circuits, means responsive to the car being in operation for applying to a second of said bypass circuits positive voltage with respect to said one side of said source, means responsive to said closure means being closed for disconnecting the third of said bypass circuits from said one side of said source, means responsive to the picking up of a call for applying to one of said feed circuits positive voltage with respect to said one side of said source, thereby causing operation of said control to initiate stopping of the car, means responsive to operation of said control for applying to the other feed circuit positive voltage with respect to said one side of said source to maintain said control operated after the picking up of the call, means responsive to the initiation of the opening of said closure means to connect said third of said bypass circuits to said one side of said source to render said control unoperated to prepare for re-starting the car, and unidirectional current conducting means for each of said bypass circuits connected in that circuit with a polarity to prevent current flow therein in a direction toward said resistor.

10. An elevator system comprising; a plurality of elevator cars, each serving a plurality of landings; a hoisting motor for each car; actuating and stopping mechanism for each car; means for selecting the cars for dispatching from one of said landings; means for initiating dispatching operations for the group of cars; a source of direct voltage; and start and stop control circuits for each of said cars comprising for each car, a control having electroresponsive actuating means, an input circuit for said actuating means, said actuating means being connected between said input circuit and one side of said source, an actuating circuit connected to said input circuit, means responsive to the approach of the car to said one landing for applying to said actuating circuit positive voltage from the other side of said source to actuate said control to cause stopping of the car at said one landing and to maintain said control actuated until the car is selected for dispatching, a holding circuit for said control connected to said input circuit, unidirectional current conducting means for said actuating circuit and said holding circuit connected in the circuit for which it is provided with a polarity to permit the flow of current therein in a direction toward said input circuit, means for applying to said holding circuit positive voltage with respect to said one side of said source, a resistor connected between said unidirectional current conducting means in the holding circuit and said positive voltage applying means, a pair of low resistance bypass circuits, each bypass circuit providing a connection from said junction of said resistor and unidirectional current conducting means to said one side of said source, means responsive to said actuation of said control for applying to one of said bypass circuits positive voltage with respect to said one side of said source, means responsive to the arrival of the car at said one landing for applying to the other bypass circuit positive voltage with respect to said one side of said source to maintain said control operated after selection of that car, means responsive to the initiation of the dispatching operation when the car is selected to discontinue said application of positive voltage to said other bypass circuit to render said control unoperated, thereby causing the starting of the car, and unidirectional current conducting means for each of said bypass circuits connected in that circuit with a polarity to prevent current flow therein in a direction toward said resistor.

11. An elevator system comprising; a plurality of elevator cars, each serving a plurality of landings; a hoisting motor for each car; actuating and stopping mechanism for each car; direction controlling means for each car; means for selecting the cars for dispatching from one of said landings; means for initiating dispatching operations for the group of cars; selected car dispatching means for each car operable upon arrival of that car at said one landing and maintained operated by said selecting means and said initiating means until the initiation of the dispatching of that car; a source of direct voltage; and start and stop control circuits for each of said cars comprising for each car, a control having electroresponsive actuating means, an input circuit for said actuating means, said actuating means being connected between said input circuit and one side of said source, a pair of operating circuits for said control, each connected to said input circuit, unidirectional current conducting means for each operating circuit connected in the circuit for which it is provided with a polarity to permit the flow of current therein in a direction toward said input circuit, means for applying to each operating circuit positive voltage from the other side of said source, a resistor for each of said operating circuits connected between said unidirectional current conducting means in that control circuit and said other side of said source, a pair of low resistance bypass circuits for each operating circuit, each bypass circuit providing a connection from the junction of said resistor and unidirectional current conducting means in the operating circuit for which it is provided to said one side of said source, means controlled by said direction controlling means for the car for applying to one of said bypass circuits for one of said operating circuits positive voltage with respect to said one side of said source when the car is traveling in a given direction toward said one landing, means responsive to the approach of the car to said one landing from said given direction for applying to the other of said bypass circuits for said one operating circuit positive voltage with respect to said one side of said source, thereby raising the voltage applied to said actuating means to actuate said control to cause stopping of the car at said one landing, means responsive to said actuation of said control for applying to one of said bypass circuits for said other operating circuit positive voltage with respect to said one side of said source, means responsive to the operation of said selected car dispatching means for the car for applying to the other bypass circuit for said other operating circuit positive voltage with respect to said one side of said source to maintain said control operated after operation of said direction controlling means for that car to change the direction of car travel and responsive to said selected car dispatching means being rendered unoperated upon the initiation of the dispatching operation to discontinue said application of said positive voltage to said other bypass circuit for said other operating circuit to render said control unoperated to cause the starting of the car, and unidirectional current conducting means for each of said bypass circuits connected in that circuit with a polarity to prevent current flow therein in a direction toward said resistor.

12. An elevator system comprising; an elevator car serving a plurality of landings; a hoisting motor for said car; actuating and stopping mechanism for said car; means for registering calls for said landings; a source of direct voltage; a control for the direction of travel of said car, said control having electroresponsive actuating means; an input circuit for said actuating means, said actuating means being connected between said input circuit and one side of said source; a pair of control circuits for said direction control, each connected to said input circuit; unidirectional current conducting means for each control circuit connected in the circuit for which it is provided with a polarity to permit the flow of current therein in a direction toward said input circuit; means for applying to one of said control circuits positive voltage from said source; a resistor for said one control circuit connected between said unidirectional current conducting means in that control circuit and said positive voltage applying means; a pair of low resistance bypass circuits, each bypass circuit providing a connection from the junction of said resistor and unidirectional current conducting means in said one control circuit to said one side of said source; means responsive to the registration of one or more calls above the car for applying to one of said bypass circuits positive voltage with respect to said one side of said source, the other bypass circuit acting so long as it does not have applied thereto positive voltage with respect to said one side of said source to prevent operation of said direction control by said application to said one bypass circuit of positive voltage; means responsive to the occurrence of a certain condition of said system for applying to the other of said control circuits positive voltage with respect to said one side of said source to cause actuation of said direction control to set the car for upward travel; means responsive to said actuation of said direction control for applying to said other bypass circuit positive voltage with respect to said one side of said source to establish a holding circuit for said direction control subject to said application to said one bypass circuit of said positive voltage; and unidirectional current conducting means for each of said bypass circuits connected in that circuit with a polarity to prevent current flow therein in a direction toward said resistor.

13. An elevator system comprising; an elevator car serving a plurality of landings from a lower terminal; a hoisting motor for said car; actuating and stopping mechanism for said car; means for registering car calls for said landings; a source of direct voltage; a control for the direction of travel of said car, said control having electroresponsive actuating means; an input circuit for said actuating means, said actuating means being connected between said input circuit and one side of said source; a pair of control circuits for said direction control, each connected to said input circuit; means for applying to each of said control circuits positive voltage from said source; unidirectional current conducting means for each control circuit, each connected in the circuit for which it is provided with a polarity to permit the flow of current therein in a direction toward said input circuit; a resistor for each control circuit, each connected between said unidirectional current conducting means in the control circuit for which it is provided and said means for applying positive voltage; six low resistance bypass circuits, two for one of said control circuits and four for the other of said control circuits, each bypass circuit providing a connection from the junction of said resistor and unidirectional current conducting means in the control circuit for which it is provided to said one side of said source; means responsive to the registration of one or more car calls above the car for applying to one of said bypass circuits for each control circuit positive voltage with respect to said one side of said source, the second bypass circuit for said one control circuit acting so long as it does not have applied thereto positive voltage with respect to said one side of said source to prevent operation of said direction control by said application of positive voltage to the first named bypass circuit for said one control circuit; means responsive to the car being stopped at the lower terminal for applying to a second and third of the bypass circuits for said other control circuit positive voltage with respect to said one side of said source; means responsive to a certain load being taken in the car for applying to the remaining bypass circuit for said other control circuit positive voltage with respect to said one side of said source, thereby raising the potential of said input circuit, provided the other three bypass circuits have positive voltage applied thereto, sufficient to cause actuation of said direction control by said actuating means to set the car for upward travel; means responsive to said actuation of said direction control for applying to said second bypass circuit for said one control circuit positive voltage with respect to said one side of said source to establish a holding circuit for said direction control subject to the application to said one bypass circuit for said one control circuit of said positive voltage; and unidirectional current conducting means for each of said bypass circuits connected in that circuit with a polarity to prevent current flow therein in a direction toward said resistor in the control circuit for which the bypass circuit is provided.

14. An elevator system comprising; an elevator car serving a plurality of landings between a lower terminal and an upper terminal; a hoisting motor for said car; actuating and stopping mechanism for said car; means for registering car calls for said landings; means for registering landing calls for said landings; a source of direct voltage; a control for the direction of travel of said car, said control having electroresponsive actuating means; an input circuit for said actuating means, said actuating means being connected between said input circuit and one side of said source; three control circuits for said direction control, each connected to said input circuit; means for applying to each of said control circuits positive voltage with respect to said one side of said source; unidirectional current conducting means for each of said control circuits, each connected in the circuit for which it is provided with a polarity to permit the flow of current therein in a direction toward said input circuit; a resistor for each of said control circuits, each connected between said unidirectional current conducting means in the control circuit for which it is provided and said positive voltage applying means; a plurality of low resistance bypass circuits, two for one of said control circuits and three for another of said control circuits, each bypass circuit providing a connection from the junction of said resistor and unidirectional current conducting means in the control circuit for which it is provided to said one side of said source; means responsive to the registration of one or more car calls above the car for applying to one of said bypass circuits for said one control circuit positive voltage with respect to said one side of said source, the second bypass circuit for said one control circuit acting so long as it does not have positive voltage applied thereto to prevent operation of said direction control by said application of said positive voltage to the first named bypass circuit for said one control circuit; means responsive to the registration of one or more landing calls above the car for applying to one of said bypass circuits for said other control circuit positive voltage with respect to said one side of said source; means responsive to the car being below the upper terminal for applying to another of said bypass circuits for said other control circuit positive voltage with respect to said one side of said source, the third bypass circuit for said other control circuit atcing so long as it does not have positive voltage applied thereto to prevent operation of said direction control by said application of positive voltage to the first and second named bypass circuits for said other control circuit; means responsive to the occurrence of a certain condition of said system to apply to the third control circuit positive voltage with respect to said one side of said source to cause actuation of said direction control to set the car for upward travel; means responsive to said actuation of said direction control for causing application to said second named bypass circuit for said one control circuit and said third named bypass circuit for said other control circuit of positive voltage with respect to said one side of said source to establish for said direction control a holding circuit by way of said one control circuit subject to the application to said first named bypass circuit for that control circuit of positive voltage with respect to said one side of said source and a holding circuit by way of said other control circuit subject to the application to said first and second named bypass circuits for that control circuit of positive voltage with respect to said one side of said source; and unidirectional current conducting means for each of said bypass circuits connected in that circuit with a polarity to prevent current flow therein in a direction toward said resistor in the control circuit for which the bypass circuit is provided.

15. An elevator system comprising; a plurality of elevator cars, each serving a plurality of landings including terminal landings; a hoisting motor for each car; actuating and stopping mechanism for each car; direction setting means for each car; car call registering means for each of said landings for each car; up landing call registering means for each of the intermediate landings and the lower terminal landing; down landing calls registering means for each of the intermediate landings and the upper terminal landing; circuits for exercising group supervision over said cars; and service demand registration circuits for controlling said group superivsory circuits, and service demand registration circuits comprising, a total up service demand output circuit, a total down service demand output circuit, up landing call service demand means feeding current to said total up service demand output circuit in an amount dependent on the number of up landing calls registered, down landing call service demand means feeding current to said total down service demand output circuit in an amount dependent upon the number of down landing calls registered, up individual service demand means for each car for feeding current to said total up service demand output circuit in an amount dependent upon the number of car calls registered for that car, down individual service demand means for each car for feeding current to said total down service demand output circuit in an amount dependent upon the number of car calls registered for that car, and means for each car controlled by said direction setting means for that car for rendering said up individual service demand means for that car ineffective when the car is set for downward travel and for rendering said down individual service demand means for that car ineffective when the car is set for upward travel.

16. An elevator system compirsing; a plurality of elevator cars, each serving a plurality of landings including terminal landings; a hoisting motor for each car; actuating and stopping mechanism for each car; a source of direct voltage; direction setting means for each car;

car call registering means for each of said landings for each car; up landing call registering means for each of the intermediate landings and the lower terminal landing; down landing call registering means for each of the intermediate landings and the upper terminal landing; means for each car for registering a certain amount of load in that car; circuits for exercising group supervision over said cars; and service demand registration circuits for controlling said group supervisory circuits, said service demand registration circuits comprising, a total up service demand output circuit, a total down service demand output circuit, an up landing call service demand circuit feeding current from said source to said total up service demand output circuit in an amount dependent on the number of up landing calls registered, a down landing call service demand circuit feeding current from said source to said total down service demand output circuit in an amount dependent upon the number of down landing calls registered, an up individual service demand circuit for each car for feeding current from said source to said total up service demand output circuit in an amount dependent upon the number of car calls registered for that car and whether or not said certain amount of load exists in that car, a down individual service demand circuit for each car for feeding current from said source to said total down service demand output circuit in an amount dependent upon the number of car calls registered for that car and whether or not said certain amount of load exists in that car, a bypass circuit for each car connected from the up individual service demand circuit for that car to the positive side of said source when the car is set for upward travel, but when the car is not set for upward travel being connected to the other side of said source to bypass current flow in the up individual service demand circuit for that car from the total up service demand output circuit to the other side of said source, and a second bypass circuit for each car connected from the down individual service demand circuit for that car to said positive side of said source when the car is set for downward travel but when the car is not set for downward travel being connected to the other side of said source to bypass current flow in the down individual service demand circuit for that car from the total down service demand output circuit to the other side of said source.

17. An elevator system comprising; a plurality of elevator cars, each serving a plurality of landings including terminal landings; a hoisting motor for each car; actuating and stopping mechanism for each car; a source of direct voltage; direction setting means for each car; car call registering means for each of said landings for each car; up landing call registering means for each of the intermediate landings and the lower terminal landing; down landing call registering means for each of the intermediate landings and the upper terminal landing; circuits for exercising group supervision over said cars; and service demand registration circuits for controlling said group supervisory circuits, said service demand registration circuits comprising, a total up service demand output circuit, a total down service demand output circuit, an up landing call service demand circuit feeding said total up service demand output circuit, a down landing call service demand circuit feeding said total down service demand output circuit, a plurality of up landing call resistors, one for each up landing call registering means, each connected at one side to said up landing call service demand circuit, a plurality of down landing call resistors, one for each of said down landing call registering means, each connected at one side to said down landing call service demand circuit, means for each landing call registering means responsive to the registering of a call thereby for applying to the other side of the resistor provided therefor positive voltage with respect to one side of said source, an up individual service demand circuit for each car feeding said total up service demand output circuit, a down individual service demand circuit for each car feeding said total down service demand output circuit, a plurality of car call up resistors for each car, one for each car call registering means for that car for a landing above the lower terminal landing, each connected at one side to said up individual service demand circuit for that car, a plurality of car call down resistors for each car, one for each car call registering means for that car for each intermediate landing, each connected at one side to said down individual service demand circuit for that car, means for each car call registering means responsive to the registration of a call thereby for applying to the other side of each of the resistors provided therefor positive voltage with respect to said one side of said source, a pair of load resistors, one connected to said up individual service demand circuit for that car and the other connected to said down individual service demand circuit for that car, means for each car responsive to a certain load in that car for applying to said load resistors for that car positive voltage with respect to said one side of said source, a bypass circuit for each car connected from the up individual service demand circuit for that car to said one side of said source when the car is not set for upward travel to bypass current flow in the up individual service demand circuit for that car from the total up service demand output circuit to said one side of said source, a second bypass circuit for each car connected from the down individual service demand circuit for that car to said one side of said source when the car is not set for downward travel to bypass current flow in the down individual service demand circuit for that car from the total down service demand output circuit to said one side of said source, a third bypass circuit for each car connected from the down individual demand circuit for that car to said one side of said source when that car is at the lower terminal landing to bypass current flow in the down individual service demand circuit from the total down service demand output circuit to said one side of said source, means for applying with respect to said one side of said source positive voltage to said first named bypass circuit when the car is set for upward travel, to said second bypass circuit when the car is set for downward travel and to said third bypass circuit when the car is above the lower terminal landing, and unidirectional current conducting means connected in each of said individual service demand circuits and landing call service demand circuits at the junction thereof to the total service demand output circuit to which it is connected with a polarity to permit current flow toward the total demand circuit.

18. An elevator system comprising; a plurality of elevator cars, each serving a plurality of landings including terminal landings; a hoisting motor for each car; actuating and stopping mechanism for each car; circuits for providing current in an amount determined by certain service demand conditions in said system; a magnetic amplifier having an input coil and an output coil, said input coil being connected to be subject to the current provided by said service demand circuits; and circuits controlled by the current in the output coil of said amplifier for controlling operation of said system, said last named circuits comprising, a resistor, means for causing a direct voltage drop across said resistor of a value determined by the value of sustained current flow in said output coil; means for converting said voltage drop to alternating voltage, the positive half of which is clipped to a value equal to the voltage drop across said resistor; an electronic vacuum tube having its control grid connected to be subject to said clipped alternating voltage and being driven beyond cut-off to provide a square wave output voltage, the extent of variation of which varies in proportion to the variation in current flow in said output coil; a control having electroresponsive actuating means; and means connecting said actuating means to be subject to the alternating component of said square wave voltage.

19. An elevator system comprising; a plurality of elevator cars, each serving a plurality of landings including terminal landings; a hoisting motor for each car; actuating and stopping mechanism for each car; a source of current; car call registering means for each of said landings for each car; up landing call registering means for each of the intermediate landings and the lower terminal landing; down landing call registering means for each of the intermediate landings and the upper terminal landing; a total up service demand circuit; a total down service demand circuit; means for feeding current from said source to said total up service demand circuit in an amount dependent on the number of up landing calls registered and the number of car calls registered in each car set for upward travel; means for feeding current from said source to said total down service demand circuit in an amount dependent on the number of down landing calls registered and the number of car calls registered in each car set for downward travel; and dispatching circuits controlled from said total service demand circuits for causing the cars to be dispatched on their upward and downward trips to provide substantially the same amount of service for upward trips as for downward trips or more service for one of the trips than for the other, depending on whether the current in one of said total service demand circuits is substantially equal to that in the other or whether it is predominant in one or the other of said total service demand circuits.

20. An elevator system comprising; a plurality of elevator cars, each serving a plurality of landings including terminal landings; a hoisting motor for each car; actuating and stopping mechanism for each car; a source of current; car call registering means for each of said landings for each car; up landing call registering means for each of the intermediate landings and the lower terminal landing; down landing call registering means for each of the intermediate landings and the upper terminal landing; a total up service demand circuit; a total down service demand circuit; means for feeding current from said source to said total up service demand circuit in an amount dependent on the number of up landing calls registered and the number of car calls registered in each car set for upward travel; means for feeding current from said source to said total down service demand circuit in an amount dependent on the number of down landing calls registered and the number of car calls registered in each car set for downward travel; program selection means operable to cause operation of the system to suit balanced traffic conditions; program selection means operable to cause operation of the system to suit up peak traffic conditions; program selection means operable to cause operation of the system to suit down peak traffic conditions; program selection means operable to cause operation of the system to suit intermittent traffic conditions; and means dependent on the amount and ratio of current flow in said total service demand circuits for controlling which program selection means is operated.

21. An elevator system comprising; a plurality of elevator cars, each serving a plurality of landings including terminal landings; a hoisting motor for each car; actuating and stopping mechanism for each car; a source of current; car call registering means for each of said landings for each car; up landing call registering means for each of the intermediate landings and the lower terminal landing; down landing call registering means for each of the intermediate landings and the upper terminal landing; a total up service demand circuit; a total down service demand circuit; means for feeding current from said source to said total up service demand circuit in an amount dependent on the number of up landing calls registered and the number of car calls registered in each car set for upward travel; means for feeding current from said source to said total down service demand circuit in an amount dependent on the number of down landing calls registered and the number of car calls registered in each car set for downward travel; a magnetic amplifier having an input coil and an output coil, said input coil being connected to be subject to the total current supplied by both said total service demand circuits; program selection means controlled by the current in the output coil of said amplifier; a second magnetic amplifier having an input coil and an output coil, said input coil being connected to be subject to the total current supplied by said total up service demand circuit; program selection means controlled by the current in the output coil of said second amplifier; a third magnetic amplifier having an input coil and an output coil, said input coil being connected to be subject to the total current supplied by said total down service demand circuit; program selection means controlled by the current in the output coil of said third amplifier; and means controlled by which program selection means is effective for determining the manner in which the system is operated under various service demand conditions.

22. An elevator system comprising; a plurality of elevator cars, each serving a plurality of landings including terminal landings; a hoisting motor for each car; actuating and stopping mechanism for each car; car call registering means for each of said landings for each car; up landing call registering means for each of the intermediate landings and the lower terminal landing; down landing call registering means for each of the intermediate landings and the upper terminal landing; up service demand circuits for providing current in an amount determined by the number of up landing calls registered and the number of car calls registered in each car set for upward travel; down service demand circuits for providing current in an amount determined by the number of down landing calls registered and the number of car calls registered in each car set for downward travel; a magnetic amplifier having an input coil and an output coil, said input coil being connected to be subject to the total current supplied by said up service demand circuits; program selection circuits controlled by the current in the output coil of said amplifier for causing operation of the system to provide service to suit heavier up traffic conditions when the current is above a certain amount; program selection circuits controlled by the current in the output coil of said amplifier for causing operation of said system to provide service to suit up peak traffic conditions when the current is above a certain greater amount; a second magnetic amplifier having an input coil and an output coil, said input coil being connected to be subject to the total current supplied by said down service demand circuits; program selection circuits controlled by the current in the output coil of said second amplifier for causing operation of the system to provide service to suit heavier down traffic conditions when the current is above a certain amount; program selection circuits controlled by the current in the output coil of said second amplifier for causing operation of said system to provide service to suit down peak traffic conditions when the current is above a certain greater amount; a third magnetic amplifier having an input coil and an output coil, said input coil being connected to be subject to the total current supplied by both said total service demand circuits; program selection circuits controlled by the current in the output coil of said third amplifier for causing operation of the system to provide service to suit intermittent traffic conditions when the current is below a certain amount; and program selection circuits controlled by the current in the output coil of said third amplifier for causing operation of the system to provide service to suit balanced traffic conditions when the current is above said certain amount, provided the system is not operating to provide service to suit heavier up, heavier down, up peak or down peak traffic conditions.

23. A power supply for the electronic control of an elevator installation comprising an elevator car having a hoisting motor, actuating and stopping mechanism for said motor and a gas-filled electron discharge tube connected when conducting to initiate control of said actuating and stopping mechanism, said power supply comprising a source of polyphase alternating current, a transformer having its primary winding connected to said source and six secondary windings wound so as to produce voltage fluctuation separated by sixty angular degrees as in a six-phase star connected relationship each of said windings being connected at one of their ends to the star point, unidirectional current conducting means connected in the circuit of the four of said secondary windings separated each from the other by sixty angular degrees, said unidirectional means being each connected with a polarity to prevent current flow therein toward said star point, and a pair of output circuits, one connected to said star point and the other to said other ends of said unidirectional current conducting means, said output circuits being connected across the anode-cathode electrodes of said gas-filled electron discharge device.

24. A power supply for the electronic control system of an elevator installation comprising an elevator car having an associated hoisting motor, actuating and stopping mechanism for said motor and an electronic control system including a controlled electron conducting device connected when conducting to initiate control of said actuating and stopping mechanism for said hoisting motor, said power supply comprising a source of three-phase alternating voltage, transformer means connected to said source and in conjunction with said source providing four voltage components separated each from the other by sixty angular degrees, unidirectional conducting devices connected to said three-phase source and the secondary winding of said transformer and interconnected such as to provide on one side thereof a common point of negative potential and on the other side thereof a common point of positive potential the voltage components of which are separated by sixty angular degrees each, and a pair of output circuits, one connected at one of its ends to said common point of negative potential and at its other to the negative electrode of said controlled electron conducting device, the other of said output circuits being connected at one end to said common point of angularly spaced positive potential and at its other end to the positive electrode of said controlled electron conducting device.

25. An elevator system comprising; a plurality of elevator cars serving a plurality of landings between a lower terminal landing and an upper terminal landing; a hoisting motor for each car; actuating and stopping mechanism for each car; means for dispatching the cars from one of said terminal landings; and timing circuits for providing timed intervals for said dispatching of the cars comprising, a relaxation oscillator, means for selecting different programs of operation of said system, means controlled by said program selecting means for controlling the rate of pulsing of said relaxation oscillator, a multi-cathode electronic tube controlled by said relaxation oscillator to cause transfer of conduction of its cathodes in succession at a rate determined by which program is selected, and means responsive to voltages taken off certain of said cathodes for controlling operation of said dispatching means.

26. An elevator system comprising; a plurality of elevator cars serving a plurality of landings between a lower terminal landing and an upper terminal landing; a hoisting motor for each car; actuating and stopping mechanism for each car; means for dispatching the cars from one of said terminal landings; and timing circuits for providing timed intervals for said dispatching of the cars comprising, a source of current, voltage divider resistance connected across said source, a plurality of voltage determining electronic tubes connected across a portion of said voltage divider resistance, each tube having a resistor in its cathode circuit, said cathode resistors being of different ohmic values, a relaxation oscillator having an input subject to the potential drop across said tubes and their cathode resistors so as to pulse at a rate determined by which of said voltage determining tubes is conductive, means for selecting different programs of operation of said system, means controlled by said program selecting means for controlling which of said voltage determining tubes is conductive, an amplifying electronic tube for said oscillator, a multi-cathode electronic tube controlled by said relaxation oscillator to cause transfer of conduction of its cathodes in succession at a rate determined by which program is selected, and means responsive to voltages taken off certain of said cathodes for controlling operation of said dispatching means.

27. An elevator system comprising; a plurality of elevator cars serving a plurality of landings between a lower terminal landing and an upper terminal landing; a hoisting motor for each car; actuating and stopping mechanism for each car; means for dispatching the cars from one of said terminal landings; and timing circuits for providing timed intervals for said dispatching of the cars comprising, a relaxation oscillator, means controlled by whether the cars are early or late in arriving at one of said terminal landings for controlling the rate of pulsing of said relaxation oscillator, a multi-cathode electronic tube controlled by said relaxation oscillator to cause transfer of conduction of its cathodes in succession at a rate determined by said early or late car controlled means, and means responsive to voltages taken off certain of said cathodes for controlling operation of said dispatching means.

28. An elevator system comprising; a plurality of elevator cars serving a plurality of landings between a lower terminal landing and an upper terminal landing; a hoisting motor for each car; actuating and stopping mechanism for each car; means for dispatching the cars from one of said terminal landings; and timing circuits for providing timed intervals for said dispatching of said cars comprising, a relaxation oscillator, means for determining whether the timing interval should be lengthened or shortened, means controlled by said determining means for controlling the rate of pulsing of said relaxation oscillator, a multi-cathode electronic tube having for each main cathode a transfer cathode, said transfer cathodes being controlled by said relaxation oscillator to cause transfer of conduction of its main cathodes in succession at a rate determined by said length of timing interval determining means, and means controlled by voltage taken off a certain one of said main cathodes for controlling operation of said dispatching means.

29. An elevator system comprising; a plurality of elevator cars serving a plurality of landings between a lower terminal landing and an upper terminal landing; a hoisting motor for each car; actuating and stopping mechanism for each car; means for dispatching the cars from one of said terminal landings; and timing circuits for providing timed intervals for said dispatching of the cars comprising, a plurality of voltage determining means, each adapted upon operation to provide voltage of a different value, a relaxation oscillator having an input subject to said voltage determining means so as to pulse at a rate determined by which of said voltage determining means is operated, means controlled by whether the cars are early or late in arriving at one of said terminal landings for controlling which of said voltage determining means is operated, a multi-cathode electronic tube having for each main cathode a transfer cathode, said transfer cathodes being connected together and being controlled by said relaxation oscillator to cause transfer of conduction to successive main cathodes at a rate determined by which voltage determining means is operated, and means responsive to voltages taken off certain of said main cathodes for controlling operation of said dispatching means.

30. An elevator system comprising; a plurality of elevator cars serving a plurality of landings between a lower terminal landing and an upper terminal landing; a hoisting motor for each car; actuating and stopping mechanism for each car; means for dispatching the cars from one of said terminal landings; and timing circuits for providing timed intervals for said dispatching of the cars comprising, a source of current, voltage divider resistance connected across said source, a plurality of voltage determining electronic tubes connected across a portion of said voltage divider resistance, each tube having a resistor in its cathode circuit, said cathode resistors being of different ohmic value, a relaxation oscillator having an input subject to the potential drop across said tubes and their cathode resistors so as to pulse at a rate determined by which of said voltage determining tubes is conductive, means controlled by whether the cars are early or late in arriving at one of said terminal landings for controlling which of said voltage determining tubes is conductive, an amplifying electronic tube for said oscillator, a multicathode electronic tube having for each main cathode a transfer cathode, said transfer cathodes being connected together and being subject to the output voltage of said amplifying tube to cause transfer of conduction to successive main cathodes at a rate determined by which voltage determining tube is conductive, and means responsive to voltages taken off certain of said main cathodes for controlling operation of said dispatching means.

31. An elevator system comprising; a plurality of elevator cars serving a plurality of landings between a lower terminal landing and an upper terminal landing; a hoisting motor for each car; actuating and stopping mechanism for each car; means for dispatching the cars from one of said terminal landings; and timing circuits for providing timed intervals for said dispatching of the cars comprising, an electronic tube having a plurality of main cathodes arranged in a ring, a transfer cathode for each main cathode and an anode common to said main cathodes, a circuit connected to said transfer cathodes, a source of direct voltage for said tube, means for applying successive voltage pulses to said transfer cathode circuit of a greater voltage difference with respect to said anode than that between the anode and the main cathode which is conducting, causing the transfer of the glow to the transfer cathode for the next succeeding main cathode and then from that transfer cathode to such next succeeding main cathode as said pulse voltage difference becomes less than that between said anode and such next succeeding main cathode, thus causing the transfer of glow to successive main cathodes at a rate determined by the rate at which the pulses are applied, and means responsive to voltages taken off certain of said main cathodes for controlling operation of said dispatching means.

32. An elevator system comprising; a plurality of elevator cars serving a plurality of landings between a lower terminal landing and an upper terminal landing; a hoisting motor for each car; actuating and stopping mechanism for each car; means for dispatching the cars from one of said terminal landings; and timing circuits for providing timed intervals for said dispatching of the cars comprising, an electronic tube having a plurality of main cathodes arranged in a ring, a transfer cathode for each main cathode and an anode common to said main cathodes, a source of voltage, a plurality of resistors connecting said main cathodes to one side of said source, means for applying a positive voltage to said anode of a value to cause conduction of the tubes at one of said main cathodes, a circuit connected to said transfer cathodes, means including a relaxation oscillator for applying to said transfer cathode circuit successive voltage pulses of a value below that of said one side of said source, causing the transfer of the glow from the main cathode which is conducting to the transfer cathode for the next succeeding main cathode and then from that transfer cathode to such next succeeding main cathode as the value of said pulse voltage rises to above that of said one side of said source, thus causing the transfer of glow to successive main cathodes at a rate determined by the rate at which the pulses are applied, and means responsive to voltages taken off said resistors in the circuit for certain of said main cathodes for controlling operation of said dispatching means.

33. An elevator system comprising; a plurality of elevator cars serving a plurality of landings between a lower terminal landing and an upper terminal landing; a hoisting motor for each car; actuating and stopping mechanism for each car; means for dispatching the cars from one of said terminal landings; and timing circuits for providing timed intervals for said dispatching of the cars comprising, a relaxation oscillator, a source of voltage for said relaxation oscillator, means for controlling the voltage applied to said relaxation oscillator and thus the rate of pulsing of said relaxation oscillator, a multicathode electronic tube controlled by said relaxation oscillator to cause transfer of conduction of its cathodes in succession at a rate determined by the rate of pulsing of said relaxation oscillator, said dispatching means being controlled by said multi-cathode tube, and means operable when a car has not been dispatched upon expiration of a certain time interval after operation of said dispatching means for lowering the voltage applied to said relaxation oscillator to a value to stop oscillation and thus suspend operation of said timing circuits.

34. An elevator system comprising; a plurality of elevator cars serving a plurality of landings between a lower terminal landing and an upper terminal landing; a hoisting motor for each car; actuating and stopping mechanism for each car; means for dispatching the cars from one of said terminal landings; and timing circuits for providing timed intervals for said dispatching of the cars comprising, a relaxation oscillator, a source of voltage for said relaxation oscillator, means for determining whether the timing interval should be lengthened or shortened, means controlled by said interval determining means for controlling the value of the voltage applied to said relaxation oscillator and thus the rate of pulsing of said relaxation oscillator, a multi-cathode electronic tube controlled by said relaxation oscillator to cause transfer of conduction of its cathodes in succession at a rate determined by the rate of pulsing of said relaxation oscillator, means responsive to voltage taken off a certain one of said cathodes for causing operation of said dispatching means, an electronic voltage determining tube adapted upon being rendered conductive to lower the voltage applied to said relaxation oscillator to a value to stop oscillation and thus suspend operation of said timing circuits, and means operable when a car has not been dispatched upon expiration of a certain time interval after said operation of said dispatching means for rendering said voltage determining tube conductive.

35. An elevator system comprising; a plurality of elevator cars serving a plurality of landings between a lower terminal landing and an upper terminal landing; a hoisting motor for each car; actuating and stopping mechanism for each car; means for dispatching the cars from one of said terminal landings; and timing circuits for providing timed intervals for said dispatching of the cars comprising, a source of current, voltage divider resistance connected across said source, a plurality of voltage determining electronic tubes connected across a portion of said voltage divider resistance, each tube having a resistor in its cathode circuit, said cathode resistors being of different ohmic values, a relaxation oscillator having an input subject to the potential drop across said tubes and their cathode resistors so as to pulse at a rate determined by which of said voltage determining tubes is conductive, means for determining whether the timing interval should be lengthened or shortened, means controlled by said interval determining means for controlling which of said voltage determining tubes is conductive, a multicathode electronic tube controlled by said relaxation oscillator to cause transfer of conduction of its cathodes in succession at a rate determined by which voltage determining tube is conductive, means responsive to voltage taken off a certain one of said cathodes for causing operation of said dispatching means, an additional voltage determining electronic tube connected across said portion of said voltage divider resistance and adapted upon being rendered conductive to lower the voltage applied to said relaxation oscillator to a value to stop oscillation and thus suspend operation of said timing circuits, and means operable when a car has not been dispatched upon expiration of a certain time interval after said operation of said dispatching means for rendering said additional voltage determining tube conductive.

36. An elevator system comprising; a plurality of elevator cars serving a plurality of landings; a hoisting motor for each car; actuating and stopping mechanism for each car; timing circuits for providing time intervals for dispatching the cars from a terminal landing; means for initiating dispatching of the cars from said terminal landing at the expiration of said timed intervals; means for selecting the cars for dispatching; means for each car for causing that car when selected for dispatching and a dispatching operation has been initiated for causing dispatching of said car from said terminal landing; a source of voltage; and detent means for suspending operation of said timing circuits when a car is late for dispatching, said detent means comprising, a control having electroresponsive actuating means, an input circuit for said actuating means, said actuating means being connected between said input circuit and one side of said source, a resistor connected on one side to said input circuit, means for applying to the other side of said resistor positive voltage from said source with respect to said one side of said source, a pair of low resistance bypass circuits, each providing a connection from the junction of said resistor and input circuit to said one side of said source, means operable when a dispatching operation has been initiated for applying to one of said bypass circuits positive voltage with respect to said one side of said source, means operable when the selected car has not been dispatched from said terminal landing upon expiration of a certain time interval after the initiation of the dispatching operation for applying to the other of said bypass circuits positive voltage with respect to said one side of said source, thereby causing actuation of said control to suspend operation of said timing circuits, and unidirectional current conducting means for each of said bypass circuits connected in that circuit with a polarity to prevent current flow therein in a direction toward said input circuit.

37. An elevator system comprising; a plurality of elevator cars serving a plurality of landings between a lower terminal landing and an upper terminal landing; a hoisting motor for each car; actuating and stopping mechanism for each car; timing circuits for providing time intervals for dispatching the cars simultaneously or alternately from said terminal landings; means for initiating dispatching of the cars from said terminal landings at the expiration of said time intervals; means for selecting the cars for dispatching; means for each car operable when that car is selected for dispatching from either of said terminal landings and a dispatching operation for that terminal landing has been initiated to cause dispatching of said car from that terminal landing; a source of voltage; and detent means for suspending operation of said timing circuits when a car is late for dispatching from either terminal landing, said detent means comprising, a control having electroresponsive actuating means, an input circuit for said actuating means, said actuating means being connected between said input circuit and one side of said source, a pair of operating circuits connected to said input circuit, means for applying to each of said operating circuits positive voltage with respect to said one side of said source, unidirectional current conducting means for each operating circuit connected in that circuit with a polarity to permit the flow of current therein in a direction toward said input circuit, a resistor for each operating circuit connected in that circuit between said unidirectional current conducting means in that circuit and said positive voltage applying means, a plurality of low resistance bypass circuits for each of said operating circuits, each providing a connection from the junction of said resistor and unidirectional current conducting means in the circuit for which it is provided to said one side of said source, means operable when the selected car has not been dispatched under either simultaneous or alternate dispatching conditions from the lower terminal landing or under simultaneous dispatching conditions from the upper terminal landing upon expiration of a certain time interval after the initiation of the dispatching operation for applying to all of said bypass circuits for said one control circuit positive voltage with respect to said one side of said source, means operable when the selected car has not been dispatched under alternate dispatching conditions from the upper terminal landing upon expiration of a certain time interval after the initiation of the dispatching operation for applying to all of said bypass circuits for said other control circuit positive voltage with respect to said one side of said source, each of said control circuits being effective to cause actuation of said control to cause suspension of operation of said timing circuits upon said application to all of its bypass circuits of positive voltage with respect to said one side of said source but being ineffective to do so so long as any of its bypass circuits does not have said application of positive voltage thereto, and unidirectional current conducting means for each of said bypass circuits connected in that circuit with a polarity to prevent current flow therein in a direction toward said resistor in the operating circuit for which the bypass circuit is provided.

38. An elevator system comprising; a plurality of elevator cars serving a plurality of landings between a lower terminal landing and an upper terminal landing; a hoisting motor for each car; actuating and stopping mechanism for each car; timing circuits for providing time intervals for dispatching of the cars; means for initiating dispatching of the cars from said terminal landings at the expiration of the timed intervals provided by said timing circuits; means for determining whether said dispatching of the cars from the upper terminal landing is to be initiated simultaneously or alternately with respect to the initiation of the dispatching of the cars from the lower terminal landing; means for selecting the cars for dispatching; means for each car operable when that car is selected for dispatching from either of said terminal landings and a dispatching operation for that terminal landing has been initiated to cause dispatching of said car from that terminal landing; a source of direct voltage; and detent means for suspending operation of said timing circuits when a car is late for dispatching, said detent means comprising, a detent control having electroresponsive actuating means, an input circuit for said actuating means, said actuating means being connected between said input circuit and one side of said source, a pair of operating circuits connected to said input circuit, means for applying to each operating circuit positive voltage with respect to said one side of said source, unidirectional current conducting means for each operating circuit connected in that circuit with a polarity to permit the flow of current therein in a direction toward said input circuit, a resistor for each operating circuit connected in that circuit between said unidirectional current conducting means in that circuit and said positive voltage applying means, five low resistance bypass circuits, two for one of said operating circuits and three for the other said operating circuits, each providing a connection from the junction of said resistor and unidirectional current conducting means in the circuit for which it is provided to said one side of said source, means responsive to the initiation of a simultaneous dispatching operation or an up dispatching operation under alternate dispatching conditions to apply to one of said bypass circuits for said one operating circuit positive voltage with respect to said one side of said source, means responsive to the initiation of a down dispatching operation under alternate dispatching conditions to apply to one of said bypass circuits for said other operating circuit positive voltage with respect to said one side of said source; means responsive to further operation of said timing circuits when a car has not been dispatched from both of said terminal landings under simultaneous dispatching conditions or from the lower terminal landing under alternate dispatching conditions upon expiration of a certain time interval after the initiation of the dispatching operation to apply to the other of said bypass circuits for said one operating circuit positive voltage with respect to said one side of said source to cause operation of said detent control to effect suspension of operation of said timing circuits, means for applying to a second of said bypass circuits for said other operating circuit positive voltage with respect to said one side of said source under alternate dispatching conditions, and means responsive to further operation of said timing circuits when a car has not been dispatched from said upper terminal landing upon the expiration of a certain time interval after the initiation of the down dispatching operation under alternate dispatch conditions to apply to the third of said bypass circuits for said other operating circuit positive voltage with respect to said one side of said source to cause operation of said detent control to cause suspension of operation of said timing circuits, and unidirectional current conducting means for each of said bypass circuits connected in that circuit with a polarity to prevent current flow therein in a direction toward said resistor in the operating circuit for which the bypass circuit is provided.

39. An elevator system comprising; a plurality of elevator cars serving a plurality of landings between a lower terminal landing and an upper terminal landing; a hoisting motor for each car; actuating and stopping mechanism for each car; means for initiating dispatching of the cars from one of said terminal landings at timed intervals; a source of direct voltage; and means for indicating when the cars in arriving at said one terminals landing are early with respect to the dispatch initiating operations comprising, an output circuit, a resistor connected on one side to said output circuit; means for applying to the other side of said resistor positive voltage with respect to one side of said source, a pair of low resistance bypass circuits, each providing a connection from the junction of said resistor and output circuit to said one side of said source, means operable so long as said dispatching operation has not been initiated for applying to one of said bypass circuits positive voltage with respect to said one side of said source, means for each car for causing upon expiration of a certain time interval after the arrival of that car at said one terminal landing application to the other of said bypass circuits of positive voltage with respect to said one side of said source which with said positive voltage applied to said one bypass circuit raises the voltage of said output circuit to a certain value indicative of the car being early, and unidirectional current conducting means for each of said bypass circuits connected in that circuit with a polarity to prevent current flow therein in a direction toward said output circuit.

40. An elevator system comprising; a plurality of elevator cars serving a plurality of landings between a lower terminal landing and an upper terminal landing; a hoisting motor for each car; actuating and stopping mechanism for each car; means for initiating dispatching of the cars from one of said terminal landings at timed intervals; a source of direct voltage; and means for indicating when the cars in arriving at said one terminal landing are early with respect to the dispatch initiating operations comprising, an output circuit, a resistor connected on one side to said output circuit, means for applying to the other side of said resistor positive voltage with respect to one side of said source, a pair of low resistance bypass circuits, each providing a connection from the junction of said resistor and output circuit to said one side of said source, means operable so long as said dispatching operation has not been initiated for applying to one of said bypass circuits a positive voltage with respect to said one side of said source, a control having electroresponsive actuating means, an input circuit for said actuating means being connected between said input circuit and said one side of said source, a condenser connecting said input circuit to said one side of said source, means for each car responsive to the arrival of that car at said one terminal landing for charging said condenser to cause when the condenser charge reaches a certain value operation of said control to cause application to the other of said bypass circuits of positive voltage with respect to said one side of said source which with said positive voltage applied to said one bypass circuit raises the voltage of said output circuit to a certain value indicative of the car being early, and unidirectional current conducting means for each of said bypass circuits connected in that circuit with a polarity to prevent current flow therein in a direction toward said output circuit.

41. An elevator system comprising; a plurality of elevator cars serving a plurality of landings between a lower terminal landing and an upper terminal landing; a hoisting motor for each car; actuating and stopping mechanism for each car; means for initiating dispatching of the cars from one of said terminal landings at timed intervals a source of direct voltage; and means for indicating when the cars in arriving at said one terminal landing are late with respect to the dispatch initiating operations comprising, an output circuit, a resistor connected on one side to said output circuit, means for applying to the outer side of said resistor positive voltage with respect to one side of said source, a plurality of low resistance bypass circuits, one for each of said cars, an additional bypass circuit, each bypass circuit providing a connection from the junction of said resistor and output circuit to said one side of said source, means for each car for causing so long as that car has not arrived at said one terminal landing application to said bypass circuit for that car of positive voltage with respect to said one side of said source, means for causing upon expiraton of a certain time interval after the initiation of a dispatching operation application to said additional bypass circuit of positive voltage with respect to said one side of said source, which with said positive voltage applied to all of said bypass circuits for said cars raises the voltage of said output circuit to a certain value indicative of a car being late, and unidirectional current conducting means for each of said bypass circuits connected in that circuit with a polarity to prevent current flow therein in a direction toward said output circuit.

42. An elevator system comprising; a plurality of elevator cars serving a plurality of landings between a lower terminal landing and an upper terminal landing; a hoisting motor for each car; actuating and stopping mechanism for each car; means for initiating dispatching of the cars from one of said terminal landings at timed intervals; a source of direct voltage; and means for indicating when the cars in arriving at said one terminal landing are late with respect to the dispatch initiating operations comprising, an output circuit, a resistor connected on one side to said output circuit, means for applying to the other side of said resistor positive voltage with respect to one side of said source, a plurality of low resistance bypass circuits, one for each of said cars, an additional bypass circuit, each bypass circuit providing a connection from the junction of said resistor and output circuit to said one side of said source, means for each car for causing so long as that car has not arrived at said one terminal landing application to said bypass circuit for that car of positive voltage with respect to said one side of said source, a control having electroresponsive actuating means, an input circuit for said actuating means, said actuating means being connected between said input circuit and said one side of said source, a condenser connecting said input circuit to said one side of said source, means responsive to the initiation of a dispatching operation for charging said condenser to cause when the condenser charge reaches a certain value operation of said control to cause application to said additional bypass circuit of positive voltage with respect to said one side of said source, which with positive voltage applied to all of said bypass circuits for said cars raises the voltage of said output circuit to a certain value indicative of a car being late, and unidirectional current conducting means for each of said bypass circuits connected in that circuit with a polarity to prevent current flow therein in a direction toward said output circuit.

43. An elevator system comprising; a plurality of elevator cars serving a plurality of landings between a lower terminal landing and an upper terminal landing; a hoisting motor for each car; actuating and stopping mechanism for each car; means for dispatching the cars from one of said terminal landings; means for determining whether the cars are early or late in arriving at one of said terminal landings; a multi-cathode tube controlled by said early-late car determining means to cause transfer of conduction of its cathodes in succession in one direction when the cars are late and in the other direction when the cars are early; a plurality of electroresponsive means, one for each cathode of said multi-cathode tube, rendered effective in response to conduction of said cathodes for which they are provided; and means controlled by said electroresponsive means for providing for dispatching timed intervals of a duration dependent upon which of said cathodes is conducting.

44. An elevator system comprising; a plurality of elevator cars serving a plurality of landings between a lower terminal landing and an upper terminal landing; a hoisting motor for each car; actuating and stopping mechanism for each car; means for dispatching the cars from one of said terminal landings; and timing circuits for providing timed intervals for said dispatching of said cars comprising, a multi-cathode tube having a plurality of main cathodes, an anode common to said main cathodes and a pair of transfer cathodes for any pair of consecutive main cathodes, one transfer cathode for one main cathode of the pair for which it is provided and the other transfer cathode for the other main cathode of the pair for which it is provided, means for determining whether the timing interval should be lengthened or shortened, means controlled by said determining means for causing application of voltage pulses to said transfer cathodes in the sequence of said one and then the other transfer cathodes to effect transfer of conduction of said main cathodes in succession in one direction when the timing interval is to be lengthened, and in the opposite sequence to effect transfer of conduction of said main cathodes in succession in the other direction when the timing interval is to be shortened, and means controlled by said cathode which is conducting for controlling operation of said dispatching means.

45. An elevator system comprising; a plurality of elevator cars serving a plurality of landings between a lower terminal landing and an upper terminal landing; a hoisting motor for each car; actuating and stopping mechanism for each car; means for dispatching the cars from one of said terminal landings; a multi-cathode tube having a plurality of main cathodes arranged in ring formation, an anode common to said main cathodes and a pair of transfer cathodes for each main cathode and its next succeeding main cathode, one transfer cathode for one main cathode of the pair for which it is provided and the other transfer cathode for the other main cathode of the pair for which it is provided; means for determining whether the cars are early or late in arriving at one of said terminal landings; means controlled by said early-late car determining means for causing application of voltage pulses to said transfer cathodes in the sequence of said one and then the other transfer cathodes to effect transfer of conduction of said main cathodes in succession in one direction when the cars are late, and in the opposite sequence to effect transfer of conduction of said main cathodes in succession in the other direction when the cars are early; a plurality of electroresponsive means, one for each cathode of said multi-cathode tube, rendered effective in response to conduction of said cathodes for which they are provided; and means controlled by said electroresponsive means for providing for said dispatching of the cars at timed intervals of a duration dependent upon which of said main cathodes is conducting.

46. An elevator system comprising; a plurality of elevator cars serving a plurality of landings between a lower terminal landing and an upper terminal landing; a hoisting motor for each car; actuating and stopping mechanism for each car; means for dispatching the cars from one of said terminal landings; and timing circuits for providing timed intervals for said dispatching of the cars comprising, means for generating voltage pulses, a first multi-cathode electronic tube controlled by said pulse generating means to cause transfer of conduction of its cathodes in succession, means for determining whether the cars are early or late in arriving at one of said terminal landings, a second multi-cathode tube controlled by said early-late car determining means for causing transfer of conduction to its cathodes in one direction when the cars are late, one cathode for each late car, and in the other direction when the cars are early, one cathode for each early car, a plurality of electronic tubes, one for each cathode of said second multi-cathode tube, rendered conductive in response to conduction of said cathodes for which they are provided for determining the rate of pulsing of said pulse generating means and thus the rate of transfer of conduction of the cathodes of said first multi-cathode tube, and means responsive to voltages taken off certain of said cathodes for controlling operation of said dispatching means.

47. An elevator system comprising; four elevator cars serving a plurality of landings between a lower terminal landing and an upper terminal landing; a hoisting motor for each car; actuating and stopping mechanism for each car; means for providing group supervision of the cars; means for each car for placing that car in or out of service under said group supervision means; a source of direct voltage; and means for registering whether the number of cars under group supervision is even or odd comprising, a control having actuating means, an input circuit for said actuating means, said actuating means being connected between said input circuit and one side of said source, seven resistors each connected on one side to said input circuit, means for applying to the other side of each of said resistors positive voltage with respect to said one side of said source, four low resistance bypass circuits for each resistor, one for each car, each providing a connection from the junction of said resistor for which it is provided and said input circuit to said one side of said source, means for each car responsive to said in or out of service means for that car for applying to its bypass circuits for four of said resistors positive voltage with respect to said one side of said source when the car is in service and for applying to its bypass circuits for the remaining three of said resistors positive voltage with respect to said one side of said source when the car is out of service, said positive voltage applications for each car being for bypass circuits for combinations of four and three resistors which are different from those for each of the other cars whereby the voltage applied to said input circuit is raised sufficiently to operate said control upon any combination of an even number of cars under group supervision, and unidirectional current conducting means for each of said bypass circuits connected in that circuit with a polarity to prevent current flow therein in a direction toward said input circuit.

48. An elevator system comprising; a plurality of elevator cars serving a plurality of landings between a lower terminal landing and an upper terminal landing; a hoisting motor for each car; actuating and stopping mechanism for each car; means for dispatching the cars from said terminal landings at timed intervals; means for controlling operation of said dispatching means for different conditions of traffic, means for controlling the number of cars in service under said dispatching means; a source of direct voltage; and means for determining whether said dispatching of the cars from the upper terminal landing is to be initiated simultaneously or alternately with respect to the initiation of the dispatching of the cars from the lower terminal landing comprising, a control having electroresponsive actuating means, an input circuit for said actuating means, said actuating means being connected between said input circuit and one side of said source, a pair of control circuits for said control, means for applying to each of said control circuits positive voltage with respect to said one side of said source, unidirectional current conducting means for each control circuit connected in that circuit with a polarity to permit the flow of current therein toward the input circuit, a resistor for each control circuit connected between said unidirectional current conducting means in that control circuit and said positive voltage applying means, a pair of low resistance bypass circuits for each control circuit, each providing a connection from the junction of said resistor and unidirectional current conducting means in that control circuit to said one side of said source, means responsive to an even number of cars under dispatching for applying to one of said bypass circuits for one of said control circuits positive voltage with respect to said one side of said source and to an odd number of cars under dispatching for applying to one of said bypass circuits for the other of said control circuits positive voltage with respect to said one side of said source, means operable by said dispatching means controlling means for applying to the other of said bypass circuits for said one control circuit positive voltage with respect to said one side of said source under balanced traffic conditions and for applying to the other of said bypass circuits for the other of said control circuits positive voltage with respect to said one side of said source under conditions of heavier up or heavier down traffic, whereby said control is operated to initiate simultaneous dispatching under balanced traffic conditions when the number of cars under dispatching is even and under heavier traffic conditions in either direction when the number of cars under dispatching is odd, and to initiate alternate dispatching under balanced traffic conditions when the number of cars under dispatching is odd and under heavier traffic conditions in either direction when the number of cars under dispatching is even, and unidirectional current conducting means for each of said bypass circuits connected in that circuit with a polarity to prevent current flow therein in a direction toward said input circuit.

49. An elevator system comprising; a plurality of elevator cars serving a plurality of landings between a lower terminal landing and an upper terminal landing; a hoisting motor for each car; actuating and stopping mechanism for each car; means for selecting the cars for dispatching; means for dispatching the elected cars from said terminal landings; means for determining whether said dispatching of the cars from the upper terminal landing is to be initiated simultaneously or alternately with respect to the initiation of the dispatching of the cars from the lower terminal landing; timing circuits for providing time intervals for dispatching the cars simultaneously or alternately from said terminal landings; a source of direct voltage; and dispatching initiating means comprising, a control for initiating dispatching from said lower terminal landing at the expiration of said time intervals for simultaneous dispatching, a second control for initiating dispatching from said upper terminal landing at the expiration of said time intervals for either simultaneous or alternate dispatching, said second control having electroresponsive actuating means, an input circuit for said actuating means, said actuating means being connected between said input circuit and one side of said source, a pair of control circuits for said second control, means for applying to said control circuits positive voltage with respect to said one side of said source, unidirectional current conducting means for each control circuit connected in that circuit with a polarity to permit the flow of current therein toward the input circuit, a resistor for each control circuit connected between said unidirectional current conducting means in that control circuit and said positive voltage applying means, a pair of low resistance bypass circuits for each control circuit, each providing a connection from the junction of said resistor and unidirectional current conducting means in that control circuit to said one side of said source, means responsive to said simultaneous or alternate dispatch determining means under simultaneous dispatching conditions for applying to one of said bypass circuits for one of said control circuits positive voltage with respect to said one side of said source and under alternate dispatching conditions for applying to one of said bypass circuits for the other of said control circuits positive voltage with respect to said one side of said source, means responsive to each operation of said timing circuits to provide a time interval for simultaneous dispatching for applying to the other of said bypass circuits for said one of said control circuits positive voltage with respect to said one side of said source to cause operation of said second control to intiate dispatching simultaneously with the first named control and responsive to each operation of said timing circuits to provide a time interval for alternate dispatching for applying to the other of said bypass circuits for said other of said control circuits positive voltage with respect to said one side of said source to cause operation of said second control to initiate dispatching alternately with respect to said first named control, and unidirectional current conducting means for each of said bypass circuits connected in that circuit with a polarity to prevent current flow therein in a direction toward said input circuit.

50. An elevator system comprising; a plurality of elevator cars serving a plurality of landings between a lower terminal landing and an upper terminal landing; a hoisting motor for each car; actuating and stopping mechanism for each car; call registration means for each of said landings; timing circuits for providing time intervals for dispatching the cars from said lower terminal landing; means for selecting the cars for dispatching; a source of direct voltage; and means for dispatching the selected cars from said lower terminal landing comprising, a control having electroresponsive actuating means, an input circuit for said actuating means, said actuating means being connected between said input circuit and one side of said source, a resistor connected on one side to said input circuit, means for applying to the other side of said resistor positive voltage with respect to said one side of said source, three low resistance bypass circuits, each providing a connection from the junction of said resistor and input circuit to said one side of said source, means responsive to the expiration of a time interval for applying to one of said bypass circuits positive voltage with respect to said one side of said source, means responsive to a call registration for applying to a second of said bypass circuits positive voltage with respect to said one side of said source, means responsive either to operation of said timing circuits to provide a certain additional interval or to another car being at the lower terminal landing for applying to the remaining of said bypass circuits positive voltage with respect to said one side of said source to cause operation of said control, and unidirectional current conducting means for each of said bypass circuits connected in that circuit with a polarity to prevent current flow therein in a direction toward said input circuit.

51. An elevator system comprising; a plurality of elevator cars serving a plurality of landings between a lower terminal landing and an upper terminal landing; a hoisting motor for each car; actuating and stopping mechanism for each car; call registering means for each of said landings; means for each car for registering when that car has reached its highest call; means for each car for registering whether or not that car has reached the upper terminal landing; means for each car for registering when the car is in a zone of landings below the upper terminal landing; means for initiating dispatching of the cars on a time basis on their downward trips; a source of direct voltage; and means for each car for rendering that car available for dispatching on its downward trip comprising, a control having electroresponsive actuating means, an input circuit for said actuating means, said actuating means being connected between said input circuit and one side of said source, an operating circuit for said control connected to said input circuit, a resistor connected in said operating circuit, means for applying to said operating circuit positive voltage with respect to said one side of said source, a plurality of low resistance bypass circuits, each providing a connection from said input circuit to said one side of said source, means responsive to the initiation of the next dispatching operation by said dispatch initiating means, to operation of said zone arrival registering means for that car when the car is in said zone, to operation of said highest call registering means for that car when the car has reached its highest call and to no other car being at the upper terminal for applying to said bypass circuits positive voltage with respect to said one side of said source, thereby causing operation of said control to render the car available for down dispatching, and unidirectional current conducting means for each of said bypass circuits connected in that circuit with a polarity to prevent current flow therein in a direction toward said input circuit.

52. An elevator system comprising; a plurality of elevator cars serving a plurality of landings between a lower terminal landing and an upper terminal landing; a hoisting motor for each car; actuating and stopping mechanism for each car; landing call registering means for each of said landings; car call registering means for each of said landings for each car; direction determining means for each car; means for each car for registering when that car has reached its highest car call; means for each car for registering when that car has reached the highest landing call; means for each car for registering whether or not that car has reached the upper terminal landing; means for each car for registering when the car is in a zone of landings below the upper terminal landing; means for initiating dispatching of the cars on a time basis on their downward trips; a source of direct voltage; and means for each car for rendering that car available for dispatching on its downward trip comprising, a control having electroresponsive actuating means, an input circuit for said actuating means, said actuating means being connected between said input circuit and one side of said source, an operating circuit for said control connected to said input circuit, a resistor connected in said operating circuit, means for applying to said operating circuit positive voltage with respect to said one side of said source, a plurality of low resistance bypass circuits, each providing a connection from said input circuit to said one side of said source, means responsive to the initiation of the next dispatching operation by said dispatch initiation means, to operation of said zone arrival registering means for that car when the car is in said zone, to the car being set for upward travel by its direction determining means, to operation of said highest car call registering means for that car and highest landing call registering means when the car has reached its highest call and to no other car set for upward travel being at the upper terminal for applying to said bypass circuits positive voltage with respect to said one side of said source, thereby causing operation of said control to render the car available for down dispatching, and unidirectional current conducting means for each of said bypass circuits connected in that circuit with a polarity to prevent current flow therein in a direction toward said input circuit.

53. An elevator system comprising; a plurality of elevator cars serving a plurality of landings between a lower terminal landing and an upper terminal landing; a hoisting motor for each car; actuating and stopping mechanism for each car; landing call registering means for each of said landings; car call registering means for each of said landings for each car; direction determining means for each car; means for each car for registering when that car has reached its highest car call; means for each car for registering when that car has reached the highest landing call; means for each car for registering whether or not that car has reached the upper terminal landing; means for each car for registering when the car is in a zone of landings below the upper terminal landing; means for initiating dispatching of the cars on a time basis on their downward trips; a source of direct voltage; and means for each car for rendering that car available for dispatching on its downward trip comprising, a control having electro responsive actuating means, an input circuit for said actuating means, said actuating means being connected between said input circuit and one side of said source, a pair of operating circuits for said control connected to said input circuit, means for applying to each operating circuit positive voltage with respect to said one side of said source, unidirectional current conducting means for each operating circuit connected in that circuit with a polarity to permit the flow of current therein in a direction toward said input circuit, a resistor for each operating circuit connected in that circuit between said unidirectional current conducting means in that circuit and said positive voltage applying means, a pair of low resistance bypass circuits for one of said operating circuits, each bypass circuit providing a connection from the junction of said resistor and unidirectional current conducting means in that operating circuit to said one side of said source, means responsive to the car being set for upward travel by its direction determining means for applying to one of said bypass circuits positive voltage with respect to said one side of said source, means responsive to operation of said upper terminal arrival registering means for that car upon arrival of the car at the upper terminal landing for applying to the other bypass circuit positive voltage with respect to said one side of said source, thereby causing operation of said control to render the car available for down dispatching, six low resistance bypass circuits for the other of said operating circuits, each providing a connection from the junction of said resistor and unidirectional current conducting means in that operating circuit to said one side of said source, means responsive to the initiation of the next dispatching operation by said dispatch initiation means for applying to one of said bypass circuits for said other operating circuit positive voltage with respect to said one side of said source, means responsive to operation of said zone arrival registering means for that car when the car is in said zone for applying to a second of said bypass circuits for said other operating circuit positive voltage with respect to said one side of said source, means responsive to the car being set for upward travel by its direction determining means for applying to a third of said bypass circuits for said other operating circuit positive voltage with respect to said one side of said source, means responsive to operation of said highest car call registering means for that car when the car has reached its highest car call for applying to a fourth of said bypass circuits for said other operating circuit positive voltage with respect to said one side of said source, means responsive to operation of said highest landing call registering means for that car when the car has reached its highest landing call for applying to a fifth of said bypass circuits for said other operating circuit positive voltage with respect to said one side of said source, means responsive to no other car set for upward travel being at the upper terminal for applying to the remaining bypass circuit for said other operating circuit positive voltage with respect to said one side of said source, thereby causing operation of said control to render the car available for down dispatching, and unidirectional current conducting means for each of said bypass circuits connected in that circuit with a polarity to prevent current flow therein in a direction toward said resistor in the operating circuit for which the bypass circuit is provided.

54. An elevator system comprising; a plurality of elevator cars serving a plurality of landings between a lower terminal landing and an upper terminal landing; a hoisting motor for each car; actuating and stopping mechanism for each car; direction determining means for each car; means for each car for weighing the load in that car; means for initiating dispatching of the cars on a time basis from one of said terminal landings; means for each car responsive to the arrival of that car at said one terminal landing for registering the availability of that car for dispatching; means for each car controlled by the load in the car as it arrives at said one terminal landing for delaying operation of said car availability registering means for that car to render that car available for dispatching; and means for each car for rendering said delaying means ineffective when or as soon as there is no load in that car.

55. An elevator system comprising; a plurality of elevator cars serving a plurality of landings between a lower terminal landing and an upper terminal landing; a hoisting motor for each car; actuating and stopping mechanism for each car; direction determining means for each car; means for each car for weighing the load in that car; means for initiating dispatching of the cars on a time basis from one of said terminal landings; means for each car for registering the availability of that car for dispatching upon the arrival of that car at said one terminal landing; means for each car controlled by the load in the car as it arrives at such terminal landing for preventing operation of said car availability registering means for that car to render that car available for dispatching; means for each car for rendering said preventing means ineffective when or as soon as there is no load in that car, and means for each car for rendering said preventing means ineffective upon expiration of a certain time interval after said arrival even though there is load in that car.

56. An elevator system comprising; a plurality of elevator cars serving a plurality of landings between a lower terminal landing and an upper terminal landing; a hoisting motor for each car; actuating and stopping mechanism for each car; direction determining means for each car; means for each car for registering when that car has reached the lower terminal; means for each car for weighing the load in that car; means for initiating dispatching of the cars on a time basis on their upward trips; a source of direct voltage; and means for each car for registering the availability of that car for dispatching on its upward trip comprising, a control having electroresponsive actuating means, an input circuit for said actuating means, said actuating means being connected between said input circuit and one side of said source, an operating circuit for said control connected to said input circuit, means for applying to said operating circuit positive voltage with respect to said one side of said source, a resistor connected in said operating circuit, two low resistance bypass circuits, each providing a connection from said input circuit to said one side of said source, means responsive to the arrival of the car at the lower terminal landing and being set for downward travel to apply to said bypass circuits positive voltage with respect to said one side of said source, a third low resistance bypass circuit adapted for connection from said input circuit to said one side of said source, means effective upon arrival of the car at the lower terminal with the load in the car at or above a certain amount for applying to said third bypass circuit positive voltage with respect to said one side of said source subject to a time delay to enable passenger discharge to be effected to cause operation of said control to render the car available for up dispatching, and means for rendering said third bypass circuit ineffective to prevent operation of said control as soon as all passengers have been discharged.

57. An elevator system comprising: a plurality of elevator cars serving a plurality of landings between a lower terminal landing and an upper terminal landing; a hoisting motor for each car; actuating and stopping mechanism for each car; direction determining means for each car; means for each car for registering when that car has reached the lower terminal; means for each car for weighing the load in that car; means for initiating dispatching of the cars on a time basis on their upward trips; a source of direct voltage; and means for each car for rendering that car available for dispatching on its upward trip comprising, a control having electroresponsive actuating means, an input circuit for said actuating means, said actuating means being connected between said input circuit and one side of said source, an operating circuit for said control connected to said input circuit, means for applying to said operating circuit positive voltage with respect to said one side of said source, a resistor connected in said operating circuit, two low resistance bypass circuits, each providing a connection from said input circuit to said one side of said source, means responsive to the arrival of the car at the lower terminal landing and being set for downward travel for applying to said bypass circuits positive voltage with respect to said one side of said source, a third low resistance bypass circuit, means responsive to a certain load in the car for connecting said third bypass circuit from said input circuit to said one side of said source, means responsive to the arrival of the car at the lower terminal landing and decrease in the load in the car to below said certain amount due to discharge of passengers for applying to said third bypass circuit positive voltage with respect to said one side of said source, subject to a time delay to cause operation of said control to render the car available for up dispatching, means for shortening the time delay if said load in the car is below said certain amount when the car arrives at the lower terminal landing, and means for rendering said third bypass circuit ineffective to prevent operation of said control when there is no load in the car.

58. An elevator system comprising; a plurality of elevator cars serving a plurality of landings between a lower terminal landing and an upper terminal landing; a hoisting motor for each car; actuating and stopping mechanism for each car; a source of direct voltage; means for dispatching the cars from one of said terminal landings; means for each car for rendering that car available for dispatching from said one terminal landing; and means for selecting the cars for dispatching from said one terminal landing as they are found available comprising, a plurality of controls arranged in circuit rotation, one for each car, each control having electroresponsive actuating means connected on one side to one side of said source, an input circuit for each actuating means connected to the other side of that actuating means, a resistor for each input circuit connected on one side to that input circuit, means for applying to the other side of said resistors positive voltage with respect to said one side of said source, a low-resistance bypass circuit for each actuating means connected to said input circuit for that actuating means, means for each control responsive to operation thereof for applying to said bypass circuit for the actuating means of the control next in circuit rotation positive voltage with respect to said one side of said source to cause said controls to be operated in rotation so long as no car is available for dispatching from said one terminal landing, a second low resistance bypass circuit for each actuating means connected to said input circuit for that actuating means, means for each car responsive to that car becoming available for dispatching from said one terminal landing for connecting said second bypass circuit for said actuating means of the next control to said one side of said source to prevent operation of that control, unidirectional current conducting means for each of said bypass circuits connected in that circuit with a polarity to prevent current flow therein in a direction toward the input circuit for the actuating means for which the bypass circuit is provided, and means for each car responsive to the operation of the control for that car when that car is available for dispatching from said one terminal landing for providing a voltage indicative of selection of that car for dispatching from said one terminal landing.

59. An elevator system comprising; a plurality of elevator cars serving a plurality of landings between a lower terminal landing and an upper terminal landing; a hoisting motor for each car; actuating and stopping mechanism for each car; a source of direct voltage; means for dispatching the cars from one of said terminal landings; means for each car for rendering that car available for dispatching from said one terminal landing; and means for selecting the cars for dispatching from said one terminal landing as they are found available comprising, a plurality of cold cathode electronic tubes arranged in circuit rotation, one for each car, each tube having an anode, cathode and control electrode, said cathode being connected to one side of said source, an input circuit for each tube connected to the control electrode of that tube, a resistor for each tube connected on one side to the input circuit of that tube, means for applying to the other side of each resistor positive voltage with respect to said one side of said source, a low-resistance bypass circuit for each tube connected to the junction of said resistor and input circuit for that tube, means for each tube responsive to that tube becoming conductive for applying to said bypass circuit for the tube next in circuit rotation positive voltage with respect to said one side of said source to cause said tubes to be rendered conductive in rotation so long as no car is available for dispatching from said one terminal landing, a second low resistance bypass circuit for each tube connected to the junction of said resistor and input circuit for that tube, means for each car responsive to that car becoming available for dispatching from said one terminal landing for connecting said second bypass circuit for said next tube to said one side of said source to prevent initiation of conduction of that tube, unidirectional current conducting means for each of said bypass circuits connected in that circuit with a polarity to prevent current flow therein in a direction toward the input circuit for the tube for which the bypass circuit is provided, and means for each car responsive to the rendering conductive of the tube for that car when that car is available for dispatching from said one terminal landing for providing a voltage indicative of selection of that car for dispatching from said one terminal landing.

60. An elevator system comprising; a plurality of elevator cars serving a plurality of landings between a lower terminal landing and an upper terminal landing; a hoisting motor for each car; actuating and stopping mechanism for each car; a source of direct voltage; means for dispatching the cars from one of said terminal landings; means for each car for rendering that car available for dispatching from said one terminal landing; and means for selecting the cars for dispatching from said one terminal landing as they are found available comprising, a plurality of cold cathode electronic tubes arranged in circuit rotation, one for each car, each tube having an anode, cathode and control electrode, a resistor for each tube connecting the cathode of that tube to one side of said source, a condenser for each resistor connected in parallel therewith, an input circuit for each tube connected to the control electrode of that tube, a second resistor for each tube connected on one side to the input circuit of that tube, means for applying to the other side of each of said second resistors positive voltage with respect to said one side of said source, a plurality of low-resistance bypass circuits for each tube, each connected to the junction of said second resistor and input circuit for that tube, means for each tube responsive to that tube becoming conductive for applying the potential above said one side of said source of the first named resistor for that tube to one of said bypass circuits for the tube next in circuit rotation to cause said tubes to be rendered conductive in rotation subject to time delays provided by said condensers so long as no car is available for dispatching from said one terminal landing, means for each car responsive to that car becoming available for dispatching from said one terminal landing for connecting another of said bypass circuits for said next tube to said one side of said source to prevent initiation of conduction of that tube, means for each car for connecting one or more of the remaining bypass circuits for said next tube to said one side of said source until that car has been dispatched, unidirectional current conducting means for each of said bypass circuits connected in that circuit with a polarity to prevent current flow therein in a direction toward the input circuit for the tube for which the bypass circuit is provided, a flip-flop for each car having an input circuit and adapted when operated to provide a voltage indicative of selection of that car for dispatching from said one terminal landing, a resistor for each flip-flop connected on one side to the input circuit for that flip-flop, means for applying to the other side of each of said flip-flop resistors positive voltage with respect to said one side of said source, a pair of low resistance bypass circuits for each flip-flop connecting said input circuit for that flip-flop to said one side of said source, means responsive to the rendering conductive of the tube for an available car for applying to the bypass circuits for the flip-flop for that car positive voltage with respect to said one side of said source to cause operation of that flip-flop, and unidirectional current conducting means for each of said flip-flop bypass circuits connected in that circuit with a polarity to prevent current flow therein in a direction toward the input circuit of the flip-flop for which the bypass circuit is provided.

61. An elevator system comprising; a plurality of elevator cars, each serving a plurality of landings; a hoisting motor for each car; actuating and stopping mechanism for each car; means for selecting the cars for dispatching; means for initiating dispatching operations for the group of cars; a source of direct voltage; and means for each of said cars for controlling the starting of that car from one of said landings, said start controlling means for each car comprising, a selected car dispatching control having electroresponsive actuating means, an input circuit for said actuating means, said actuating means being connected between said input circuit and one side of said source, means responsive to the arrival of the car at said one landing for applying to said input circuit positive voltage with respect to said one side of said source to cause actuation of said control, a holding circuit connected to said input circuit, a resistor connected in said holding circuit, unidirectional current conducting means connected in said holding circuit between said resistor and input circuit with a polarity to permit the flow of current therein in a direction toward said input circuit, means for applying to said holding circuit positive voltage with respect to said one side of said source, a low resistance bypass circuit extending from the junction of said resistor and unidirectional current conducting means to said one side of said source, means responsive to selection of the car by said selecting means for applying to said bypass circuit positive voltage with respect to said one side of said source, another low resistance bypass circuit extending from the junction of said resistor and unidirectional current conducting means to said one side of said source, means controlled by said means for initiating dispatching operations so long as the next dispatching operation has not been initiated for applying to said second bypass circuit positive voltage with respect to said one side of said source but discontinuing such voltage application upon operation of said means for initiating dispatching operations to initiate the next dispatching operation whereupon said holding circuit is rendered ineffective and said control is rendered unoperated and thus effective to cause the starting of the car, and unidirectional current conducting means for each of said bypass circuits connected in that circuit with a polarity to prevent current flow therein in a direction toward said resistor.

62. An elevator system comprising; a plurality of elevator cars, each serving a plurality of landings; a hoisting motor for each car; actuating and stopping mechanism for each car; means for selecting the cars for dispatching; means for initiating dispatching operations for the group of cars; a source of direct voltage; and means for each of said cars for controlling the starting of that car from one of said landings, said start controlling means for each car comprising, a selected car dispatching control having electroresponsive actuating means, an input circuit for said actuating means, said actuating means being connected between said input circuit and one side of said source, a pair of control circuits for said control, each connected to said input circuit, unidirectional current conducting means for each control circuit connected in the circuit for which it is provided with a polarity to permit the flow of current therein in a direction toward said input circuit, means responsive to the arrival of the car at said one landing for applying to one of said control circuits positive voltage with respect to said one side of said source to cause actuation of said control, means for applying to the other of said control circuits positive voltage with respect to said one side of said source, a resistor for said other of said control circuits connected between said unidirectional current conducting means in that control circuit and said means for applying positive voltage to said other control circuit, three low resistance bypass circuits, each bypass circuit providing a connection from the junction of said resistor and unidirectional current conducting means in said other control circuit to said one side of said source, means controlled by said means for initiating dispatching operations for applying to one of said bypass circuits positive voltage with respect to said one side of said source so long as the next dispatching operation has not been initiated, means responsive to said actuation of said control for applying to another of said bypass circuits positive voltage with respect to said one side of said source, means responsive to the selection of said car for dispatching for discontinuing said application of positive voltage to said one control circuit and also for applying to the third bypass circuit positive voltage with respect to said one side of said source, thereby establishing a holding circuit for said control subject to the discontinuance of said application of positive voltage to said one bypass circuit upon the initiation of the dispatching operation whereupon said control is rendered unoperated and thus effective to cause the starting of the car, and unidirectional current conducting means for each of said bypass circuits connected in that circuit with a polarity to prevent current flow therein in a direction toward said resistor.

63. An elevator system comprising; a plurality of elevator cars, each serving a plurality of landings; a hoisting motor for each car; actuating and stopping mechanism for each car; means for each car for rendering that car available for dispatching from one of said landings; means for selecting the cars for dispatching in the order in which they are found available, regardless of their order of previous dispatch from said one landing; means for registering on a time basis dispatching operations for the group of cars; a source of direct voltage; and dispatching means for each of said cars for controlling the starting of that car from said one landing, said dispatching means for each car comprising, a selected car dispatching control having electroresponsive actuating means, an input circuit for said actuating means, said actuating means being connected between said input circuit and one side of said source, a pair of control circuits for said control, each connected to said input circuit, unidirectional current conducting means for each control circuit connected in the circuit for which it is provided with a polarity to permit the flow of current therein in a direction toward said input circuit, means responsive to the rendering of the car available for dispatching for applying to one of said control circuits positive voltage with respect to said one side of said source to cause actuation of said control, means for applying to the other of said control circuits positive voltage with respect to said one side of said source, a resistor for said other of said control circuits connected between said unidirectional current conducting means in that control circuit and said means for applying positive voltage to said other control circuit, three low resistance bypass circuits, each bypass circuit providing a connection from the junction of said resistor and unidirectional current conducting means in said other control circuit to said one side of said source, means controlled by said means for registering a dispatching operation for applying to one of said bypass circuits positive voltage with respect to said one side of said source so long as the next dispatching operation has not been registered, means responsive to said actuation of said control for applying to another of said bypass circuits positive voltage with respect to said one side of said source, means responsive to the selection of said car for dispatching for applying to the third bypass circuit positive voltage with respect to said one side of said source to establish a holding circuit for said control subject to the discontinuance of said application of positive voltage to said one bypass circuit upon the registration of the dispatching operation and for cancelling the car availability and thereby discontinuing said application of positive voltage to said one control circuit, said dispatching operation registering means upon operation discontinuing said application of positive voltage to said one bypass circuit, to render said control unoperated and thus effective to cause the starting of the car, and unidirectional current conducting means for each of said bypass circuits connected in that circuit with a polarity to prevent current flow therein in a direction toward said resistor.

64. An elevator system comprising; a plurality of elevator cars, each serving a plurality of landings; a hoisting motor for each car; actuating and stopping mechanism for each car; up landing call registering means for each of said landings; down landing call registering means for each of said landings; program selection means for selecting different programs of operation of the system; and means controlled by the total number of calls registered by said call registering means and by the difference between the number of said up landing calls registered and the number of said down landing calls registered for controlling which program is selected by said program selection means.

65. An elevator system comprising; a plurality of elevator cars, each serving a plurality of landings including terminal landings; a hoisting motor for each car; actuating and stopping mechanism for each car; a source of current; up landing call registering means for each of said landings; down landing call registering means for each of said landings; a total up service demand circuit; a total down service demand circuit; means for feeding current from said source to said total up service demand circuit in an amount dependent on the number of up landing calls registered; means for feeding current from said source to said total down service demand circuit in an amount dependent on the number of down landing calls registered; program selection means for selecting different programs of operation of the system; and means responsive to the total current flow in said circuits and to a certain excess of current flow in one of said circuits over the other for controlling which program is selected by said program selection means.

66. An elevator system comprising; a plurality of elevator cars, each serving a plurality of landings; a hoisting motor for each car; actuating and stopping mechanism for each car; a source of current; up landing call registering means for each of said landings; down landing call registering means for each of said landings; means controlled by said calls that are registered for totalizing the number of such registered calls and for determining the difference between the number of said up landing calls and said down landing calls that are registered; and means controlled by said totalizing and difference determining means for selecting different operating modes of the system to provide intermittent service, balanced service, preponderant service in the up direction or preponderant service in the down direction.

67. An elevator system comprising; a plurality of elevator cars, each serving a plurality of landings; a hoisting motor for each car; actuating and stopping mechanism for each car; up landing call registering means for each of said landings; down landing call registering means for each of said landings; means for each car for registering a certain load in that car; program selection means for selecting different programs of operation of the system; and means controlled by the total number of calls registered by said call registering means, by the difference between the number of said up landing calls registered and the number of said down landing calls registered and by the difference between the registered loads in up cars and registered loads in down cars for controlling which program is selected by said program selection means.

68. An elevator system comprising; a plurality of elevator cars, each serving a plurality of landings including terminal landings; a hoisting motor for each car; actuating and stopping mechanism for each car; a source of current; up landing call registering means for each of said landings; down landing call registering means for each of said landings; means for each car for registering load in that car; a total up service demand circuit; a total down service demand circuit; means for feeding current from said source to said total up service demand circuit in an amount dependent on the number of up landing calls registered and said registered load in each car set for upward travel; means for feeding current from said source to said total down service demand circuit in an amount dependent on the number of down landing calls registered and said registered load in each car set for downward travel; program selection means for selecting different programs of operation of the system; and means responsive to the total current flow in said circuits and to a certain excess of current flow in one of said circuits over the other for controlling which program is selected by said program selection means.

69. An elevator system comprising; a plurality of elevator cars, each serving a plurality of landings; a hoisting motor for each car; actuating and stopping mechanism for each car; up landing call registering means for each of said landings; down landing call registering means for each of said landings; means for conditioning the system to provide service to suit heavier traffic conditions in a given direction; means for conditioning the system to provide service to suit peak traffic conditions in said given direction; and means responsive to a certain excess in the number of landing calls registered for one direction of car travel over the number of landing calls registered for the opposite direction of car travel for causing operation of the first named conditioning means and to a certain greater excess in the number of landing calls registered for said one direction of car travel over the number of landing calls registered for said opposite direction of car travel for causing operation of the second named conditioning means.

70. An elevator system comprising; a plurality of elevator cars, each serving a plurality of landings; a hoisting motor for each car; actuating and stopping mechanism for each car; up landing call registering means for each of said landings; down landing call registering means for each of said landings; means for conditioning the system to provide service to suit heavier up traffic conditions; means for conditioning the system to provide service to suit up peak traffic conditions; means for conditioning the system to provide service to suit heavier down traffic conditions; means for conditioning the system to provide service to suit down peak traffic conditions; means responsive to a certain excess in the number of up landing calls registered over the number of down landing calls registered for causing operation of the first named conditioning means and to a certain greater excess in the number of up landing calls registered over the number of down landing calls registered for causing operation of the second named conditioning means; and means responsive to a certain excess in the number of down landing calls registered over the number of up landing calls registered for causing operation of the third named conditioning means and to a certain greater excess in the number of down landing calls registered over the number of up landing calls registered for causing operation of the fourth named conditioning means.

71. An elevator system comprising; a plurality of elevator cars, each serving a plurality of landings; a hoisting motor for each car; actuating and stopping mechanism for each car; up landing call registering means for each of said landings; down landing call registering means for each of said landings; means for conditioning the system to provide service to suit intermittent traffic conditions; means for conditioning the system to provide service to suit balanced traffic conditions; means for conditioning the system to provide service to suit predominant traffic in the up direction; means for conditioning the system to provide service to suit predominant traffic in the down direction; means controlled by the total number of said calls registered for causing operation of the first named conditioning means when the calls are below a certain number and of the second named conditioning means when the calls are above said certain number; means responsive to a certain excess in the number of up landing calls registered over the number of down landing calls registered for causing operation of the third named conditioning means; and means responsive to a certain excess in the number of down landing calls registered over the number of up landing calls registered for causing operation of the fourth named conditioning means.

72. An elevator system comprising; a plurality of elevator cars, each serving a plurality of landings; a hoisting motor for each car; actuating and stopping mechanism for each car; up landing call registering means for each of said landings; down landing call registering means for each of said landings; means for conditioning the system to provide service to suit heavier up traffic conditions; means for conditioning the system to provide service to suit up peak traffic conditions; means for conditioning the system to provide service to suit heavier down traffic conditions; means for conditioning the system to provide service to suit down peak traffic conditions; means responsive to a certain excess in the number of up landing calls registered over the number of down landing calls registered for causing operation of the first named conditioning means and to a certain greater excess in the number of up landing calls registered over the number of down landing calls registered for causing operation of the second named conditioning means; means responsive to a certain excess in the number of down landing calls registered over the number of up landing calls registered for causing operation of the third named conditioning means and to a certain greater excess in the number of down landing calls registered over the number of up landing calls registered for causing operation of the fourth named conditioning means; means for conditioning the system to provide service to suit intermittent traffic conditions; means for conditioning the system to provide service to suit balanced traffic conditions; and means controlled by the total number of said calls registered for causing operation of the fifth named conditioning means when the calls are below a certain number and of the sixth named conditioning means when the calls are above said certain number, provided none of the first four named conditioning means is operated.

73. An elevator system comprising; a plurality of elevator cars, each serving a plurality of landings, a hoisting motor for each car; actuating and stopping mechanism for each car; up landing call registering means for each of said landings; down landing call registering means for each of said landings; means for conditioning the system to provide service for intermittent traffic conditions to provide service for balanced traffic conditions, and to provide service for conditions in which traffic in one direction predominates over traffic in the other direction; means controlled by a low total number of calls registered by said call registering means for causing operation of said conditioning means to condition the system to provide intermittent service; means operable wherein calls above a certain number are registered and controlled by the difference between the number of said up landing calls registered and the number of said down landing calls registered for causing operation of said conditioning means to condition the system to provide service for a preponderance of traffic in a given direction, depending upon whether up landing calls or down landing calls predominate; and means operable when the system is not conditioned to provide intermittent service or service for conditions in which traffic in one direction predominates for causing operation of said conditioning means to condition the system to provide balanced service.

74. An elevator system comprising; a plurality of elevator cars, each serving a plurality of landings; a hoisting motor for each car; actuating and stopping mechanism for each car; up landing call registering means for each of said landings; down landing call registering means for each of said landings; program selecting means operable to provide service for intermittent traffic conditions; program selecting means operable to provide service for balanced traffic conditions; program selecting means operable to provide service to suit heavier up traffic condition; program selecting means operable to provide service to suit heavier down traffic conditions; program selecting means operable to provide service to suit up peak conditions; program selecting means operable to provide service to suit down peak traffic conditions; means controlled by the total number of calls registered by said call registering means and by the difference between the number of said up landing calls registered and the number of said down landing calls registered for controlling operation of said program selecting means to provide service for intermittent, heavier up, heavier down, up peak and down peak traffic conditions; and means responsive to the non-operated condition of said program selecting means operable to provide service for intermittent, heavier up, heavier down, up peak and down peak traffic conditions for causing operation of said program selecting means to provide service for balanced traffic conditions.

75. An elevator system comprising; a plurality of elevator cars, each serving a plurality of landings; a hoisting motor for each car; actuating and stopping mechanism for each car; a source of current; up landing call registering means for each of said landings; down landing call registering means for each of said landings; a total up service demand circuit; a total down service demand circuit; means responsive to each up landing call registered for feeding current from said source to said total up service demand circuit; means responsive to each down landing call registered for feeding current from said source to said total down service demand circuit; program selection means operable to cause operation of the system to suit balanced traffic conditions; program selection means operable to cause operation of the system to suit conditions under which traffic in the up direction predominates; program selection means operable to cause operation of the system to suit conditions under which traffic in the down direction predominates; program selection means operable to cause operation of the system to suit intermittent traffic conditions; and means dependent on the amount and the difference in the amount of current flow in said total service demand circuits for controlling which program selection means is operated.

76. An elevator system comprising; a plurality of elevator cars, each serving a plurality of landings including terminal landings; a hoisting motor for each car; actuating and stopping mechanism for each car; a source of current; load registering means for each car; up landing call registering means for each of the intermediate landings and the lower terminal landing; down landing call registering means for each of the intermediate landings and the upper terminal landing; a total up service demand circuit; a total down service demand circuit; means for feeding current from said source to said total up service demand circuit in an amount dependent on the number of up landing calls registered and the registered load in each car set for upward travel; means for feeding current from said source to said total down service demand circuit in an amount dependent on the number of down landing calls registered and the registered load in each car set for downward travel; means for conditioning the system for operation to provide balanced service in the two directions of travel; means for conditioning the system for operation to provide a preponderance of service in the up direction; means for conditioning the system for operation to provide a preponderance of service in the down direction; means operable for conditioning the system to provide intermittent service; and means dependent on the amount and the difference in the amount of current flow in said total service demand circuits for controlling which conditioning means is operated.

77. An elevator system comprising; a plurality of elevator cars, each serving a plurality of landings including terminal landings; a hoisting motor for each car; actuating and stopping mechanism for each car; a source of current; up landing call registering means for each of the intermediate landings and the lower terminal landing; down landing call registering means for each of the intermediate landings and the upper terminal landing; a total up service demand circuit; a total down service demand circuit; means for feeding current from said source to said total up service demand circuit in an amount dependent on the number of up landing calls registered;

means for feeding current from said source to said total down service demand circuit in an amount dependent on the number of down landing calls registered; means responsive to a certain total amount of current flow in said total service demand circuits for causing operation of the system to provide balanced service in the two directions of travel; means responsive to a certain excess of current flow in said total up service demand circuit over the current flow in said total down service demand circuit for causing operation of the system to provide a preponderance of service in the up direction; and means responsive to a certain excess of current flow in said total down service demand circuit over the current flow in said total up service demand circuit for causing operation of the system to provide a preponderance of service in the down direction.

78. An elevator system comprising; a plurality of elevator cars, each serving a plurality of landings including terminal landings; a hoisting motor for each car; actuating and stopping mechanism for each car; a source of current; up landing call registering means for each of the intermediate landings and the lower terminal landing; down landing call registering means for each of the intermediate landings and the upper terminal landing; a total up service demand circuit; a total down service demand circuit; means for feeding current from said source to said total up service demand circuit in an amount dependent on the number of up landing calls registered; means for feeding current from said source to said total down service demand circuit in an amount dependent on the number of down landing calls registered; means responsive to a certain total amount of current flow in said total service demand circuits for causing operation of the system to provide balanced service in the two directions of travel and to less than said certain amount of current flow in said total service demand circuits for causing operation of the system to provide intermittent service; means responsive to a certain difference in the amount of current flow in said total up service demand circuit over the amount of current flow in said total down service demand circuit for causing operation of the system to provide a preponderance of service in the up direction; and means responsive to a certain difference in the amount of current flow in said total down service demand circuit over the amount of current flow in said total up service demand circuit for causing operation of the system to provide a preponderance of service in the down direction.

No references cited.